US009747342B2

(12) United States Patent
Hirate

(10) Patent No.: US 9,747,342 B2
(45) Date of Patent: Aug. 29, 2017

(54) INFORMATION PROCESSING APPARATUS, INFORMATION PROCESSING METHOD, INFORMATION PROCESSING PROGRAM, AND RECORDING MEDIUM

(71) Applicant: Rakuten, Inc., Shinagawa-ku, Tokyo (JP)

(72) Inventor: Yu Hirate, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 538 days.

(21) Appl. No.: 14/364,539

(22) PCT Filed: May 28, 2013

(86) PCT No.: PCT/JP2013/064754
§ 371 (c)(1),
(2) Date: Jun. 11, 2014

(87) PCT Pub. No.: WO2013/180121
PCT Pub. Date: Dec. 5, 2013

(65) Prior Publication Data
US 2014/0337351 A1    Nov. 13, 2014

(30) Foreign Application Priority Data
May 30, 2012  (JP) ............................... 2012-122833

(51) Int. Cl.
*G06F 17/30* (2006.01)
*G06Q 10/10* (2012.01)

(52) U.S. Cl.
CPC .. *G06F 17/30483* (2013.01); *G06F 17/30327* (2013.01); *G06F 17/30598* (2013.01);
(Continued)

(58) Field of Classification Search
CPC ......... G06F 17/30483; G06F 17/30327; G06F 17/30598; G06F 17/30643
(Continued)

(56) References Cited

U.S. PATENT DOCUMENTS 8,364,664 B2 * 1/2013 Bennett ............ G06F 17/30675
  707/722
8,577,879 B1 * 11/2013 Hotchkies ......... G06F 17/30864
  707/706

(Continued)

OTHER PUBLICATIONS

Gurunavi, Inc., "Gurunavi Party Gourmet Information Searching Site", [online], [searched for on Aug. 3, 2011], Internet <URL: http://www.gnavi.co.jp/>.
(Continued)

*Primary Examiner* — Mark E Hershley
(74) *Attorney, Agent, or Firm* — Sughrue Mion, PLLC

(57) ABSTRACT

A category highly relevant to a keyword combination including a plurality of keywords is extracted. An information processing apparatus extracts a category where the number of times when the category is specified as a search condition along with a first keyword is greater than or equal to a first threshold value from among a plurality of categories that are hierarchized in a tree structure. Subsequently, from among categories corresponding to descendants of the extracted category, the information processing apparatus extracts a category where the number of times when the category is specified as a search condition along with a second keyword is greater than or equal to a second threshold value as a category relevant to a combination of the first keyword and the second keyword.

15 Claims, 24 Drawing Sheets

(52) U.S. Cl.
CPC .. *G06F 17/30643* (2013.01); *G06F 17/30663* (2013.01); *G06Q 10/10* (2013.01)

(58) Field of Classification Search
USPC .......................................................... 707/740
See application file for complete search history.

(56) References Cited

U.S. PATENT DOCUMENTS

| | | | |
|---|---|---|---|
| 2005/0222987 A1* | 10/2005 | Vadon ............... | G06F 17/30997 |
| 2008/0243777 A1* | 10/2008 | Stewart ............. | G06F 17/30684 |
| 2012/0016873 A1* | 1/2012 | Mathieson .......... | G06F 17/3053 707/727 |
| 2012/0072462 A1* | 3/2012 | Gu .................... | G06F 17/30572 707/797 |
| 2012/0209831 A1* | 8/2012 | Rehman ............. | G06F 17/3053 707/723 |

OTHER PUBLICATIONS

International Search Report for PCT/JP2013/064754 dated Aug. 6, 2013.

\* cited by examiner

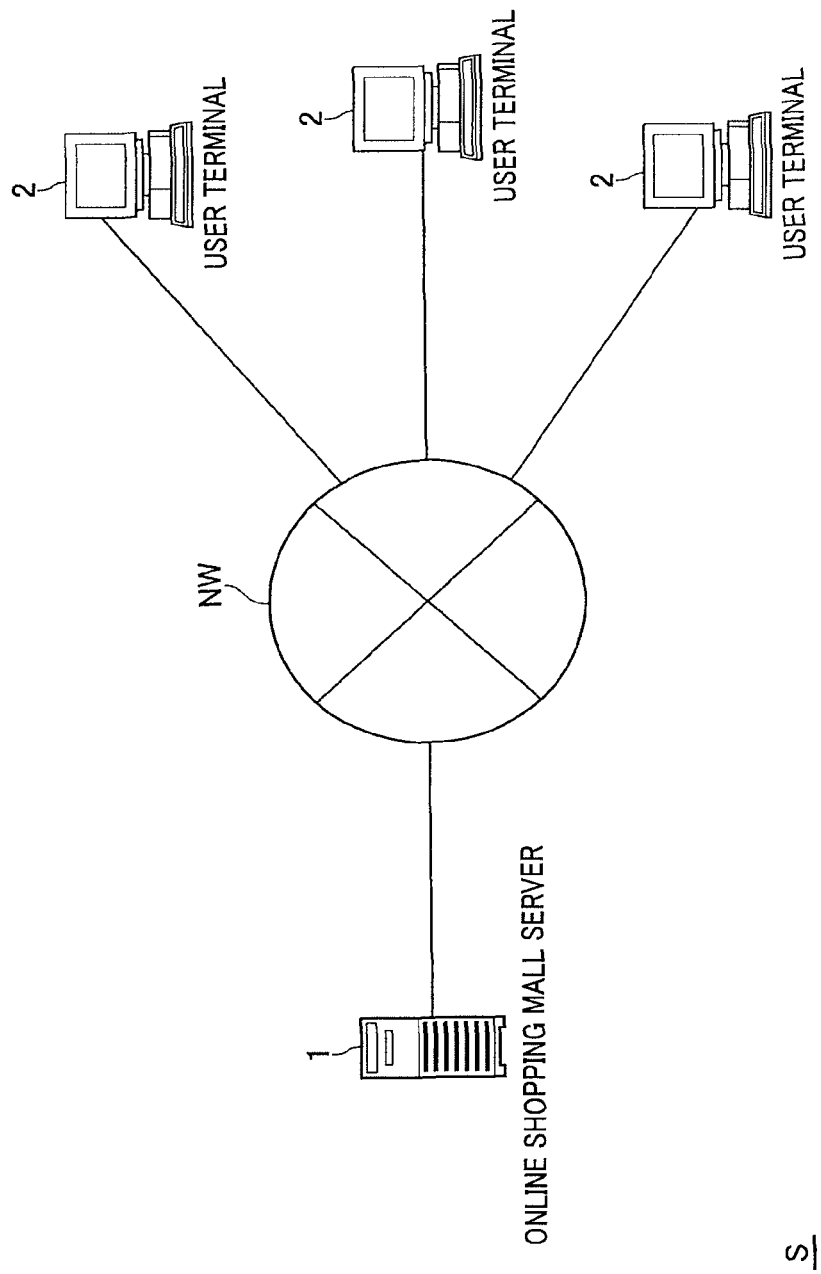

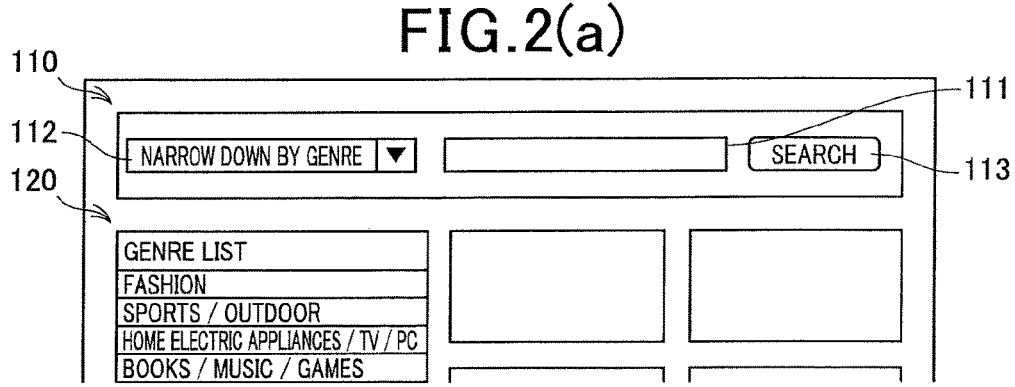
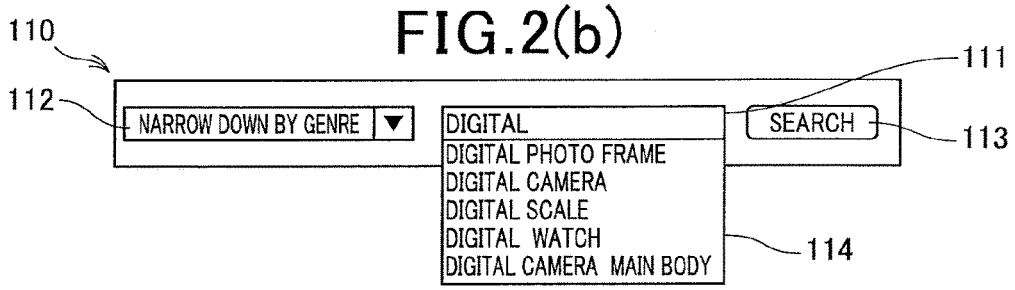
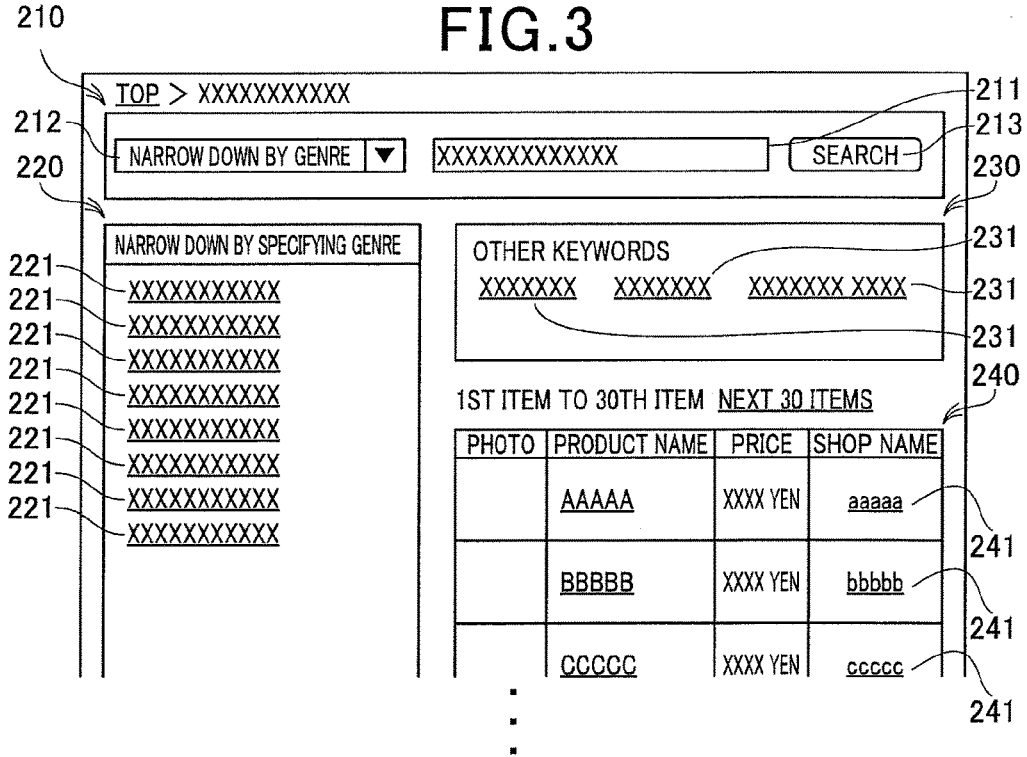

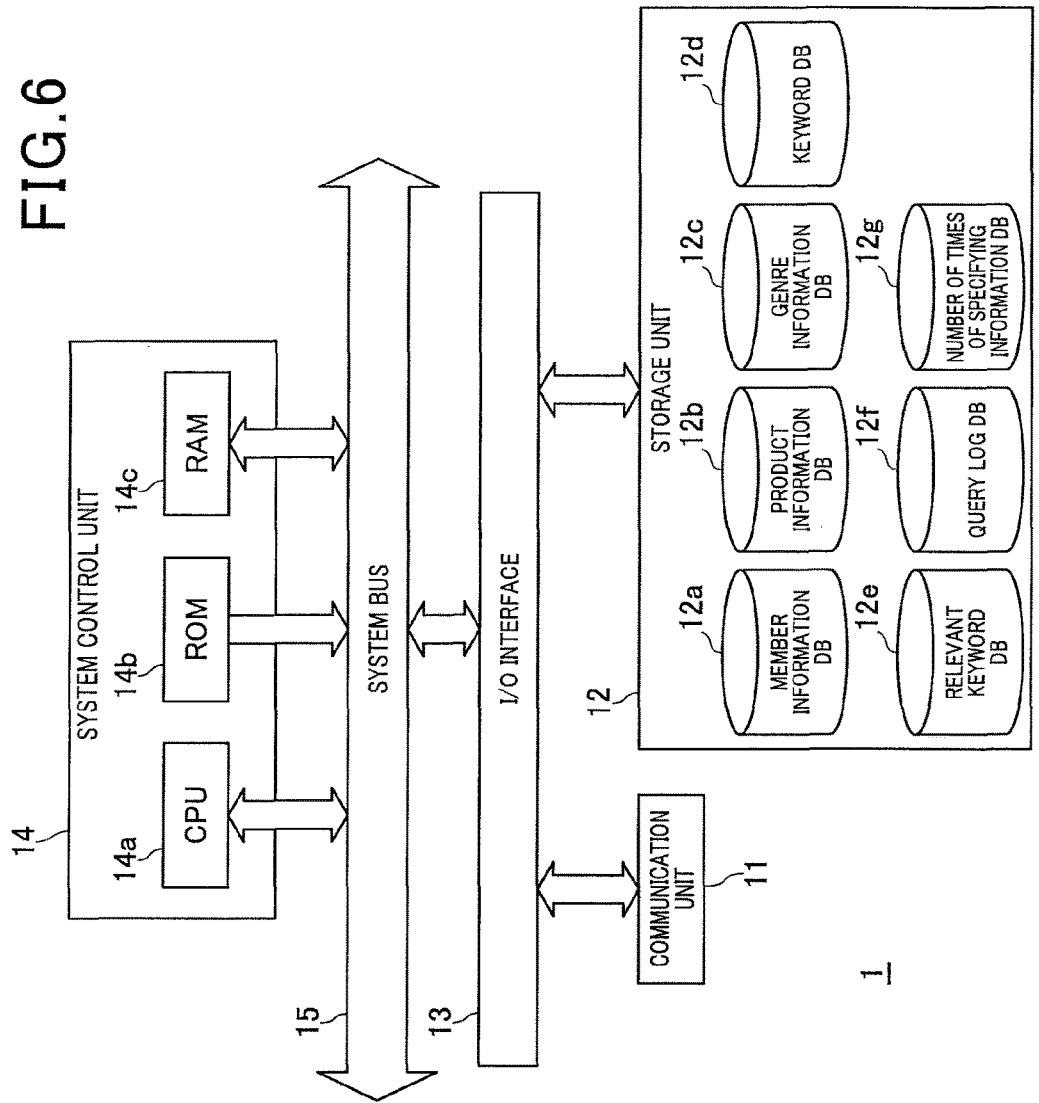

FIG.7(a)

MEMBER INFORMATION DB 12a

| USER ID |
|---|
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |
| THE NUMBER OF HELD POINTS |
| . . . |

FIG.7(b)

PRODUCT INFORMATION DB 12b

| PRODUCT ID |
|---|
| SHOP ID |
| PRODUCT CODE |
| GENRE ID |
| PRODUCT NAME |
| PRODUCT IMAGE URL |
| PRODUCT DESCRIPTION |
| PRODUCT PRICE |
| . . . |

FIG.7(c)

GENRE INFORMATION DB 12c

| GENRE ID |
|---|
| GENRE NAME |
| LEVEL |
| PARENT GENRE ID |
| CHILD GENRE ID LIST |
| . . . |

FIG.7(d)

KEYWORD DB 12d

| KEYWORD INFORMATION |
|---|
| KEYWORD INFORMATION |
| . . . |

FIG.7(e)

RELEVANT KEYWORD DB 12e

| KEYWORD INFORMATION |
|---|
| RELEVANT KEYWORD INFORMATION |
| . . . |

FIG.7(f)

QUERY LOG DB 12f

| RECEPTION DATE AND TIME |
|---|
| SEARCH KEYWORD INFORMATION |
| GENRE ID |
| GENDER |
| AGE |
| PREFECTURE |
| . . . |

FIG.7(g)

NUMBER OF TIMES OF SPECIFYING INFORMATION DB 12g

| SEARCH KEYWORD INFORMATION ||
|---|---|
| GENRE ID | THE NUMBER OF TIMES OF SPECIFYING |
| GENRE ID | THE NUMBER OF TIMES OF SPECIFYING |
| GENRE ID | THE NUMBER OF TIMES OF SPECIFYING |
| . . . | . . . |

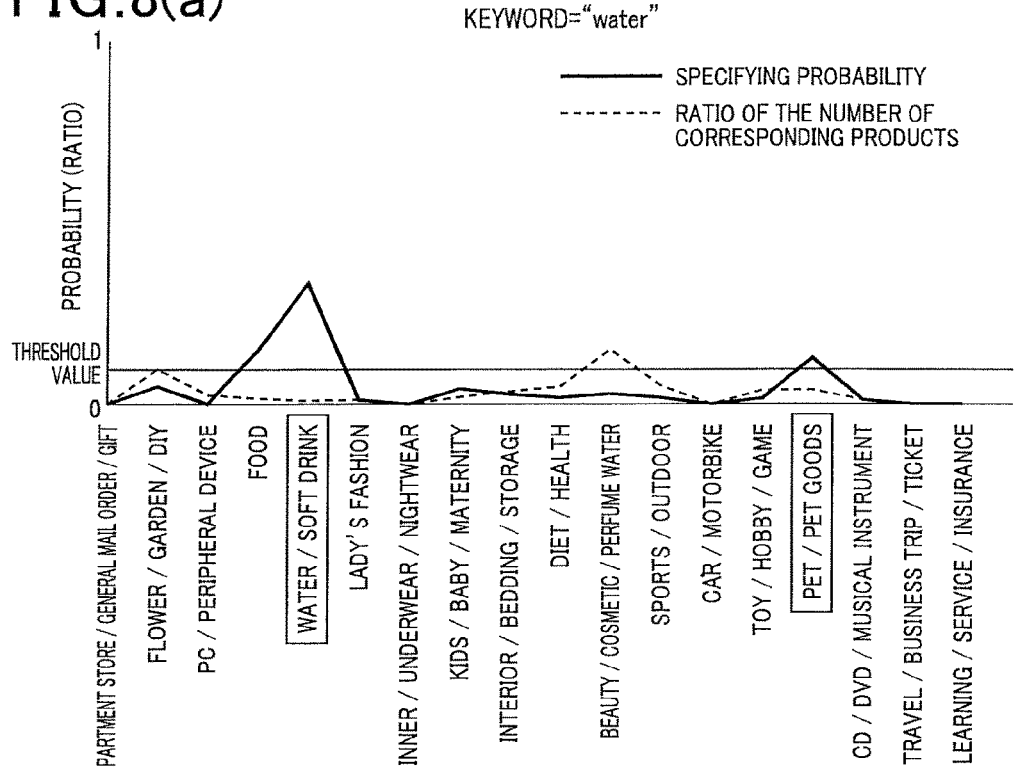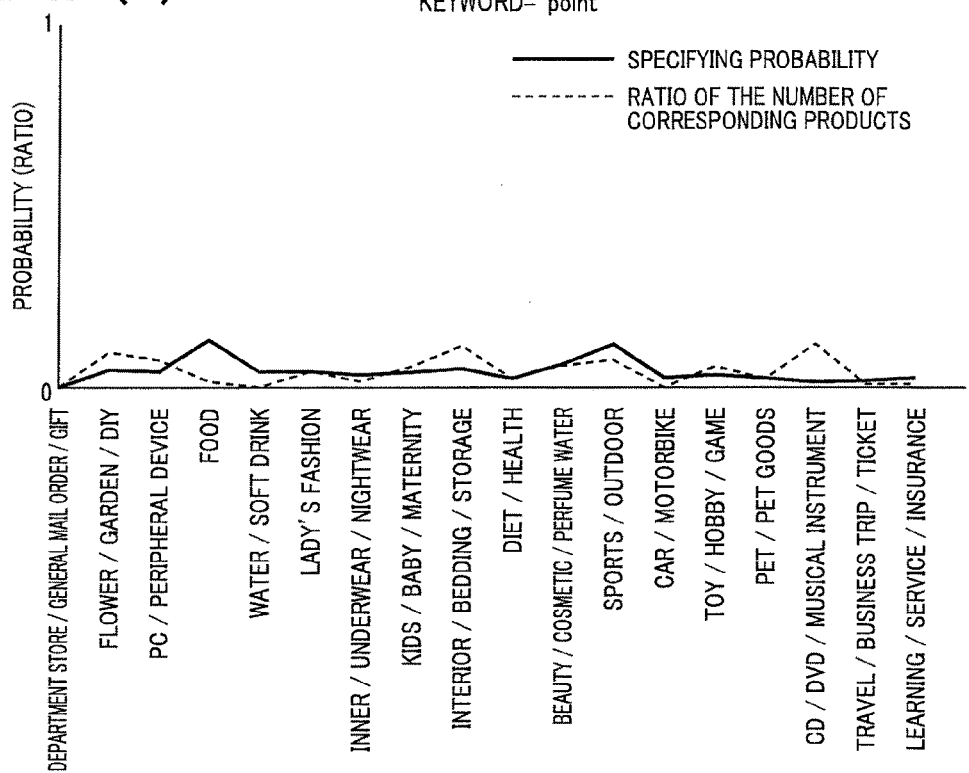

FIG.10(a)
NO GENRE RELEVANT TO "DIGITAL CAMERA AAA COMPANY"
TOP
FIG.10(b)
GENRE RELEVANT TO "DIGITAL CAMERA"
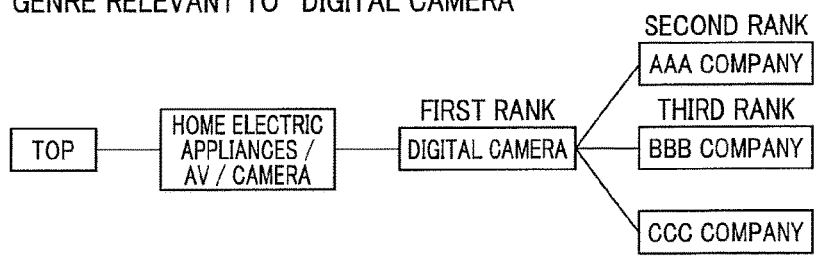
FIG.10(c)
GENRE RELEVANT TO "AAA COMPANY"
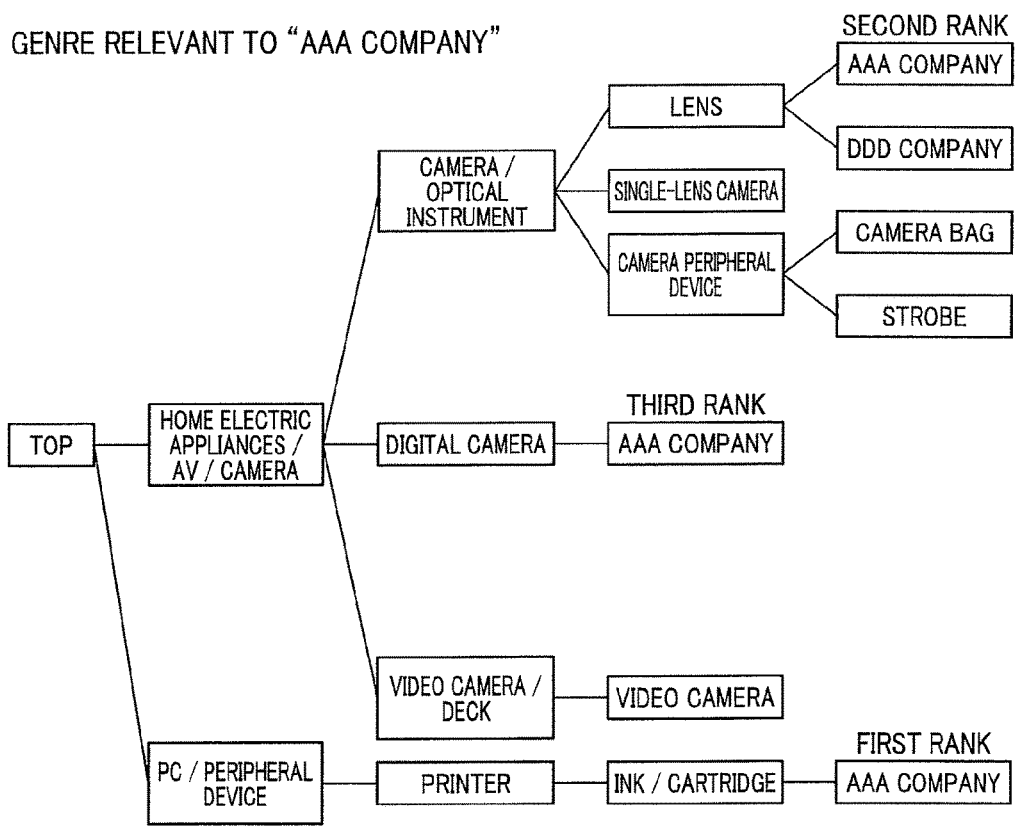

NO GENRE RELEVANT TO "20-INCH DISPLAY"

GENRE RELEVANT TO "20-INCH"

GENRE RELEVANT TO "DISPLAY"

FIG.13(a)
GENRE RELEVANT TO "20-INCH"
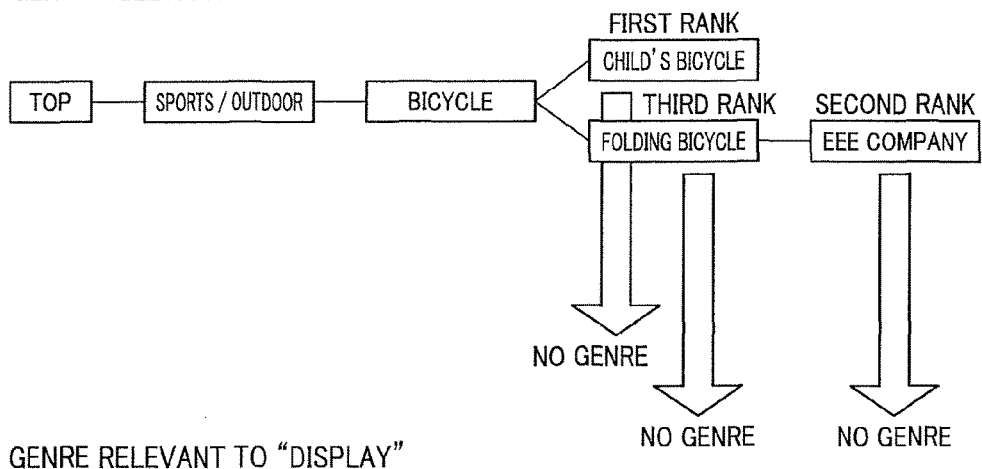
GENRE RELEVANT TO "DISPLAY"
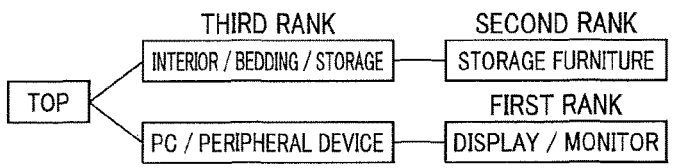
FIG.13(b)
GENRE RELEVANT TO "DISPLAY"
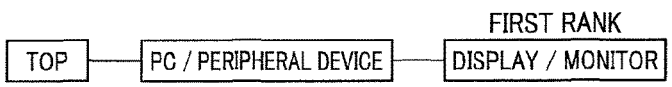
GENRE RELEVANT TO "20-INCH"
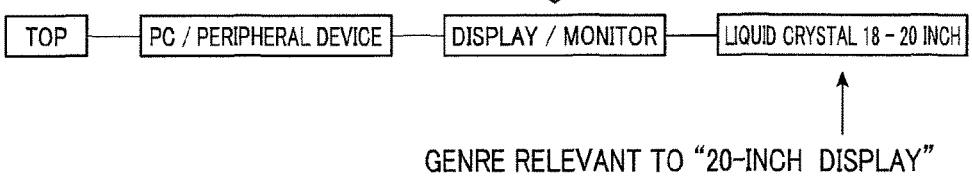
GENRE RELEVANT TO "20-INCH DISPLAY"

FIG.14(a)
GENRE RELEVANT TO "X Y"
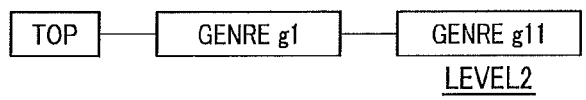
LEVEL2
FIG.14(b)
GENRE RELEVANT TO "X"
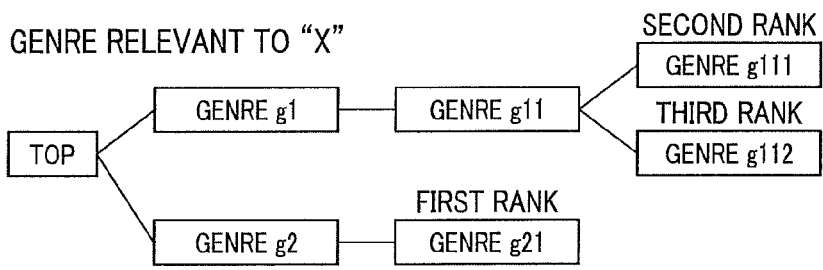
GENRE RELEVANT TO "Y"
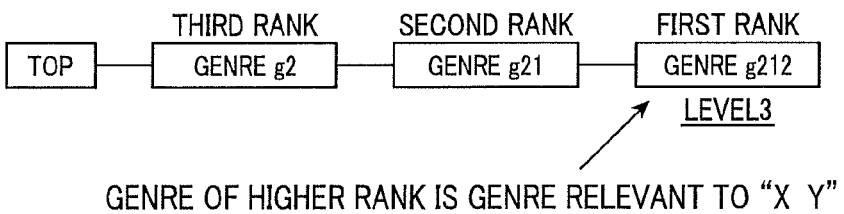
LEVEL3
GENRE OF HIGHER RANK IS GENRE RELEVANT TO "X Y"

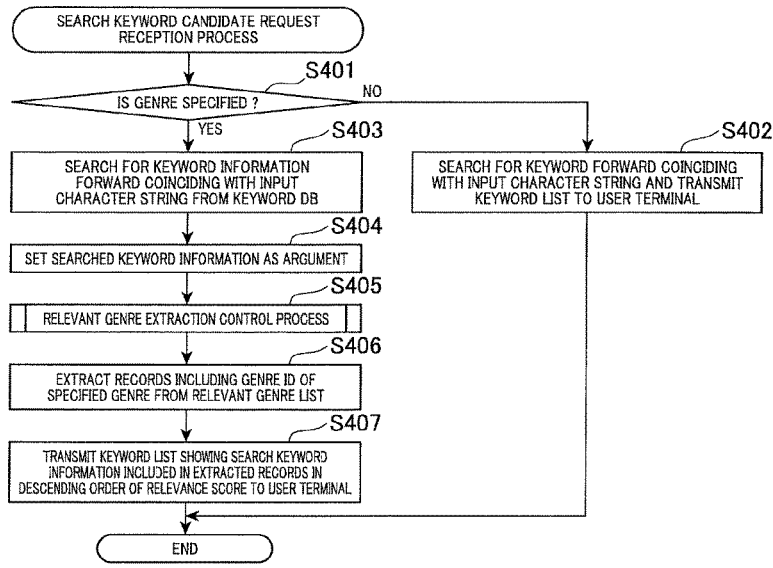

INFORMATION PROCESSING APPARATUS, INFORMATION PROCESSING METHOD, INFORMATION PROCESSING PROGRAM, AND RECORDING MEDIUM

CROSS REFERENCE TO RELATED APPLICATIONS

This application is a National Stage of International Application No. PCT/JP2013/064754 filed May 28, 2013, claiming priority based on Japanese Patent Application No. 2012-122833 filed May 30, 2012, the contents of all of which are incorporated herein by reference in their entirety.

TECHNICAL FIELD

The present invention relates to a technical field of a system for acquiring a keyword or a genre of a search target as a search condition and for making a search based on the search condition.

BACKGROUND ART

There is conventionally known a search system for receiving a search condition designated by a user from a terminal apparatus via a network and making a search based on the designated search condition. Information designatable as the search condition is a keyword, a genre of a search target, or the like. The genre of a search target indicates a range containing similar objects when objects to be searched are classified according to a preset reference, for example. The genre is genre, genre, price range, region, or the like, for example, according to each search system.

For example, Non-Patent Document 1 discloses a technique for searching a restaurant therein. The technique employs categories of restaurants such as region where a restaurant is present, business form of a restaurant, price range for eating, and the like. When the user designates a keyword as a search condition, restaurants whose names or explanations contain the keyword are searched, for example. Then, a list of searched restaurants is displayed on the screen. A list of categories to which the searched restaurants belong is displayed on the screen. When the user selects any genre among the categories displayed in the list, search refinement is made on the restaurants by the selected genre. When the list of categories is displayed, the categories are preferentially displayed in descending order of the number of restaurants searched by the designated keyword. That is, as a genre has more restaurants, the genre is displayed to be more easily searched by the user.

CITATION LIST

Non-Patent Document

Non-Patent Document 1: GURUNAVI, Inc., "GURU-NAVI Party Gourmet Information Searching Site", [online], [searched for on Aug. 3, 2011], Internet <URL: http://www.gnavi.co.jp/>

SUMMARY OF INVENTION

Technical Problem to be Solved by the Invention

However, a genre to which many objects searched by a keyword belong is not necessarily a genre having a high degree of relevance with the keyword. This will be described assuming a product as a search target. It is assumed that product genres are beverage and perfume water, for example. It is assumed herein that a keyword designated as a search condition is "水 (water)". Beverage is to be drunk for hydration. The genre of beverage includes mineral water, or water itself as a product. On the other hand, perfume water is more focused on its application for perfuming than on being liquid. If a product of perfume water is to be searched, not "水 (water)" but "香 水 (perfume water)" may be designated as a keyword. Thus, it is reasonable that beverage has a higher degree of relevance with "水 (water)" than perfume water. The characters of "香 水 (perfume water)" are contained in the product name or explanation of perfume water in many cases. Thus, more products of perfume water may be searched by the keyword "水 (water)" than the products of beverage.

When "水 (water)" is designated as a search condition, as in the technique described in Non-Patent Document 1, a list of genres of products is assumed to be displayed. At this time, if "water" is not relevant with beverage as a keyword and a genre having a high degree of relevance therebetween, the genres of perfume water may be preferentially displayed to the genres of beverage. The genres of perfume water are preferentially displayed, and thus the user may not easily search a genre of beverage regarded as having a high degree of relevance with the keyword "water" from the list.

As described above, if a relevance between a keyword and a genre is not considered, user's convenience may be lowered. However, it is complicated to manually extract a pair of keyword and genre having a high degree of relevance therebetween. Further, in a case with the manual operation, a determination as to whether the relevance is high depends on an individual subjective view, and thus a pair of keyword and genre having a high degree of relevance therebetween is not necessarily extracted appropriately.

Further, there is a case that a plurality of keywords is specified as a search condition. Also in this case, there are the same problems as those described above.

The present invention is made in view of the above point, and an object of the present invention is to provide an information processing apparatus, an information processing method, an information processing program, and a recording medium which can extract a category that is highly relevant to a keyword combination including a plurality of keywords.

Solution to the Problem

In order to achieve the above described problems, an invention described in claim 1 is characterized in that an information processing apparatus comprising: a first extraction means that extracts, from among a plurality of categories that are hierarchized in a tree structure, a category where the number of times when the category is specified as a search condition along with a first keyword is greater than or equal to a first threshold value; and a second extraction means that extracts, from among categories corresponding to descendants of the category extracted by the first extraction means, a category where the number of times when the category is specified as a search condition along with a second keyword is greater than or equal to a second threshold value as a category relevant to a combination of the first keyword and the second keyword.

It can be considered that a category where the number of times when the category is specified as a search condition along with a keyword is a category highly relevant to the keyword. Therefore, according to this invention, it is possible to extract a category highly relevant to a keyword. Further, there is a probability that a category highly relevant to the second keyword among descendant categories of a category highly relevant to the first keyword is a category highly relevant to the combination of the first keyword and the second keyword. Therefore, it is possible to extract a category highly relevant to a keyword combination including a plurality of keywords. Further, there may be a category that is not determined to be relevant to the second keyword among categories relevant to the first keyword. In this case, a category that could not be extracted when using only the second keyword can be extracted as a category relevant to the second keyword by extracting the category from among descendant categories of a category relevant to the first keyword.

Further, an aspect in which the number of keywords included in a combination is three or more belongs to a technical scope of the present invention. This is because when a category relevant to three or more keywords is extracted, a category relevant to the combination of the first keyword and the second keyword is required to be extracted.

An invention described in claim 2 is characterized in that the information processing apparatus according to claim 1, wherein a pair of the first extraction means and the second extraction means extracts the category in the same order as a specifying order of the keywords in the combination.

When a user combines and specifies a plurality of keywords as a search condition, there is a probability that the later the specifying order of a keyword, the narrower the concept represented by the keyword. On the other hand, the later the order of extracting a category by a keyword, the narrower the concept of categories from which a category highly relevant to the keyword is extracted. According to this invention, a highly relevant category is extracted in the same order as the specifying order of the keywords. Therefore, it is possible to match the concept represented by a keyword with the concept represented by a category included in a range in which a highly relevant category is extracted. Therefore, it is possible to increase a probability that a category highly relevant to a combination of keywords is extracted.

An invention described in claim 3 is characterized in that the information processing apparatus according to claim 2, wherein in a case that the combination could not be extracted by at least one of the first extraction means and the second extraction means, the pair of the first extraction means and the second extraction means extracts the category by changing an order of the keywords to extract the category.

According to this invention, it is possible to further increase the probability that a category highly relevant to a combination of keywords is extracted.

An invention described in claim 4 is characterized in that the information processing apparatus according to any one of claims 1 to 3, further comprising: a third extraction means that extracts, from among the plurality of categories, a category where the number of times when the category is specified as the search condition along with the first keyword and the second keyword is greater than or equal to a third threshold value; and a determination means that determines either of the category extracted by the second extraction means and the category extracted by the third extraction means to be the category relevant to the combination on the basis of a predetermined criterion.

According to this invention, it is possible to extract a category that is more reliable way as a category highly relevant to a combination of keywords from among categories extracted by a plurality of ways of method by defining an appropriate criterion.

An invention described in claim 5 is characterized in that the information processing apparatus according to claim 4, wherein the determination means determines the category whose position is deeper than the other in the tree structure from among the category extracted by the second extraction means and the category extracted by the third extraction means to be the category relevant to the combination.

The deeper the layer of the category is, the higher the specificity of a search target that belongs to the category is. Then, there is a probability that the higher the specificity of a search target in a category is, the higher the relevance between the category and the combination of keywords is. According to this invention, a category in a deeper layer is determined as a category highly relevant to the combination of keywords. Therefore, it is possible to extract a category that is more reliable as a category highly relevant to the combination of keywords.

An invention described in claim 6 is characterized in that the information processing apparatus according to any one of claims 1 to 5, wherein in a case that a magnitude of variation of the number of times when each of a plurality of categories in a sibling relationship in the tree structure is specified along with the keyword exceeds a variably set magnitude, each of the first extraction means and the second extraction means extracts, from among the plurality of categories in the sibling relationship, a category where the number of times is greater than or equal to the threshold value.

According to this invention, in a case that there is variation of the number of times when a category is specified as a search condition along with a keyword among a plurality of categories in a sibling relationship, it is possible to extract a category where the number of times when the category is specified as a search condition along with the keyword is greater than or equal to the threshold value. Therefore, it is possible to extract a category where the number of times when the category is specified is greater than that of the other categories among a plurality of categories in a sibling relationship as a category highly relevant to the keyword.

An invention described in claim 7 is characterized in that the information processing apparatus according to any one of claims 1 to 6, wherein each of the first extraction means and the second extraction means extracts, from among a plurality of categories in a sibling relationship in the tree structure, a category where the number of times when the category is specified along with the keyword is greater than or equal to the threshold value determined according to the number of categories in the sibling relationship.

According to this invention, it is possible to appropriately extract a category highly relevant to a keyword from among a plurality of categories in a sibling relationship according to the number of categories in the sibling relationship.

An invention described in claim 8 is characterized in that an information processing method performed by a computer, the method comprising: a first extraction step of extracting, from among a plurality of categories that are hierarchized in a tree structure, a category where the number of times when the category is specified as a search condition along with a first keyword is greater than or equal to a first threshold value; and a second extraction step of extracting, from among categories corresponding to descendants of the category extracted by the first extraction step, a category where the number of times when the category is specified as a search condition along with a second keyword is greater than or equal to a second threshold value as a category relevant to a combination of the first keyword and the second keyword.

An invention described in claim 9 is characterized in that an information processing program that causes a computer to function as: a first extraction means that extracts, from among a plurality of categories that are hierarchized in a tree structure, a category where the number of times when the category is specified as a search condition along with a first keyword is greater than or equal to a first threshold value; and a second extraction means that extracts, from among categories corresponding to descendants of the category extracted by the first extraction means, a category where the number of times when the category is specified as a search condition along with a second keyword is greater than or equal to a second threshold value as a category relevant to a combination of the first keyword and the second keyword.

An invention described in claim 10 is characterized in that a recording medium in which an information processing program is computer-readably recorded, the information processing program causing a computer to function as: a first extraction means that extracts, from among a plurality of categories that are hierarchized in a tree structure, a category where the number of times when the category is specified as a search condition along with a first keyword is greater than or equal to a first threshold value; and a second extraction means that extracts, from among categories corresponding to descendants of the category extracted by the first extraction means, a category where the number of times when the category is specified as a search condition along with a second keyword is greater than or equal to a second threshold value as a category relevant to a combination of the first keyword and the second keyword.

Effects of the Invention

There is a probability that a category highly relevant to the second keyword among descendant categories of a category highly relevant to the first keyword is a category highly relevant to the combination of the first keyword and the second keyword. Therefore, according to the present invention, it is possible to extract a category highly relevant to a keyword combination including a plurality of keywords. Further, there may be a category that is not determined to be relevant to the second keyword among categories relevant to the first keyword. In this case, a category that could not be extracted when using only the second keyword can be extracted as a category relevant to the second keyword by extracting the category from among descendant categories of the category relevant to a first keyword.

BRIEF DESCRIPTION OF THE DRAWINGS

FIG. 1 is a figure showing one example of a schematic configuration of a shopping system S according to one embodiment.

FIG. 2(*a*) is a figure showing a display example of a top page of an electronic mall, (b) is a figure showing a display example of a search keyword candidate display area 114.

FIG. 3 is a display example of a search result page.

FIG. 6 is a block figure showing one example of a schematic configuration of an electronic mall server 1 according to one embodiment.

FIG. 7(*a*) is a figure showing one example of content registered in a member information DB 12*a*, (b) is a figure showing one example of content registered in a product information DB 12*b*, (c) is a figure showing one example of content registered in a genre information DB 12*c*, (d) is a figure showing one example of content registered in a keyword DB 12*d*, (e) is a figure showing one example of content registered in a relevant keyword DB 12*e*, (f) is a figure showing an example of content registered in a query log DB 12*f*, (g) is a figure showing one example of content registered in a number of times of specifying information DB 12*g*.

FIGS. 8(*a*) and 8(*b*) are graphs showing a specifying probability for each genre of level 1.

FIG. 10(*a*) is a figure showing one example of an extraction result of genres relevant to a combination of search keywords of "digital camera AAA company", (b) is a figure showing one example of an extraction result of genres relevant to a keyword of "digital camera", (c) is a figure showing one example of an extraction result of genres relevant to a keyword of "AAA company".

FIG. 13(*a*) is an extraction example of a case in which an extraction process is performed in a specifying order of search keywords, (b) is an extraction example of a case in which an extraction process is performed by changing an extracting order of genres.

FIG. 14(*a*) is a figure showing one example of an extraction result of a case in which a genre relevant to a combination of search keywords "X Y" is extracted by a method described in a third section, (b) is a figure showing one example of a state in which a genre relevant to the combination of search keywords "X Y" is extracted by a method described in a fourth section.

FIG. 24 is a flowchart showing a process example of a process on timing of search keyword candidate request reception of the system control unit 14 of the electronic mall server 1 according to one embodiment.

FIG. 25 is a figure showing one example of content registered in a purchase history DB 12h.

MODES FOR CARRYING OUT THE INVENTION

Figure 4A:
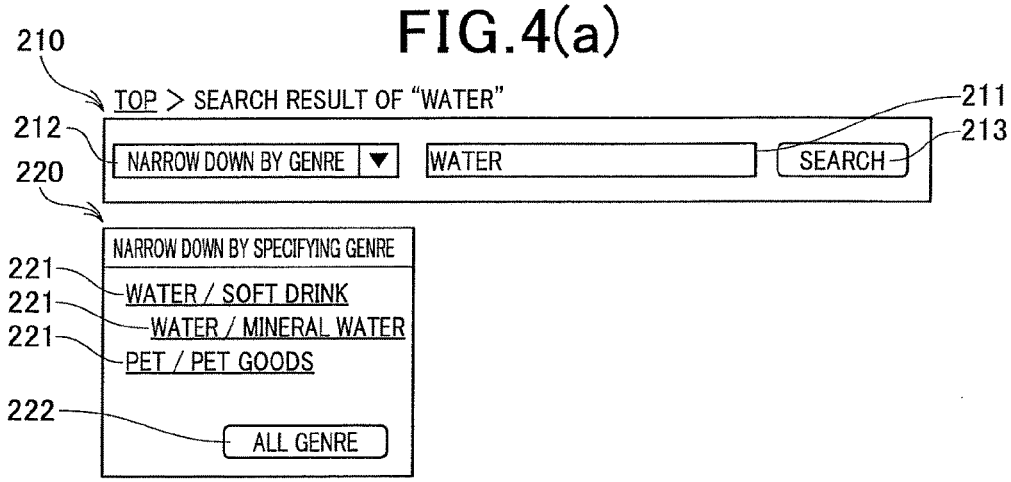
FIGS. 4(*a*) to 4(*c*) are figures showing a display example of genre links 221 in a genre specifying area 220.

Hereinafter, embodiment of the present invention will be described in detail with reference to the drawings. The embodiment described below is an embodiment in which the present invention is applied to a shopping system.

[1. Schematic Configuration and Function of Shopping System]

[1-1. Configuration of Shopping System]

First, a configuration of a shopping system S according to the present embodiment will be described with reference to FIG. 1. FIG. 1 is a figure showing one example of a schematic configuration of the shopping system S according to the present embodiment.

As shown in FIG. 1, the shopping system S includes an electronic mall server 1 and a plurality of user terminals 2. Further, the electronic mall server 1 and each user terminal 2 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway.

The electronic mall server 1 (an example of an information processing apparatus of the present invention) is a server apparatus that performs various processes related to an electronic mall from which products can be purchased. A user can purchase a desired product from a desired shop by using the electronic mall. For example, the electronic mall server 1 transmits a web page of the electronic mall and performs processes related to a search and a purchase of a product or the like according to a request from the user terminal 2.

The user terminal 2 is a terminal apparatus of a user who uses the electronic mall. The user terminal 2 receives a web page from the electronic mall server 1 and displays the web page by accessing the electronic mall server 1 on the basis of an operation from a user. The user terminal 2 includes a CPU, a memory, an operation unit that receives a user operation, a display that displays information on a screen and the like. Further, in the user terminal 2, software such as a browser and an email client is installed. For example, a personal computer, a PDA (Personal Digital Assistant), a mobile information terminal such as a smartphone, a mobile phone or the like is used as the user terminal 2.

[1-2. Specification of Search Condition]

Next, a search condition used to search for products in the electronic mall and a web page for specifying the search condition will be described with reference to FIG. 2.

In the electronic mall, when searching for products, it is possible to specify a keyword, a genre of the products, and the like as the search condition. The keyword specified as the search condition is referred to as a "search keyword". A user can specify both of the search keyword and the genre or either of the two as the search condition. Further, the user can combine and specify a plurality of search keywords. When a plurality of keywords are combined and specified, the specified keywords are referred to as a "combination of keywords".

For example, the genre (an example of a category in the present invention) is a range to which products of similar type, characteristics, usage, and the like belong when products are divided by type, characteristics, usage, and the like. The genres of products are hierarchically defined by a tree structure. Specifically, each node in the tree structure corresponds to a genre. The depth of the node corresponds to a level (a depth of a layer in which the node is located in the tree structure) of the genre corresponding to the node. The depth of the node is a distance from a node (hereinafter referred to as a "root node") located at the root. In the tree structure, a genre called a genre top is defined for the root node for convenience. The greater the value of the level is, the deeper the depth of the layer is. The smaller the value of the level is, the shallower the depth of the layer is. The genre top indicates a state in which the user specifies no genre. The genre top is a genre of level 0. A genre corresponding to a child node of the genre top is a genre of level 1. The genre of level 1 is substantially the highest genre that can be specified by the user. As the genres of level 1, for example, there are "water/soft drink", "beauty/cosmetic/perfume water", "pet/pet goods", "lady's fashion", "men's fashion" and the like. For each genre of level 1, a genre corresponding to a child node is defined as a genre of level 2. Here, a genre c2 corresponding to a child node of a certain genre c1 is referred to as a "child genre" of the genre c1. The child genre is also referred to as a sub-genre. Further, at this time, the genre c1 is referred to as a "parent genre" of the genre c2. The child genre is a range to which similar products belong when the parent genre is further divided into a plurality of genres. Therefore, the child genre belongs to the parent genre. A genre corresponding to a descendant node of a certain genre is referred to as a "descendant genre". For example, a genre c3 is assumed to be a child genre of the genre c2. In this case, the genres c2 and c3 are descendant genres of the genre c1. When a certain genre includes a child genre, a plurality of child genres are normally defined in the genre. For example, as the child genres of "water/mineral water", for example, "water/mineral water", "soft drink", "coffee/cocoa" or the like are defined. Genres that belong to the same parent genre are referred to as sibling genres. In other words, all genres in a sibling relationship with a certain genre c4 are sibling genres of the genre c4. For example, the "water/mineral water", the "soft drink", and the "coffee/ cocoa" are sibling genres to each other. For genres at level 2 or lower, child genres are defined as needed.

As a web page for specifying a search condition, for example, there are a top page and a search result page. The top page is a web page located at the highest level in the electronic mall. The search result page is a web page showing a search result of products. Further, the search result page is a web page for specifying a search condition to narrow down and search for products from searched products (hereinafter referred to as a "narrowing-down condition") and re-specifying the search condition. If the user specifies a search condition in the top page, products are searched for by the electronic mall server 1 using the specified search condition and the search result page displaying a result of the search is displayed by the user terminal 2. If the user specifies a search condition in the search result page, products are searched for again by the electronic mall server 1 using the specified search condition and a new search result page displaying a result of the search is displayed by the user terminal 2.

If the user specifies a search condition in the search result page, there is a case that the search condition specified in the top page or the search result page which were displayed immediately before the above search result page (hereinafter, which are referred to as a "previous page") are inherited. For example, it is assumed that a search keyword k1 is specified as a search condition in the top page or the search result page. Then, a search result page that displays a search result obtained by the search keyword k1 is displayed. Here, if the user specifies the genre c1 as a search condition, it is assumed that the search keyword k1 and the genre c1 are specified as a search condition. Then, a new search result page that displays a search result obtained by the search keyword k1 and the genre c1 is displayed. In other words, it is assumed that the user specifies the genre c1 as a narrowing-down condition. On the other hand, it is assumed that the genre c2 is specified as a search condition in the top page or the search result page. Then, a search result page that displays a search result obtained by the genre c2 is displayed. Here, if the user specifies the search keyword k2, it is assumed that the genre c2 and the search keyword k2 are specified as a search condition. Then, a new search result page that displays a search result obtained by the genre c2 and the search keyword k2 is displayed. In other words, it is assumed that the user specifies the search keyword k2 as a narrowing-down condition. In the description below, a case in which a search keyword or a genre is specified as a search condition in the previous page includes a case in which the user explicitly specifies the search condition by inputting a search keyword or selecting a genre in the previous page and a case in which the search condition is specified by inheritance of the search condition.

FIG. 2(a) is a figure showing a display example of the top page of the electronic mall. As shown in FIG. 2(a), the top page includes a search condition setting area 110, a genre list display area 120, and the like.

The search condition setting area 110 includes a keyword input field 111, a genre selection menu 112, a search button 113, and the like. The keyword input field 111 is an input area for inputting one or a plurality of search keywords. A user can input a plurality of search keywords by inputting space as a separator between the search keywords. Thereby, the user can specify a plurality of search keywords as a search condition. The genre selection menu 112 is a pull-down menu for selecting a genre to be specified as a search condition from among genres of level 1. The search button 113 is a button for specifying the search keyword input in the keyword input field 111 and the genre selected in the genre selection menu 112 as a search condition. If the search button 113 is selected in a case that the search keyword is input, the search keyword is specified as a search condition and a search is performed using the search condition. Further, if the search button 113 is selected in a case that the genre is selected, the genre is specified as a search condition and a search is performed using the search condition. The user can specify both of the search keyword and the genre or either of the two as a search condition by an operation to the search condition setting area 110.

FIG. 2(b) is a figure showing a display example of the search keyword candidate display area 114. The keyword input field 111 corresponds to a keyword suggestion function. The keyword suggestion function is a function to display candidates of a search keyword and make the candidates be able to be specified as a search keyword. Specifically, when the user starts inputting a search keyword in the keyword input field 111, the search keyword candidate display area 114 is displayed immediately below the keyword input field 111 as shown in FIG. 2(b). Candidates of the search keyword are displayed as a list in the search keyword candidate display area 114. The keywords displayed as the candidates are search keywords forward coinciding with a character string input in the keyword input field 111. In a case that kana letters are input in the keyword input field 111, the keywords displayed as the candidates are keywords forward coinciding with the input kana letters.

For example, when "デ (d)" is input first, for example, "ディーゼル (diesel)", "デニム (denim)", "デッキシューズ (deck shoes)", and "デジタルフォトフレーム (digital photo frame)" or the like are displayed in the search keyword candidate display area 114. Thereafter, if "ジタル (igital)" is input, it becomes a state in which "デジタル (digital)" is input in the keyword input field 111. In this case, in the search keyword candidate display area 114, for example, keywords such as "デジタルフォトフレーム (digital photo frame)", "デジタルカメラ (digital camera)", "デジタルスケール (digital scale)", "デジタル腕時計 (digital watch)", and "デジタルカメラ本体 (digital camera main body)" are displayed in the search keyword candidate display area 114. A combination of a plurality of keywords such as the "デジタル腕時計 (digital watch)" may be displayed as a candidate. The upper limit of the number of keywords that can be displayed in the search keyword candidate display area 114 is set in advance. If the user selects any one of the keywords displayed in the search keyword candidate display area 114, the selected keyword is specified as a search condition and a search is performed using the search condition. At this time, if a genre is selected in the genre selection menu 112, the genre is also specified as the search condition.

In the genre list display area 120, a list of genres is displayed. The genres displayed in the genre list display area 120 are an integration of a plurality of genres of level 1. If the user selects any one of the genres displayed in the genre list display area 120, a list of level 1 genres that belong to the selected genre is displayed. Further, if the user selects any of the displayed level 1 genres, the selected genre is specified as a search condition and a search is performed using the search condition.

FIG. 3 is a screen display example of the search result page. As shown in FIG. 3, the search result page includes a search condition setting area 210, a genre specifying area 220, a relevant keyword display area 230, a search result display area 240, and the like.

The search condition setting area 210 includes a keyword input field 211, a genre selection menu 212, a search button 213, and the like. Functions of the keyword input field 211, the genre selection menu 212, and the search button 213 are the same as those of the keyword input field 111, the genre selection menu 112, and the search button 113. In a case that a search keyword is specified as a search condition in the previous page, the search keyword is input in the keyword input field 211 in advance. When a search keyword is input in the keyword input field 211, if the search button 213 is selected, the search keyword is specified as a search condition and a search is performed using the search condition. Here, in a case that a genre was specified as a search condition in the previous page, the genre is assumed to be also specified as the search condition along with the search keyword.

The genre specifying area 220 includes one or more genre links 221. The genre link 221 is a link to specify a genre as a narrowing down condition and indicates a name of the genre to be specified. If the user selects any one of the genre links 221 from the genre specifying area 220, a genre corresponding to the selected genre link 221 is specified as a search condition and a search is performed using the search condition. Here, in a case that a search keyword was specified as a search condition in the previous page, the search keyword is assumed to be also specified as the search condition along with the genre. In a case that a genre is specified as a search condition in the previous page, genre links 221 corresponding to the child genre of the specified genre are displayed in the genre specifying area 220. On the other hand, in a case that only a search keyword is specified as a search condition in the top page and thereby the search result page is displayed, genre links 221 corresponding to the genres of level 1 are displayed in the genre specifying area 220 in the search result page.

The relevant keyword display area 230 is displayed in a case that a search keyword was specified as a search condition in the previous page. The relevant keyword display area 230 includes relevant keyword links 231. The relevant keyword link 231 is a link to re-specify a keyword (hereinafter referred to as a "relevant keyword"), which is relevant to the search keyword specified in the previous page, as a search condition to search for products and indicates a relevant keyword to be specified. Examples of a relevant keyword of a certain search keyword include a synonym of the search keyword, a word that means things relevant to things meant by the search keyword, words that include the search keyword and the like. There is a case that a combination of keywords may be displayed as a relevant keyword. The upper limit of the number of relevant keywords that can be displayed in the search keyword candidate display area 114 is set in advance. If the user selects any one of the relevant keyword links 231 from the relevant keyword display area 230, a relevant keyword corresponding to the selected relevant keyword link 231 is specified as a search keyword and a search is performed using this search condition. Here, in a case that a genre is specified as a search condition in the previous page, the genre is assumed to be also specified as the search condition along with the search keyword.

In the search result display area 240, a list of information of searched products is displayed. Specifically, in the search result display area 240, corresponding product information 241 including an image of a searched product, a product name, a price, and a shop name is displayed for each product. The corresponding product information 241 is displayed according to a display order of the searched products. Specifically, the higher the display order is, the higher the display position of the corresponding product information 241 in the search result display area 240 is. Further, the upper limit of the number of pieces of the corresponding product information 241 whose information can be displayed in the search result display area 240 is determined. For example, when the upper limit of the number is 30, the corresponding product information 241 of products of the display order of the first to the 30th places is displayed in the search result display area 240. Here, if the user selects the link displayed as "Next 30 items", a new search result page is displayed on the screen of the user terminal 2 and the corresponding product information 241 of the display order of the 31st to the 60th places is displayed in the search result display area 240 in the search result page. The display order of the corresponding product information 241 is determined based on a listing score. The listing score is a value representing an evaluation determined for a product or a product page of the product. It is shown that the higher the listing score is, the higher the evaluation is. Then, the higher the listing score of a product is, the higher the display order of the corresponding product information 241 of the product is. For example, it may be set so that the greater the number of accesses to (the number of times of browsing of) the product page is, the higher the listing score is, or the greater the number of the products that are purchased is, the higher the listing score is. If the user selects any one piece of the corresponding product information 241 from the pieces of the corresponding product information 241 displayed in the search result display area 240, a product page is displayed on the screen. The product page is a web page in which detailed information of a product corresponding to the selected corresponding product information 241 is displayed. The user can purchase a product whose information is displayed in the product page by performing a purchase operation in the product page.

[1-3. Extraction of Combination of Search Keyword and Genre, Use of Extraction Result]

The electronic mall server 1 extracts a search keyword and a genre that is highly relevant to the search keyword to improve convenience of a user in a search result page. Further, the electronic mall server 1 extracts a combination of search keywords and a genre that is highly relevant to the combination.

The genre that is highly relevant to the search keyword is a genre where the number of times when the genre is specified along with the search keyword as a search condition so far is large. The number of times is referred to as "the number of times of specifying". An example of the genre that is highly relevant to the combination of search keywords is a genre where the number of times when the genre is specified along with the search keywords included in the combination as a search condition so far is large. When a user specifies a search condition, a search query is transmitted from the user terminal 2 to the electronic mall server 1. The search query is a message indicating a request of a product. When search keyword(s) is/are specified as a search condition, the specified one or more search keywords are set in the search query as search keyword information. Further, when a genre is specified as a search condition, a genre ID is set in the search query. The genre ID is identification information of the genre. When the electronic mall server 1 receives the search query from the user terminal 2, the electronic mall server 1 records a query log. The query log is a history of received search queries. The electronic mall server 1 calculates the number of times of specifying of each combination of search keyword and genre that are specified as a search condition on the basis of the query log.

The number of times of specifying includes the number of times when the user explicitly specifies both search keyword and genre at the same time, and the number of times when the user specified either of search keyword and genre in the previous page and specifies the other as a narrowing down condition in a search result page displayed accordingly and thereby both search keyword and genre are assumed to be specified. In a case that the user specifies a search keyword and a genre, for example, it is considered that the user thinks that there are products which the user wants to search for by the specified search keyword among products in the specified genre. In other words, the user thinks that there is an association between the specified search keyword and genre. This is because the products which the user tries to search for are products that satisfy a search condition indicated by the specified search keyword and genre. Therefore, it can be said that the greater the number of times of specifying of a certain combination of a search keyword and a genre is, the higher the relationship between the search keyword and the genre is. If a search keyword and a genre that is highly relevant to the search keyword are associated with each other, there is a case that it may be possible to improve convenience of the user when performing a search.

Whether or not the number of times of specifying of a certain combination of a search keyword k and a genre c is great is determined based on the number of times of specifying of a combination of the search keyword k and sibling genres of the genre c. It can be said that the greater the relative number of times of specifying of the genre c is, the higher the relationship between the genre c and the search keyword k as compared with other genres is.

A relevance score is determined for a combination of a search keyword and a genre, which is extracted because the search keyword and the genre are highly relevant to each other. The relevance score is a value indicating a degree of relationship between a search keyword and a genre. It is shown that the higher the relevance score is, the higher the degree of relationship between the search keyword and the genre is.

Details of an extraction method of a combination of a search keyword and a genre that are highly relevant to each other will be described later. A use of an extraction result of the combination of a search keyword and a genre will be described below.

A first use is display control of the genre links 221 in the genre specifying area 220 in the search result page. Specifically, in a case that a search keyword was specified as a search condition in the previous page, the genre links 221 of the genres that are highly relevant to the specified search keyword are preferentially displayed in the genre specifying area 220. The higher the relevance score between the selected search keyword and the genre is, the higher the display order of the genre link 221 in the genre specifying area 220 is. In a case that the genre links 221 are displayed as a series of genres, it is considered that the user selects a genre link 221 of a genre which the user thinks to be relevant to the search keyword specified previously. Therefore, the higher the relationship between the selected search keyword and the genre is, the higher the probability that the user specifies the genre as a narrowing down condition is. Therefore, the user can easily find out the genre to be specified as a narrowing down condition from the genre specifying area 220.

Figure 4B:
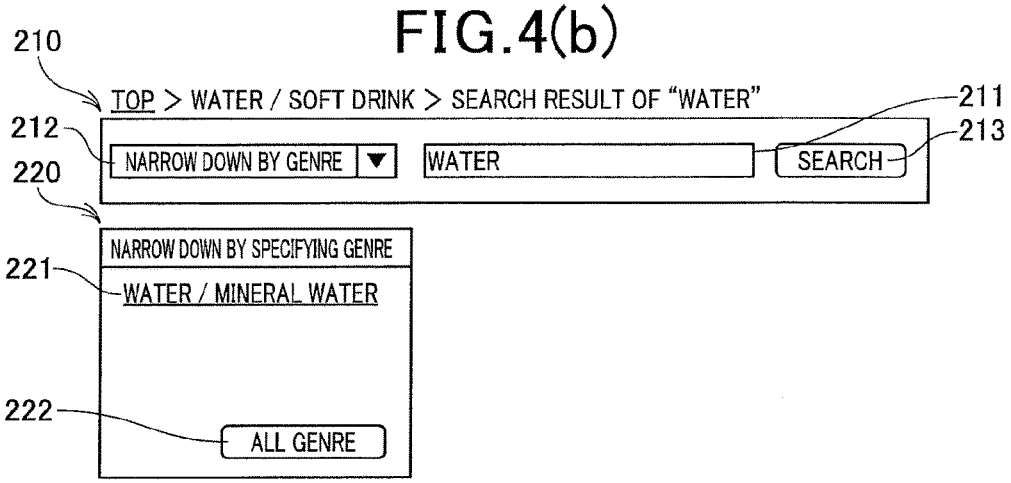
Figure 4C:
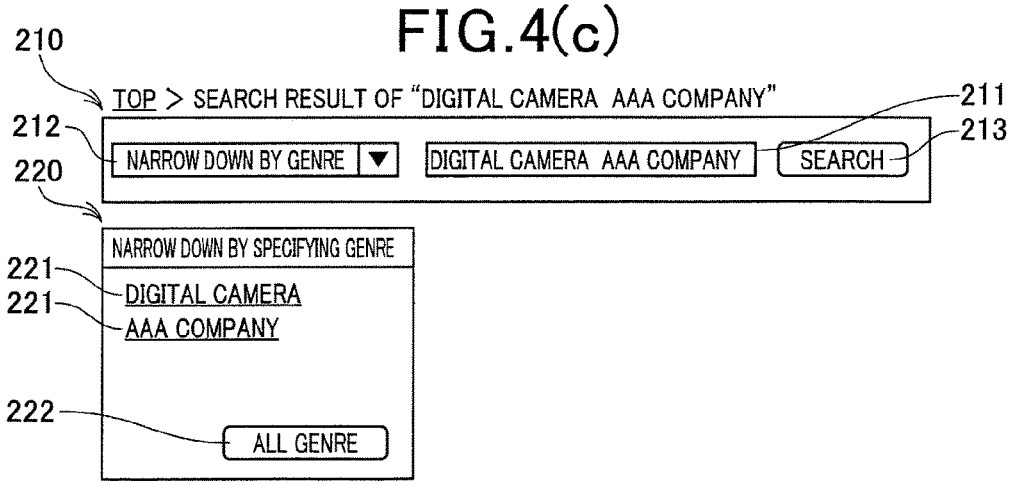

FIGS. 4(*a*) to 4(*c*) are figures showing a display example of the genre links 221 in the genre specifying area 220. For example, it is assumed that a search keyword "water" is highly relevant to each of "water/soft drink", "water/mineral water", and "pet/pet goods". In this case, if the user specifies "water" as a search keyword on the top page, as shown in FIG. 4(*a*), in the genre specifying area 220 in the search result page, the genre links 221 of "water/soft drink", "water/mineral water", and "pet/pet goods" are displayed. The "water/soft drink" is displayed higher than the "pet/pet goods", so that it is known that the relationship between the "water" and the "water/soft drink" is higher than that between the "water" and the "pet/pet goods". Further, the "water/mineral water" is displayed below the "water/soft drink". At this time, the genre links 221 of the "water/soft drink" and the "water/mineral water" are displayed in a form indicating that the "water/soft drink" and the "water/mineral water" are in a parent-child relationship. In the genre specifying area 220, an all genre display button 222 is further displayed. If the user selects the all genre display button 222, the genre links 221 of all genres of level 1 are displayed in the genre specifying area 220. In this case, display positions of the genre links 221 of the "water/soft drink" and the "pet/pet goods" do not change. Further, the number of products belonging to a genre indicated by the genre link 221 may be displayed beside each genre link 221. In other words, the number of products that are searched for in a case that the genre indicated by the genre link 221 is specified as a search condition may be displayed. It is assumed that the number of products belonging to the "pet/pet goods" is greater than the number of products belonging to the "water/soft drink" in the example of FIG. 4(*a*). Even if that were the case, the "water/soft drink" that is more highly relevant to the search keyword "water" than the "pet/pet goods" is displayed higher than the "pet/pet goods".

Here, if the user selects the genre link 221 of the "water/soft drink", a new search result page is displayed. In the genre specifying area 220 in this search result page, as shown in FIG. 4(*b*), the genre link 221 of the "water/mineral water" is displayed from among the child genres of the "water/soft drink". Here, if the user selects the all genre display button 222, the genre links 221 of all the child genres of the "water/soft drink" are displayed in the genre specifying area 220.

For example, it is assumed that a relationship between a keyword combination of "digital camera AAA company" and a genre of "digital camera" is high. Further, it is assumed that a relationship between the keyword combination of "digital camera AAA company" and a genre of "AAA company" that is a child genre of the "digital camera" is high. The "AAA company", which is a child genre of the "digital camera", is a genre indicating that the maker of the digital camera is the AAA company. In this case, if the user specifies "digital camera AAA company" as a search keyword on the top page, as shown in FIG. 4(*c*), in the genre specifying area 220 in the search result page, the genre link 221 of the "digital camera" and the genre link 221 of the "AAA company" that is a child genre of the "digital camera" are displayed. In this way, genres where the genre link 221 is displayed in the genre specifying area 220 vary depending on the search keyword specified in the previous page.

A second use is display control of search keyword candidates of the keyword suggestion function in the keyword input field 211 in the search result page. This is performed when a genre was specified as a search condition in the previous page. Specifically, keywords highly relevant to the genre specified in the previous page are preferentially displayed as the search keyword candidates from among keywords forward coinciding with a character string input in the keyword input field 211 by the user. The higher the relevance score between the specified genre and a keyword is, the higher the display order of the keyword is. The higher the relationship between the specified genre and a search keyword is, the higher the probability that the user specifies the search keyword as a narrowing down condition is. Therefore, the user can easily specify a search keyword used as a narrowing down condition.

In the keyword input field 211, a keyword that includes an input character string (including a keyword that includes the input character string in the kana indicating the pronunciation of it) may be displayed. Therefore, for example, a keyword backward coinciding with the input character string may be displayed.

Figure 5A:
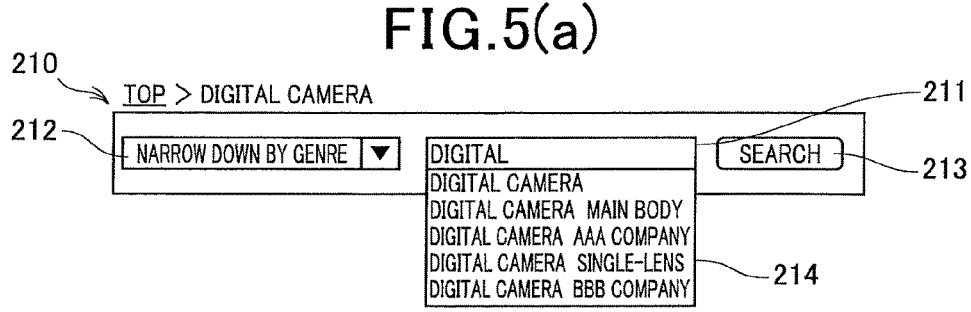
FIG. 5(*a*) is a figure showing a display example of keywords in a search keyword candidate display area 214, (b) is a figure showing a display example of relevant keyword links 231 in a relevant keyword display area 230.
Figure 5B:
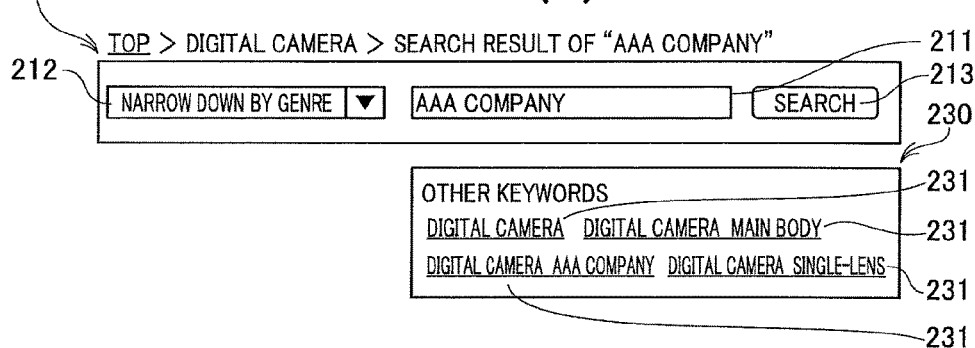

FIG. 5(*a*) is a figure showing a display example of keywords in a search keyword candidate display area 214. When the user specifies, for example, "digital camera" as a genre on the top page, the search result page is displayed. If the user inputs, for example, "digital camera" in the keyword input field 211 in the search result page, as shown in FIG. 5(*a*), the search keyword candidate display area 214 is displayed immediately below the keyword input field 211. In the search keyword candidate display area 214, for example, "digital camera", "digital camera main body", "digital camera AAA company", "digital camera single-lens", "digital camera BBB company", and the like are displayed as search keyword candidates. In other words, these keywords are keywords highly relevant to the genre of "digital camera". On the other hand, "digital photo frame", "digital scale", and "digital watch" are not displayed as the search keyword candidates. These keywords are keywords whose relationship with the genre of "digital camera" is low. Even when the user inputs the same character string in the keyword input field 211, the keywords displayed in the search keyword candidate display area 214 vary depending on the genre specified in the previous page.

Further, in a case that the user inputs a character string in the keyword input field 211 by selecting a check box corresponding to a certain genre from the genre selection menu 212, keywords highly relevant to the selected genre may be displayed in the search keyword candidate display area 214 from among keywords including the input character string. Also in the top page, in a case that the user inputs a character string in the keyword input field 111 by selecting a certain genre from the genre selection menu 112, keywords highly relevant to the selected genre may be displayed in the search keyword candidate display area 114 from among keywords including the input character string.

A third use is display control of the relevant keyword links 231 in the relevant keyword display area 230. This is performed when a search keyword and a genre were specified as a search condition in the previous page. Specifically, in the relevant keyword display area 230, the relevant keyword links 231 of relevant keywords highly relevant to the genre specified in the previous page among relevant keywords of the search keyword specified in the previous page are preferentially displayed. The higher the relevance score between the specified genre and a relevant keyword is, the higher the display order of the relevant keyword link 231 in the relevant keyword display area 230 is. The higher the relationship between the specified genre and a relevant keyword is, the higher the probability that the user specifies the relevant keyword as a narrowing down condition is. Therefore, the user can easily specify a relevant keyword as a search keyword.

FIG. 5(*b*) is a figure showing a display example of the relevant keyword links 231 in the relevant keyword display area 230. For example, if the user specifies "AAA company" as the search keyword and specifies "digital camera" as the genre on the top page, as shown in FIG. 5(*b*), in the relevant keyword display area 230 in the search result page, for example, the relevant keyword links 231 of keywords of "digital camera", "digital camera main body", "digital camera AAA company", and "digital camera single-lens" are displayed. In other words, these keywords are keywords highly relevant to the "digital camera" among the relevant keywords of the "AAA company". Even in a case that the user specifies the same search keyword in the previous page, the relevant keywords whose relevant keyword link 231 is displayed in the relevant keyword display area 230 vary depending on the genre specified in the previous page.

A fourth use is adjustment of the listing score for determining the display order of the corresponding product information 241 of each product in the search result display area 240. This is performed when a search keyword is specified in the previous page. Specifically, the listing scores of products of a genre highly relevant to the search keyword among products searched by the search keyword specified in the previous page are raised. However, in a case that a genre is specified as a search condition in the previous page, only the listing scores of products belonging to descendant genres of the specified genre are raised. Thereby, there is a possibility that the display order of products of a genre highly relevant to the search keyword goes up. Therefore, the user can easily find out products highly relevant to the search keyword from the search result display area 240. Further, the listing scores of products other than the products of the genre highly relevant to the search keyword may be reduced.

For example, if the user specifies "digital camera AAA company" as a search keyword on the top page, a list of information of products searched by the "digital camera AAA company" in the search result display area 240 in the search result page. At this time, the listing scores of products of the genre of "digital camera" that is highly relevant to the "digital camera AAA company" and products of the genre of "AAA company" that is a child genre of the "digital camera" are raised.

[2. Configuration of Electronic Mall Server]

Next, a configuration of the electronic mall server 1 will be described with reference to FIGS. 6 and 7.

FIG. 6 is a block figure showing one example of a schematic configuration of the electronic mall server 1 according to the present embodiment. As shown in FIG. 6, the electronic mall server 1 includes a communication unit 11, a storage unit 12, an I/O interface 13, and a system control unit 14. The system control unit 14 and the I/O interface 13 are connected through a system bus 15.

The communication unit 11 connects to the network NW and controls communication state with the user terminals 2 and the like.

The storage unit 12 includes, for example, a hard disk drive and the like. In the storage unit 12, databases such as a member information DB 12*a*, a product information DB 12*b*, a genre information DB 12*c*, a keyword DB 12*d*, a relevant keyword DB 12*e*, a query log DB 12*f*, a number of times of specifying DB 12*g* are constructed.

FIG. 7(*a*) is a figure showing one example of content registered in the member information DB 12*a*. In the member information DB 12*a*, member information related to users registered in the shopping system S as a member is registered. Specifically, in the member information DB 12a, user attributes such as a user ID, a password, a nickname, a name, a date of birth, a gender, a postal code, an address, a phone number, an email address, and the number of held points are registered in association with each user. The user ID is identification information of the user. The number of held points is the number of points held by the user. These points can be used as purchase money, assuming that the points have the same value as money when the user purchases a product in the electronic mall. Further, when the user purchases a product in the electronic mall, for example, points according to the purchase money are given to the user.

FIG. 7(*b*) is a figure showing one example of content registered in the product information DB 12b. In the product information DB 12b, product information related to the products sold in the electronic mall is registered. Specifically, in the product information DB 12b, attributes of products such as a product ID, a shop ID, a product code, a genre ID, a product name, a URL (Uniform Resource Locator) of a product image, a product description, and a product price are registered in association with each product sold by a shop. The product ID is identification information of product for a shop or the like to manage the product sold by the shop. The shop ID indicates a shop which sells the product. The product code is a code number to identify the product. Examples of the product code include, for example, a JAN code (Japanese Article Number Code) or the like. The genre ID is a genre ID of a genre to which the product belongs. In a search using a search keyword, for example, products where at least either of the product name and the product description includes the search keyword are searched for.

FIG. 7(*c*) is a figure showing one example of content registered in the genre information DB 12c. In the genre information DB 12c, genre information related to genres of products is registered. Specifically, in the genre information DB 12c, attributes of a genre such as a genre ID, a genre name, a level of the genre, a parent genre ID, and a child genre ID list are registered in association with each genre. The genre information, for example, is set by an administrator of the electronic mall. The parent genre ID is a genre ID of the parent genre of the genre defined by the genre information. The child genre ID list is a list of genre IDs of child genres of the genre defined by the genre information. The child genre ID list is set when the genre defined by the genre information has child genre. The genre information of the genre top is also registered in the genre information DB 12c. The genre ID of the genre top, for example, is set to predetermined identification information. Thereby, it is possible to identify which genre information is the top genre information.

FIG. 7(*d*) is a figure showing an example of content registered in the keyword DB 12d. In the keyword DB 12d, a plurality of keyword information to be candidates of a search keyword in the keyword suggestion function is registered. In the keyword information, one or more keywords are set. For example, search keywords whose number of times of being specified is greater than or equal to a predetermined number of times among search keywords specified by each user as a search condition during a predetermined period of time are registered in the keyword DB 12d.

FIG. 7(*e*) is a figure showing one example of content registered in the relevant keyword DB 12e. In the relevant keyword DB 12e, a plurality of combinations of keyword information and relevant keyword information are registered. In the relevant keyword information, either of one keyword relevant to one or more keywords set in the keyword information and a combination of keywords relevant to one or more keywords indicated by the keyword information is set. As an extraction method of a relevant keyword or a combination of relevant keywords, for example, a known method can be used. Therefore, detailed description of the extraction method of relevant keyword is omitted.

FIG. 7(*f*) is a figure showing an example of content registered in the query log DB 12f. In the query log DB 12f, a query log is registered. Specifically, in the query log DB 12f, a reception date and time, search keyword information, a genre ID, a gender, an age, a prefecture, and the like are registered in association with every time a search query is received. The reception date and time is a date and time when the search query is received. In the search keyword information, either of one search keyword specified as a search condition and a combination of search keywords specified as a search condition is set. The genre ID is a genre ID of a genre specified as a search condition. The gender, the age, and the prefecture are attributes of a user who uses the user terminal 2 that transmits the search query. In other words, the gender and age of the user, and the prefecture where the user lives are registered as attributes of the user who requests the search. The gender, the age, and the prefecture are registered in a case that the user who requests the search logs in to the electronic mall.

FIG. 7(*g*) is a figure showing one example of content registered in the number of times of specifying information DB 12g. In the number of times of specifying information DB 12g, number of times of specifying information related to the number of times when a combination of a search keyword and a genre is specified as a search condition is registered. Specifically, in the number of times of specifying information DB 12g, one or more combinations of a genre ID and the number of times of specifying are registered in association with search keyword information. The genre ID is a genre ID of a genre that is specified as a search condition along with one or more search keywords set in the search keyword information. The number of times of specifying is the number of times when the genre is specified as a search condition along with one or more search keywords set in the search keyword information.

Next, other information stored in the storage unit 12 will be described. The storage unit 12 stores various data such as an HTML (Hyper Text Markup Language) document for displaying a Web page, an XML (Extensible Markup Language) document, image data, text data, and an electronic document. Further, the storage unit 12 stores various setting values set by an administrator or the like.

Further, the storage unit 12 stores various programs such as an operating system, a WWW (World Wide Web) server program, a DBMS (Database Management System), an electronic commerce management program, and a product evaluation program. The electronic commerce management program is a program for performing processes related to the electronic mall, such as extracting a combination of a search keyword and a genre that are highly relevant to each other, generating a search result page, searching for products, and ordering a product. The product evaluation program is a program for determining the listing score of each product. The listing score of each product is updated at any time by the product evaluation program and, for example, the listing score is associated with a product ID and stored in the storage unit 12. The system control unit 14 can acquire the listing score from the product evaluation program through, for example, a dedicated API (Application Programming Interface). Further, the various programs may be acquired, for example, from another server apparatus or the like through the network NW or may be recorded in a recording medium such as a DVD (Digital Versatile Disc) and read through a drive device.

The I/O interface 13 performs interface processing among the communication unit 11 and the storage unit 12, and the system control unit 14.

The system control unit 14 includes a CPU 14a, a ROM (Read Only Memory) 14b, a RAM (Random Access Memory) 14c, and the like. Further, in the system control unit 14, the CPU 14a reads out and executes various programs, so that the system control unit 14 functions as a first extraction means, a second extraction means, a third extraction means, and a determination means.

Further, the electronic mall server 1 may include a plurality of server apparatuses. For example, a server apparatus that extracts a combination of a search keyword and a genre that are highly relevant to each other, a server apparatus that performs processing such as searching for products and ordering a product, a server apparatus that transmits a web page according to a request from the user terminal 2, a server apparatus that manages databases, and the like may be connected to each other by a LAN or the like.

[3. Extraction Method of Combination of Search Keyword and Genre that are Highly Relevant to Each Other]

Next, the details of the extraction method of a combination of a search keyword and a genre that are highly relevant to each other will be described with reference to FIGS. 8, 9, and 26.

Here, a search keyword to be able to be extracted is defined as k. Further, for convenience of description, it is assumed that a genre that is highly relevant to the keyword k is extracted from among the genres of level 1. A set of the genres of level 1 is defined as G. First, the system control unit 14 determines whether there can be a genre that is highly relevant to the keyword k among the genres of level 1. Specifically, a degree of variation (deviation) of the number of times when a genre is specified along with the keyword k as a search condition is determined for each genre. The smaller the variation of the number of times of specifying of each genre is, that is to say, the higher the uniformity is, the smaller the differences among the relationships between each genre and the keyword k is. The fact that the differences among the relationships are small means that there is no genre that is especially highly relevant to the keyword k among the genres of level 1. Therefore, in a case that the magnitude of the variation of the number of times of specifying exceeds a certain magnitude that is set variably, the system control unit 14 determines that there is a genre that is highly relevant to the keyword k among the genres of level 1. For the determination, for example, entropy is used. When the entropy is E, E is calculated by the following formula 1.

[Mathematical Formula 1]

$$E = \sum_{g \in G} p(g) \log p(g) \quad \text{Formula 1}$$

In the formula 1, p(g) is a probability that a genre g is specified (hereinafter referred to as "specifying probability") when the keyword k is specified as a search condition along with a genre of level 1. A specifying probability p(c) of a certain genre c included in the genres of level 1 is calculated by the following formula 2.

[Mathematical Formula 2]

$$p(c) = \frac{sc(k, c)}{\sum_{g \in G} sc(k, g)} \quad \text{Formula 2}$$

In the formula 2, sc(k, c) is the number of times when the genre c is specified as a search condition along with the keyword k. The p(c) is calculated based on the number of times when the genre c was specified along with the keyword k in the past, so that p(c) is also a ratio of the genre c was specified to all the genres of level 1.

When the system control unit 14 calculates the entropy E, the system control unit 14 compares the entropy E with a threshold value. When the threshold value is $\alpha$, if $E \leq \alpha$ is satisfied, it is determined that there is a genre that is highly relevant to the keyword k. The greater the number of genres of level 1 is, the greater the entropy E tends to be. This is because the greater the number of genres is, the greater the maximum value of the entropy E is. Therefore, it is required to variably set the threshold value $\alpha$ according to the number of genres. When the number of genres of level 1 is n, the maximum value of the entropy E is log(n). Therefore, the system control unit 14 calculates the threshold value $\alpha$ by, for example, the following formula 3.

[Mathematical Formula 3]

$$\alpha = K1 \log(n) \quad \text{Formula 3}$$

In the formula 3, K1 is a constant that satisfies 0<K1<1. The K1 is, for example, set by an administrator. Further, the determination method of the threshold value $\alpha$ is not limited to the method described here. The threshold value $\alpha$ may be determined so that the greater the number of genres is, the greater the threshold value $\alpha$ is. The value that represents the variation of the number of times of specifying may be calculated by a method other than the method of calculating the entropy.

If the system control unit 14 determines that there can be a genre that is highly relevant to the keyword k among the genres of level 1, subsequently the system control unit 14 determines which genre is highly relevant to the keyword k among the genres of level 1. Specifically, the system control unit 14 compares the specifying probability with a threshold value. The $\beta$ is an example of a first threshold value, a second threshold value, and a third threshold value of the present invention. When this threshold value is $\beta$, if $p(c) \geq \beta$ is satisfied, it is determined that the genre c is highly relevant to the keyword k. The threshold value $\beta$ is the minimum value of the specifying probability at which it is determined that the genre c is highly relevant to the keyword k. The smaller the number of genres of level 1 is, the higher the specifying probability tends to be. Therefore, it is required to variably set the threshold value $\beta$ according to the number of genres. Therefore, the system control unit 14 calculates the threshold value $\beta$ by, for example, the following formula 4.

[Mathematical Formula 4]

$$\beta = \begin{cases} K2\dfrac{1}{n} & n < K3 \\ K2\dfrac{1}{K3} & n \geq K3 \end{cases} \quad \text{Formula 4}$$

In the formula 4, K2 is a constant that satisfies K2≤2. K3 is an integer constant greater than or equal to 3. The K2 and K3 are, for example, set by an administrator. When a value greater than or equal to 1 is set as K2, it is possible to set the threshold value β to a value greater than or equal to 1/n that is an average value of the specification probabilities. The reason why the threshold value β is set according to the number of genres in a case that the number of genres is smaller than K3 is because when the number of genres is small, a change of 1/n is large with respect to a change of the number of genres. On the other hand, the reason why the threshold value β is set to a constant value in a case that the number of genres is greater than or equal to K3 is because if the threshold value β is set to a too small value, a probability that a genre which is not highly relevant to the keyword k in practice is determined to be highly relevant to the keyword k increases. The determination method of the threshold value β is not limited to the method described here. The threshold value β may be determined so that the smaller the number of genres is, the greater the threshold value β is.

Here, the specifying probability p(c) is a relative number of times of specifying of the genre c with respect to a sum of the numbers of times of specifying of all the genres of level 1. Therefore, determining whether or not the specifying probability is greater than or equal to the threshold value β is equivalent to determining whether or not the number of times of specifying of the genre c sc(k, c) is greater than or equal to a threshold value β2 of the number of times, which is calculated by the following formula 5.

[Mathematical Formula 5]

$$\beta 2 = \begin{cases} K2\dfrac{1}{n}\sum_{g \in G} sc(k, g) & n < K3 \\ K2\dfrac{1}{K3}\sum_{g \in G} sc(k, g) & n \geq K3 \end{cases} \quad \text{Formula 5}$$

The threshold value β2 is the minimum value of the number of times of specifying at which it is determined that the genre c is highly relevant to the keyword k. The system control unit 14 may determine whether or not the genre c is highly relevant to the keyword k by comparing the number of times of specifying with the threshold value β2 instead of comparing the specifying probability with the threshold value β.

When the system control unit 14 determines that the relationship between the genre c and the keyword k is high, the system control unit 14 determines the relevance score for the combination of the genre c and the keyword k. For example, the greater the number of times of specifying is, the higher the relevance score may be. For example, the number of times of specifying itself may be used as the relevance score. Further, the relevance score may be determined so that the greater the number of times of specifying is, the higher the relevance score is, and the higher the specifying probability is, the higher the relevance score is. For example, the relevance score may be calculated by using a calculation formula using the number of times of specifying and the specifying probability as variables.

Here, an example of an extraction result of a combination of a keyword and a genre that are highly relevant to each other will be shown. FIGS. 8(*a*) and 8(*b*) are graphs showing the specifying probability for each genre of level 1. Further, in FIGS. 8(*a*) and 8(*b*), a graph of only a part of all the genres of level 1 is shown.

FIG. 8(*a*) is an example in which the keyword k is "water". In FIG. 8(*a*), the solid line graph is a graph of the specifying probability. As shown in FIG. 8(*a*), the variation of the specifying probability of each of the genres is large. For example, the specification probabilities of "water/soft drink" and "pet/pet goods" among the genres of level 1 are higher than those of the other genres. In particular, the specifying probability of "water/soft drink" is significantly high. Therefore, it is determined that the entropy E is smaller than or equal to the threshold value α. In other words, it is determined that there is a genre highly relevant to the "water". Then, the specification probabilities of "water/soft drink" and "pet/pet goods" are greater than or equal to the threshold value β, so that a combination of "water" and "water/soft drink" and a combination of "water" and "pet/pet goods" are extracted as combinations of a keyword and a genre that are highly relevant to.

In FIG. 8(*a*), the dashed line graph is also shown. The dashed line graph represents, in a case that the keyword k is the "water", a ratio of the number of products searched by the "water" (hereinafter referred to as "the number of corresponding products") in each genre to the number of corresponding products in all the genres of level 1. As shown in FIG. 8(*a*), the ratio of the number of corresponding products and the specifying probability are not correlated to. In other words, the ratio of the number of corresponding products and the strength of relationship with the keyword k are not correlated to. For example, the ratio of the number of corresponding products of "beauty/cosmetic/perfume water" among the genres of level 1 is greater than the ratio of the other genres. It is considered that the reason of this is because the product name and the product description of the "beauty/cosmetic/perfume water" often include characters of "perfume water", so that products where the product name and the product description include "water" are searched. However, the specifying probability of the "beauty/cosmetic/perfume water" is not high. On the other hand, the ratio of the number of corresponding products of the "water/soft drink" is very small.

FIG. 8(*b*) is an example in which the keyword k is "point". As shown in FIG. 8(*b*), the variation of the specifying probability of each of the genres is small. The reason of this is because it is considered that a description related to the point in the product name and the product description is generally seen in any genre. Therefore, it is determined that the entropy E is greater than the threshold value α. In other words, it is determined that there is no genre that is highly relevant to the "point".

Next, a case of genres of level 2 or lower will be described. FIG. 9 is a figure showing a state of extracting genres relevant to the keyword k at each level. In a case that the system control unit 14 extracts a genre highly relevant to the keyword k from among the genres of level 1, the system control unit 14 tries to extract a genre highly relevant to the keyword k from among the child genres of the extracted genre. For example, as shown in FIG. 9, the genre g1 is extracted as a genre highly relevant to the keyword k from among the genres g1, g2, g3, and so on of the level 1. In this case, a genre highly relevant to the keyword k is extracted from among the child genres g11, g12, g13, and so on of the genre g1. The reason of this is because it can be considered that in a case that a certain genre is highly relevant to the search keyword, there can also be a genre highly relevant to the search keyword among the child genres of the genre. On the other hand, no genre is extracted from among the child genres of the genre g2 and the child genres of the genre g3.

The extraction method of a genre highly relevant to the keyword k in the level 2 or lower is basically the same as that in the level 1. In the formula 1 and the formula 2 for calculating the entropy E, a set of the child genres of the genre determined to be highly relevant to the keyword k may be defined as G. In the formula 3 and the formula 4 for calculating the threshold values, the number of the child genres of the genre determined to be highly relevant to the keyword k may be set to n.

Figure 26A:
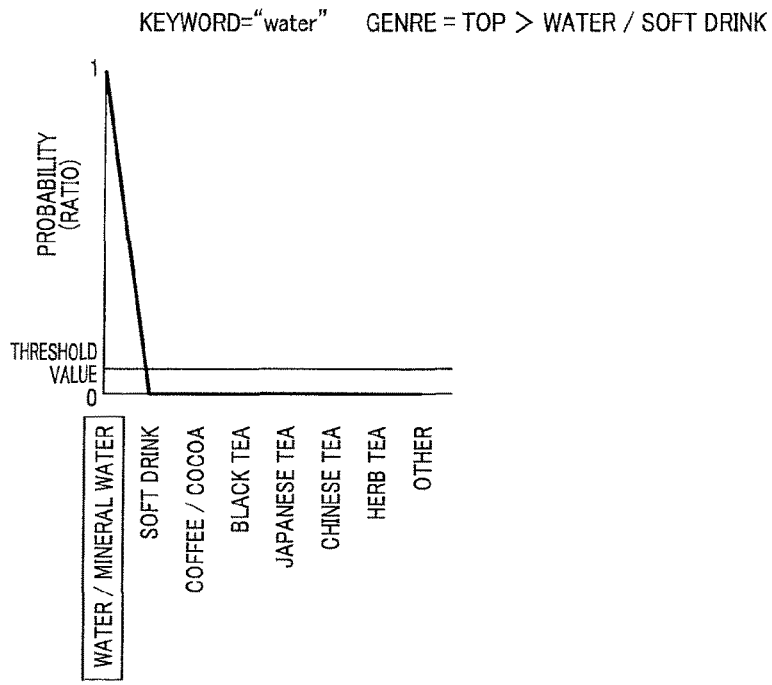
FIGS. 26(a) and (b) are graphs showing a specifying probability for each genre.
Figure 26B:
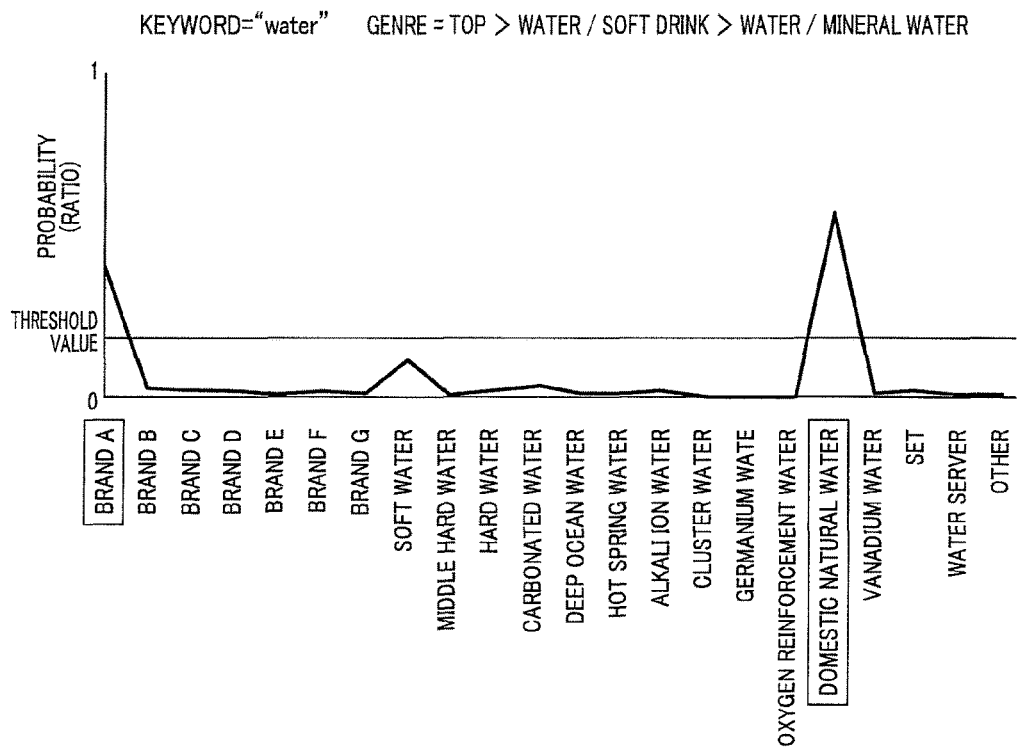

FIG. 26(a) is a graph showing the specifying probability for each child genre of the "water/soft drink". For example, in the example of FIG. 8(a), the number of genres of level 1 is assumed to be 35. FIG. 8(a) shows the specifying probability of only a part of all the genres of level 1. As shown in FIG. 26(a), the number of child genres of the "water/soft drink" is 8. Based on the formula 3, the threshold value $\alpha 2$ of the entropy of the child genres of the "water/soft drink" is smaller than the threshold value $\alpha 1$ of the entropy of the genres of level 1. Among the child genres of the "water/soft drink", the specifying probability of the "water/mineral water" exceeds 90%. Therefore, the entropy E of the child genres of the "water/soft drink" is smaller than or equal to the threshold value $\alpha 2$. Then, the "water" and the "water/mineral water" are extracted as a combination of a keyword and a genre that are highly relevant to each other. FIG. 26(b) is a graph showing the specifying probability for each child genre of the "water/mineral water" which is a child genre of the "water/soft drink". As shown in FIG. 26(b), the number of child genres of the "water/mineral water" is 22. Therefore, the threshold value $\alpha 3$ of the entropy of the child genres of the "water/mineral water" is smaller than the threshold value $\alpha 1$ of the entropy of the genres of level 1 and greater than or equal to the threshold value $\alpha 2$ of the entropy of the child genres of the "water/soft drink". In this way, the threshold value $\alpha$ of the entropy varies according to the number of genres. Among the child genres of the "water/mineral water", the specifying probability of the "brand A" is about 30% and the specifying probability of the "domestic natural water" is about 50%. The specifying probabilities of the other genres are smaller than 10%. Therefore, the entropy E of the child genres of the "water/mineral water" is smaller than or equal to the threshold value $\alpha 3$.

Figure 9:
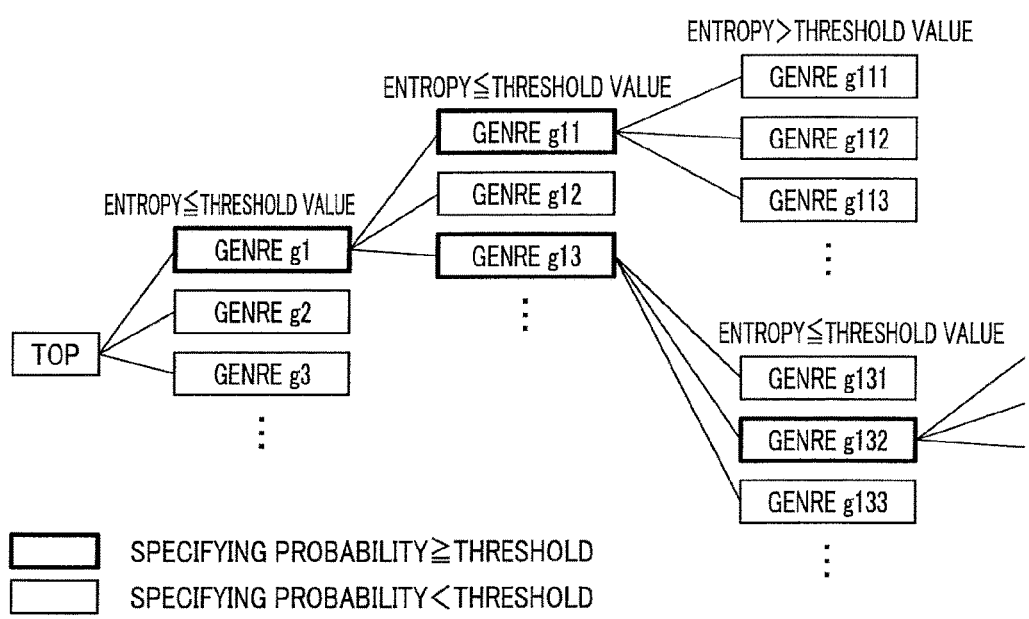
FIG. 9 is a figure showing a state of extracting genres relevant to a keyword k at each level.

In FIG. 9, the entropy E of the child genres of the genre g1 is smaller than or equal to the threshold value $\alpha 1$, so that genres highly relevant to the keyword k are extracted from among the child genres of the genre g1. For example, each of the specifying probability of the genre g11 and the specifying probability of the genre g13 is greater than or equal to the threshold value $\beta 1$, so that each of the genre g11 and the genre g13 is extracted as a genre highly relevant to the keyword k. Further, it is determined whether or not the entropy E of the child genres of the genre g11 is smaller than or equal to the threshold value $\alpha$. Here, the entropy E is not smaller than or equal to the threshold value $\alpha 11$, so that no genre is extracted from the child genres of the genre g11. On the other hand, the entropy E of the child genres of the genre g13 is smaller than or equal to the threshold value $\alpha 13$, so that a genre highly relevant to the keyword k is extracted from among the child genres g131, g132, g132, and so on of the genre g13. Here, for example, the specifying probability of the genre g132 is greater than or equal to the threshold value $\beta 13$, so that the genre g132 is extracted as a genre highly relevant to the keyword k. Further, it is determined whether or not the entropy E of the child genres of the genre g132 is smaller than or equal to the threshold value $\alpha 132$. In this way, the system control unit 14 hierarchically extracts genres highly relevant to the keyword k by, for example, a depth-first search.

By the way, when the system control unit 14 calculates the number of times of specifying when each genre is specified along with the keyword k, the system control unit 14 adds the number of times of specifying of the child genres to the actual number of times of specifying of the parent genre. For example, in FIG. 9, it is assumed that the numbers of times of specifying of the genres g111, g112, and g113 of level 3 are 5, 7, and 3, respectively. Here, it is assumed that the number of times of specifying of the genre g11, which is the parent genre of the genre g111 and the like, is 10. In this case, the sum of the numbers of times of specifying of the genres g111, g112, and g113 is added to the number of times of specifying of the genre g11. Therefore, the number of times of specifying of the genre g11 is 25. Further, 25, which is the number of times of specifying of the genre g11, is added to the genre g1, which is the parent genre of the genre g11. In this way, the number of times of specifying of a certain genre is reflected on genres from the parent genre to the genre of level 1 of the certain genre. The fact that a certain genre is specified along with the keyword k means that a part of the entire parent genre of the genre is specified along with the keyword k. Therefore, in this case, it can be considered that the parent genre is also specified along with the keyword k. Further, the number of times of specifying of the child genres need not be added to the number of times of specifying of the parent genre.

[4. Extraction Method in Case of Combination of Search Keywords]

Next, an extraction method of a genre highly relevant to a combination of search keywords will be described with reference to FIGS. 10 to 14.

[4-1. Problem and Extraction Method]

It is also possible to extract a genre highly relevant to a combination of search keywords by the method described in the third section. Specifically, the system control unit 14 acquires the number of times when a genre is specified as a search condition along with a certain plurality of search keywords for each of a plurality of genres of product. Then, the system control unit 14 extracts genres where the acquired number of times is greater than or equal to a threshold value as genres highly relevant to a combination of the plurality of search keywords. The keyword k in the description of the third section may be replaced with a combination of search keywords. However, the number of patterns that can be formed by combining search keywords is extremely greater than the number of search keywords. Therefore, in a case that considering each combination, there is a probability that the number of times when a user specifies a combination of search keywords as a search condition is smaller than the number of times when the user specifies one search keyword as a search condition. In a case that the number of times when a certain combination of search keywords is specified is small, the system control unit 14 may not be able to extract a genre relevant to the combination. Further, the reliability of extraction result of a genre relevant to the combination decreases.

Therefore, the system control unit 14 extracts a genre highly relevant to one search keyword included in the combination of search keywords from among a plurality of genres hierarchized in a tree structure. This search keyword is defined as KE1. The extraction method is the same as that described in the third section. Subsequently, the system control unit 14 extracts a genre highly relevant to another one keyword included in the combination of search keywords from among descendant genres of the genre extracted based on the keyword KE1. This search keyword is defined as KE2. The extraction method in this case is also the same as that described in the third section. In the case of the keyword KE1, the system control unit 14 starts extraction of a highly relevant genre from the genres of level 1. On the other hand, in the case of the keyword KE2, the system control unit 14 starts extraction of a highly relevant genre from the child genres of the genre highly relevant to the keyword KE1. The system control unit 14 determines the genre extracted based on the keyword KE2 as a genre relevant to a combination of the search keywords KE1 and KE2. The reason of this is because there is a probability that a genre belonging to a genre highly relevant to the search keyword KE1 among genres highly relevant to the search keyword KE2 is a genre that is also highly relevant to the search keyword KE1. In each extraction process, an extraction is tried based on one keyword. Therefore, it is possible to increase a probability to be able to extract a highly relevant genre in each extraction. As a result, it is possible to increase a probability to be able to extract a genre highly relevant to a combination of search keywords.

In a case that a combination includes three or more search keywords, the extraction is performed in the same manner for the third and following search keywords. For example, the system control unit 14 extracts a genre highly relevant to a search keyword KE3 included in a combination of search keywords from among the descendant genres of the genre determined as a genre highly relevant to the combination of the search keywords KE1 and KE2. The system control unit 14 determines the genre extracted at this time as a genre highly relevant to a combination of the search keywords KE1 to K3.

The extraction method will be generalized and described below. The system control unit 14 assigns an extracting order of a highly relevant genre to each search keyword included in a combination of search keywords. The system control unit 14 sequentially performs an extraction of a genre highly relevant to each search keyword in the assigned extracting order. At this time, the system control unit 14 extracts a genre highly relevant to a search keyword whose genre extracting order is the first from among all genres. On the other hand, the system control unit 14 extracts a genre highly relevant to a search keyword whose extracting order is the second or later from among the child genres of the genre extracted based on a search keyword whose extracting order is immediately before. Then, the system control unit 14 determines a genre extracted based on a search keyword whose extracting order is the last as a genre relevant to a combination of the search keywords.

Next, a specific example will be described. FIG. 10(*a*) is a figure showing one example of an extraction result of genres relevant to a combination of search keywords of "digital camera AAA company". FIG. 10(*b*) is a figure showing one example of an extraction result of genres relevant to a keyword of "digital camera". FIG. 10(*c*) is a figure showing one example of an extraction result of genres relevant to a keyword of "AAA company". The number of times of specifying of the "digital camera AAA company" is small, so that, as shown in FIG. 10(*a*), no genre relevant to the "digital camera AAA company" is searched by the method described in the third section. On the other hand, there are genres relevant to the keyword of "digital camera" and genres relevant to the keyword of "AAA company". As shown in FIG. 10(*b*), as genres relevant to the "digital camera", there are "home electric appliances/AV/camera", "digital camera" which is a child genre of the "home electric appliances/AV/camera", and "AAA company", "BBB company", and "CCC company" which are child genres of the "digital camera". As shown in FIG. 10(*c*), as genres relevant to the "AAA company", for example, there are "home electric appliances/AV/camera", "digital camera" which is a child genre of the "home electric appliances/AV/camera", and "AAA company" which is a child genre of the "digital camera". Further, in addition to these genres, there are many genres relevant to the keyword of "AAA company". The reason of this is because the AAA company manufactures various types of products.

Figure 11:
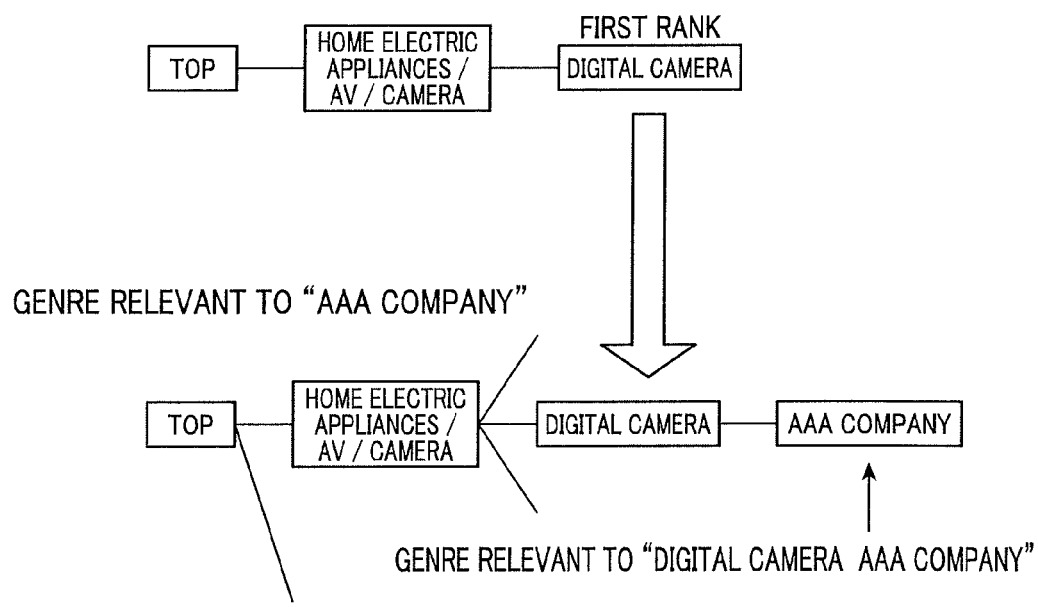
FIG. 11 is a figure showing one example of a state in which a genre highly relevant to the "digital camera AAA company" is extracted.

FIG. 11 is a figure showing one example of a state in which a genre highly relevant to the "digital camera AAA company" is extracted. For example, first, the system control unit 14 extracts genres highly relevant to the keyword of "digital camera" from among all genres. The extraction result is shown in FIG. 10(*b*). Subsequently, the system control unit 14 ranks the extracted genres in descending order of the relevance score with the "digital camera". For example, it is assumed that the first rank is "digital camera", the second rank is "AAA company", and the third rank is "BBB company". The system control unit 14 extracts a genre highly relevant to the keyword of "AAA company" from among the child genres of each genre where the rank of the relevance score is higher than or equal to a predetermined rank. For example, it is assumed that a genre higher than or equal to the third rank is selected. Among the child genres of the genre of "digital camera", the genre highly relevant to the keyword of "AAA company" is the "AAA company". On the other hand, among the child genres of the genre of "AAA company", it is assumed that there is no genre that is highly relevant to the keyword of "AAA company". Further, among the child genres of the genre of "BBB company", it is assumed that there is no genre that is highly relevant to the keyword of "AAA company". Therefore, as shown in FIG. 11, the system control unit 14 determines that a genre relevant to the "digital camera AAA company" is the "AAA company" which is a child genre of the "digital camera". Further, the system control unit 14 determines only a genre where the rank of the relevance score is higher than or equal to a predetermined rank as a genre relevant to the "digital camera AAA company" from among genres extracted at this time.

The example described above is an example of a case in which there is a genre highly relevant to the "digital camera AAA company" among genres extracted in a case that the extraction of a genre highly relevant to the "AAA company" which is a search keyword whose extracting order is the second is started from the genres of level 1. However, there is a case in which there is not necessarily such a genre. For example, it is assumed that the number of times when the genre of "digital camera" is specified as a search condition along with the search keyword of "AAA company" is not greater than the number of times when the a sibling genre of the "digital camera" is specified as a search condition along with the search keyword of "AAA company". On the other hand, it is assumed that the number of times when the "AAA company" which is a child genre of the "digital camera" is specified as a search condition along with the search keyword of "AAA company" is greater than the number of times when the a sibling genre of the genre of "AAA company" is specified as a search condition along with the search keyword of "AAA company". In this case, the "AAA company" which is a child genre of the "digital camera" is not extracted as a genre highly relevant to the search keyword of "AAA company". The reason of this is because the genre of "digital camera" is not highly relevant to the search keyword of "AAA company", so that the system control unit 14 does not extract a highly relevant genre from among the child genres of the "digital camera". However, in a case that the system control unit 14 extracts a genre highly relevant to the search keyword of "AAA company" from among the descendant genres of the "digital camera" which is a genre highly relevant to the search keyword of "digital camera", the system control unit 14 performs the extraction regardless of whether or not the genre of "digital camera" is highly relevant to the search keyword of "AAA company". Therefore, even in this case, the "AAA company" which is a descendant genre of the "digital camera" is extracted as a genre highly relevant to the "digital camera AAA company". In this way, the system control unit 14 starts extraction of a keyword relevant to a keyword whose extracting order is the second from the child genres of a genre relevant to a keyword whose extracting order is the first. For example, in a case that the system control unit 14 performs extraction using only a keyword whose extracting order is the second, the system control unit 14 starts the extraction of a keyword relevant to the keyword whose extracting order is the second from the genres of level 1. A genre that cannot be extracted in the above case can be extracted as a genre relevant to a keyword whose extracting order is the second.

One of the reasons why the system control unit 14 narrows down genres by the rank of the relevance score is to reduce the processing time. Another reason is to improve reliability of the extraction result. In each extraction process, genres highly relevant to one search keyword are extracted. However, genres that are finally extracted as genres highly relevant to a combination of search keywords are a combination of results of each extraction process. Therefore, the genres that are finally extracted may include genres less relevant to the combination of search keywords. Therefore, in each extraction process, among the genres highly relevant to the search keyword, genres that are relatively less relevant to the search keyword are excluded. The system control unit 14 need not narrow down genres by the rank of the relevance score.

In a case that the system control unit 14 extracts a genre relevant to a combination of search keywords, the system control unit 14 may determine the ancestor genres of the extracted genre as genres relevant to the combination. For example, in the case of the example of FIG. 11, in addition to the genre of "AAA company", the "home electric appliances/AV/camera" and the "digital camera" are also determined as genres relevant to the "digital camera AAA company".

[4-2. Order of Search Keywords for Extracting Relevant Genres]

The system control unit 14 extracts highly relevant genres in the same extracting order as the specifying order (input order) of search keywords of a user. The reason of this is because when the user specifies a plurality of keywords, the user tends to earlier specify keywords representing a broad concept and tends to later specify keywords representing a narrow concept. The later the extracting order is, the narrower the concept of genres is, from which genres are extracted. Therefore, in each extraction process, it is possible to match the concept represented by the search keyword with a concept represented by genres included in an extraction range. Therefore, in each extraction process, it is possible to increase a probability to be able to extract a genre highly relevant to the search keyword. Thereby, it is possible to increase a probability to be able to extract a genre highly relevant to a combination of search keywords. In the case of "digital camera AAA company", the user specifies the "digital camera" first and specifies the "AAA company" second. Therefore, genres are extracted first based on the "digital camera" and genres are extracted second based on the "AAA company".

In a case that the extraction process is performed in the same extracting order as the specifying order of the search keywords of the user, it also can be considered that a genre relevant to a combination of search keywords cannot be extracted. In this case, the system control unit 14 changes the extracting order. The system control unit 14 then tries again to extract genres relevant to the combination of search keywords in the changed extracting order. Thereby, it is possible to increase a probability to be able to extract genres relevant to the combination of search keywords.

Figure 12A:
FIG. 12(*a*) is a figure showing one example of an extraction result of genres relevant to a combination of search keywords of "20-inch display", (b) is a figure showing one example of an extraction result of genres relevant to a keyword of "20-inch", (c) is a figure showing one example of an extraction result of genres relevant to a keyword of "display".
Figure 12B:
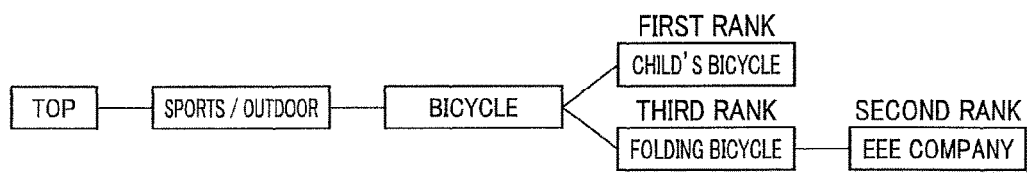
Figure 12C:
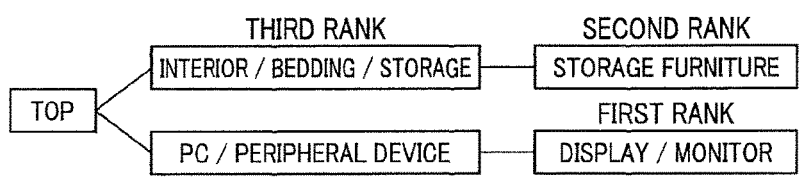

Next, a specific example will be described. FIG. 12(*a*) is a figure showing one example of an extraction result of genres relevant to a combination of search keywords of "20-inch display". FIG. 12(*b*) is a figure showing one example of an extraction result of genres relevant to a keyword of "20-inch". FIG. 12(*c*) is a figure showing one example of an extraction result of genres relevant to a keyword of "display".

As shown in FIG. 12(*a*), in the method described in the third section, there is no genre relevant to the "20-inch display". On the other hand, as shown in FIG. 12(*b*), as genres relevant to the "20-inch", there are "sports/outdoor", "bicycle" which is a child genre of the "sports/outdoor", "child's bicycle" and "folding bicycle" which are child genres of the "bicycle", and "EEE company" which is a child genre of the "folding bicycle". As shown in FIG. 12(*c*), as genres relevant to the "display", there are "interior/bedding/storage" and "storage furniture" which is a child genre of the "interior/bedding/storage". Further, as genres relevant to the "display", there are "PC/peripheral apparatus" and "display/monitor" which is a child genre of the "PC/peripheral apparatus".

FIG. 13(*a*) is an extraction example of a case in which the extraction process is performed in the specifying order of search keywords. First, the system control unit 14 extracts genres highly relevant to the "20-inch" from among all genres. Subsequently, the system control unit 14 selects the "child's bicycle", the "folding bicycle", and the "EEE company" which are genres whose rank of the relevance score is high. Subsequently, the system control unit 14 tries to extract genres highly relevant to the "display" from among the child genres of each of the "child's bicycle", the "folding bicycle", and the "EEE company". It is assumed, however, that there is no genre highly relevant to the "display" among the child genres of the "child's bicycle", the "folding bicycle", and the "EEE company". In this case, the system control unit 14 cannot extract a genre relevant to the "20-inch display". Therefore, the system control unit 14 changes the extracting order.

FIG. 13(*b*) is an extraction example of a case in which the extraction process is performed by changing the extracting order of genres. First, the system control unit 14 extracts genres highly relevant to the "display" from among all genres. Subsequently, the system control unit 14 selects the "interior/bedding/storage", the "storage furniture", and the "display/monitor", whose ranks of the relevance score are high. Subsequently, the system control unit 14 tries to extract genres highly relevant to the "20-inch" from among the child genres of each of the "interior/bedding/storage", the "storage furniture", and the "display/monitor". At this time, as shown in FIG. 13(*b*), a genre of "liquid crystal 18-20 inch" was extracted as a genre highly relevant to the "20-inch" from among the child genres of the "display/monitor". On the other hand, it is assumed that there was no genre highly relevant to the "display" among the child genres of each of the "interior/bedding/storage" and the "storage furniture". In this case, the system control unit 14 determines that the "liquid crystal 18-20 inch" is a genre relevant to the "20-inch display".

The greater the number of search keywords is, the greater the number of combinations of extracting orders is. The system control unit 14 may perform the extraction process by changing the extracting order until a genre relevant to a combination of search keywords can be extracted. Or, the system control unit 14 may limit the upper limit of the number of times the extracting order can be changed.

Further, when the electronic mall server 1 first performs extraction of genres, the electronic mall server 1 may compare the extent of concept between a plurality of specified search keywords. The electronic mall server 1 then may determine the extracting order of each search keyword so that the broader the concept of a search keyword is, the higher the extracting order of the search keyword is. The reason of this is because that there is possibility of existence of a user who earlier specifies a keyword representing a narrow concept. In this case, the extracting order may be different from the specifying order of keywords of the user. For example, the electronic mall server 1 may determine the genre extracting order of each search keyword on the basis of a concept dictionary (semantic dictionary) that defines semantic relationship between words. This concept dictionary defines a relationship between a broader term and a narrower term. A database of the concept dictionary may be constructed in advance in the electronic mall server 1. Alternatively, the electronic mall server 1 may use a website of the concept dictionary. Further, the electronic mall server 1 may acquire the number of products that are searched in a case that performing a search by using each of a plurality of search keywords as a search condition. The electronic mall server 1 then may determine the extracting order of each search keyword so that the greater the number of products searched by using a search keyword is, the higher the extracting order of the search keyword is. The reason of this is because there is a probability that the greater the number of products searched by using a search keyword is, the broader the concept represented by the search keyword is.

[5. Selection of Highly Relevant Genre]

There is a case in which a genre highly relevant to a certain combination of search keywords can be extracted by the method described in the third section. The system control unit 14 may try to extract a highly relevant genre by the two methods, the method described in the third section and the method described in the fourth section. In a case that the system control unit 14 could extract a genre by either of the methods only, the system control unit 14 determines that the extracted genre is a highly relevant genre. On the other hand, in a case that the system control unit 14 could extract a genre by each of the methods, the system control unit 14 determines that a genre extracted by either of the methods is a highly relevant genre on the basis of a predetermined criterion. This criterion is determined so that a more appropriate genre is selected as a genre relevant to the combination of search keywords.

For example, the level of the extracted genre may be used as the criterion. Specifically, the system control unit 14 determines a genre whose level is greater as a genre relevant to the combination of search keywords. The reason of this is because there is a probability that the greater the level of a genre is, the higher the relevance to the combination of search keywords is. The greater the level is, the narrower a range represented by the genre is. This indicates that the greater the level is, the higher the specificity of a product belonging to the genre is. In other words, this indicates that a condition of a product belonging to the genre is specific. It is considered that the higher the specificity of a genre is, the higher the relationship between the genre and the combination of search keywords.

Next, a specific example will be described. FIG. 14(*a*) is a figure showing one example of an extraction result of a case in which a genre relevant to a combination of search keywords "X Y" is extracted by the method described in the third section. FIG. 14(*b*) is a figure showing one example of a state in which a genre relevant to the combination of search keywords "X Y" is extracted by the method described in the fourth section.

As shown in FIG. 14(*a*), in the method described in the third section, genres g1 and g11 are extracted as genres relevant to the "X Y". The level of the genre g1 is 1 and the level of the genre g11 is 2. On the other hand, as shown in FIG. 14(*b*), as genres relevant to the "X", there are genres g1, g11, g111, g112, g2, and g21. The genre g11 is a child genre of the genre g1. The genres g111 and g112 are child genres of the genre g11. The genre g21 is a child genre of the genre g2. Further, as genres relevant to the "Y", there are genres g2, g21, and g212. The genre g212 is a child genre of the genre g21. In the method described in the fourth section, the genre g212 is extracted as a genre relevant to the "X Y". The level of the genre g212 is 3. Therefore, the genre g212 is determined as a genre relevant to the "X Y".

For example, it is assumed that the genre g1111 is extracted by the method described in the third section. The level of the genre g1111 is 4. Therefore, in this case, instead of the genre g212, the genre g1111 is determined as a genre relevant to the "X Y". Further, in a case that the genre is the same, the system control unit 14 arbitrarily determines a genre extracted by a certain method to be a highly relevant genre.

The criterion may be the number of times of specifying. This number of times of specifying is the number of times when a genre extracted by the method described in the third section is specified as a search condition along with a combination of search keywords for extracting a highly relevant genre. Specifically, in a case that the number of times of specifying is greater than or equal to a predetermined threshold value, the system control unit 14 determines that the genre extracted by the method described in the third section is a highly relevant genre. This is because the greater the number of times of specifying is, the more accurate the extraction result is.

The criterion may be both of the level of the genre and the number of times of specifying. The greater the level is, the smaller the number of times of specifying tends to be. In other words, it is considered that the level of the genre and the number of times of specifying correlate with each other. Regarding the relationship between a genre and a combination of search keywords, the level of the genre and the number of times of specifying are in a contrary relation to each other. Therefore, the system control unit 14 can balance both by taking both into account. For example, the system control unit 14 may calculate an index value by multiplying the level of the genre extracted by the method described in the third section and the number of times of specifying of the genre together. Further, in a case that the index value is greater than or equal to a predetermined threshold value, the system control unit 14 determines that the genre extracted by the method described in the third section is a highly relevant genre. The system control unit 14, for example, may determine the threshold value to be compared with the index value according to the level of the genre extracted by the method described in the fourth section. Specifically, the system control unit 14 determines the threshold value so that the greater the level of the genre extracted by the method described in the fourth section is, the higher the threshold value is.

Further, the system control unit 14 may determine both the genre extracted by the method described in the third section and the genre extracted by the method described in the fourth section as highly relevant genres.

[6. Operation of Shopping System]

Next, an operation of the shopping system S will be described with reference to FIGS. 15 to 24.

Figure 15:
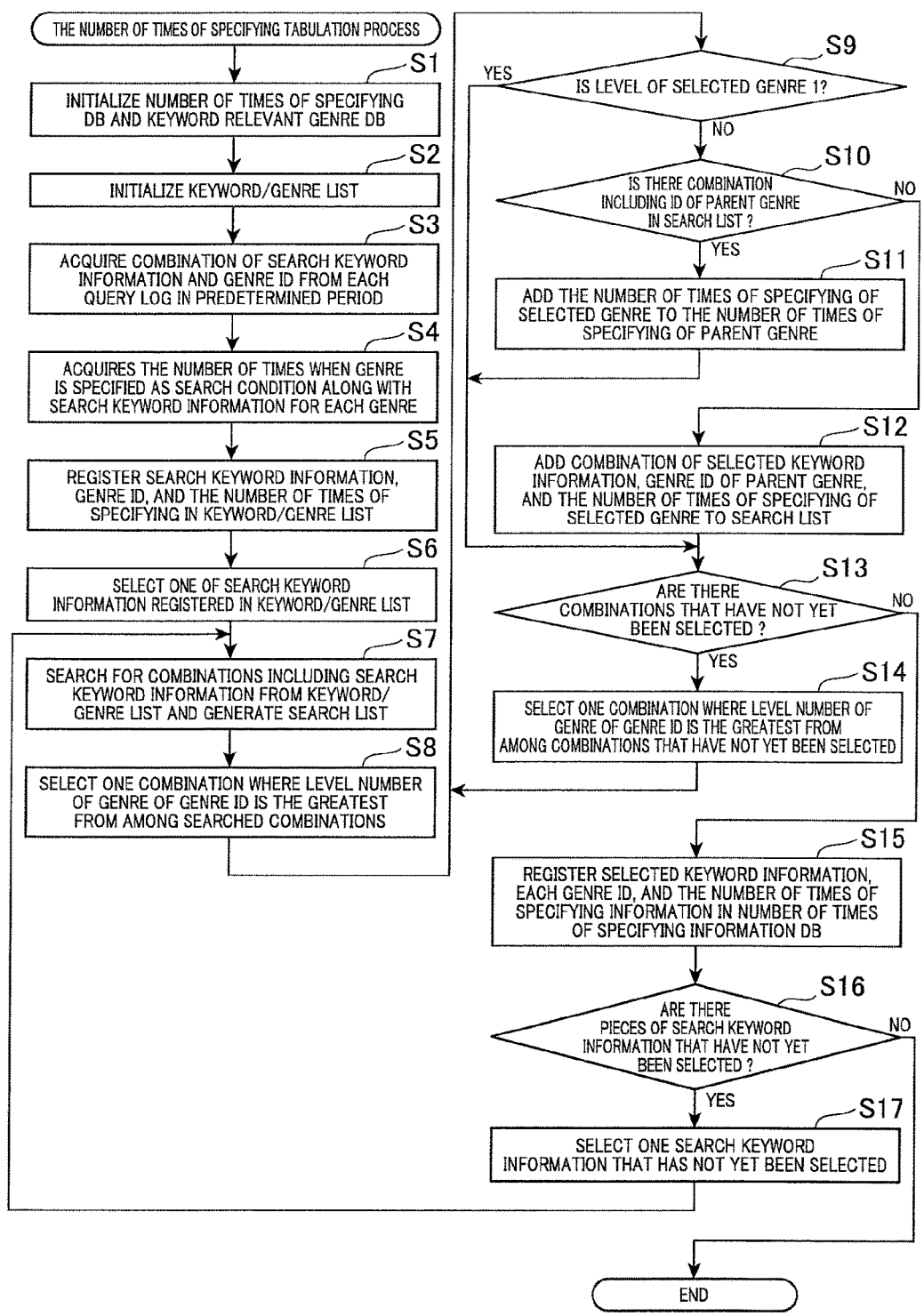
FIG. 15 is a flowchart showing a process example of a number of times of specifying tabulation process of the system control unit 14 of the electronic mall server 1 according to one embodiment.

FIG. 15 is a flowchart showing a process example of a number of times of specifying tabulation process of the system control unit 14 of the electronic mall server 1 according to the present embodiment. The number of times of specifying tabulation process is a process to tabulate the number of times when each search keyword is specified as a search condition along with each genre. The number of times of specifying tabulation process is, for example, performed periodically (for example, once a day).

First, the system control unit 14 initializes the number of times of specifying DB 12g (step S1). Specifically, the system control unit 14 deletes all information registered in the number of times of specifying DB 12g. Subsequently, the system control unit 14 initializes a keyword/genre list (step S2). The keyword/genre list is a list in which combinations of a search keyword, a genre ID, and the number of times of specifying are registered.

Subsequently, the system control unit 14 acquires a combination of search keyword information and a genre ID from query logs registered in the query log DB 12f (step S3). Specifically, the system control unit 14 acquires a combination of search keyword information and a genre ID from each of query logs where the reception date and time is within a predetermined period of time (for example, within a period of time between the current time point and 30 days before). At this time, the system control unit 14 acquires the combinations from query logs in which both the search keyword information and the genre ID are set.

Subsequently, the system control unit 14 acquires the number of times when a genre is specified as a search condition along with the search keyword information for each genre (step S4). Specifically, the system control unit 14 acquires one of combinations of the search keyword information and the genre ID acquired from the query logs. Subsequently, the system control unit 14 counts the number of combinations where the search keyword information and the genre ID are the same as those of the selected combination among the combinations acquired from the query logs as the number of times of specifying. At this time, the system control unit 14 includes the selected combination itself in the number of times of specifying as one. Subsequently, the system control unit 14 selects one of the combinations acquired from the query logs except for the same combinations as those that have been selected. Then, the system control unit 14 counts the number of times of specifying of the selected combination by the same method as described above. Thereafter, the system control unit 14 performs the same process until there is no more combination that can be selected.

After completing the process of step S4, the system control unit 14 registers each combination of the search keyword information and the genre ID where the number of times of specifying is calculated in the keyword/genre list in association with the search keyword information, the genre ID, and the number of times of specifying (step S5).

Subsequently, the system control unit 14 selects one of the search keyword information registered in the keyword/genre list (step S6). Here, the selected search keyword information is referred to as "selected keyword information". Subsequently, the system control unit 14 searches for combinations including search keyword information that is the same as the selected keyword information from the keyword/genre list. Then, the system control unit 14 generates a search list including the searched combinations (step S7). Subsequently, the system control unit 14 selects one combination where the level of a genre corresponding to the genre ID included in the combination is the greatest from among the combinations registered in the search list (step S8). The level of the genre is a level included in the genre information corresponding to the genre ID among the genre information registered in the genre information DB 12c. Here, the genre corresponding to the genre ID included in the selected combination is referred to as a "selected genre".

Subsequently, the system control unit 14 determines whether or not the level of the selected genre is level 1 (step S9). At this time, in a case that the system control unit 14 determines that the level of the selected genre is not level 1 (step S9: NO), the system control unit 14 determines whether or not there is a combination including a genre ID of the parent genre of the selected genre among the combinations registered in the search list (step S10). The genre ID of the parent genre of the selected genre is a parent genre ID included in the genre information corresponding to the genre ID of the selected genre. In a case that the system control unit 14 determines that there is a combination including the genre ID of the parent genre of the selected genre (step S10: YES), the system control unit 14 adds the number of times of specifying included in the selected combination to the number of times of specifying included in the combination including the genre ID of the parent genre (step S11). On the other hand, in a case that the system control unit 14 determines that there is no combination including the genre ID of the parent genre of the selected genre (step S10: NO), the system control unit 14 newly adds a combination of the selected keyword information, the genre ID of the parent genre, and the number of times of specifying to the search list (step S12). The system control unit 14 sets the number of times of specifying added at this time to the same as the number of times of specifying included in the selected combination.

In a case that the system control unit 14 determines that the level of the selected genre is level 1 in step S9 (step S9: YES) or in a case that the system control unit 14 completes the process of step S11 or the process of step S12, the system control unit 14 determines whether or not there is/are combination(s) that have not yet been selected among the combinations registered in the search list (step S13). At this time, in a case that the system control unit 14 determines that there is/are combination (s) that have not yet been selected (step S13: YES), the system control unit 14 selects one combination where the level of the genre corresponding to the genre ID included in the combination is the greatest from among the combination (s) that have not yet been selected (step S14). Subsequently, the system control unit 14 proceeds to step S9. The system control unit 14 adds the number of times of specifying of each genre to genres from the parent genre of the genre to the genre of level 1 by repeating the processes of steps S9 to S13.

On the other hand, in a case that the system control unit 14 determines that all the combinations have been selected (step S13: NO), the system control unit 14 registers the number of times of specifying information in the number of times of specifying information DB 12g (step S15). Specifically, the system control unit 14 registers the selected keyword information in the number of times of specifying information DB 12g and registers the genre ID and the number of times of specifying included in each combination registered in the search list in association with the selected keyword information.

Subsequently, the system control unit 14 determines whether or not there are search keyword information that have not yet been selected among the search keyword information registered in the keyword/genre list except for the keyword information that is the same as the search keyword information that has already been selected (step S16). At this time, if the system control unit 14 determines that there are search keyword information that have not yet been selected (step S16: YES), the system control unit 14 selects one of the search keyword information that has not yet been selected (step S17). Next, the system control unit 14 proceeds to step S7. The system control unit 14 extracts all combinations of search keyword information and a genre that are highly relevant to each other by repeating the processes of steps S7 to S17. Then, in a case that the system control unit 14 determines that all pieces of the search keyword information have been selected (step S16: NO), the system control unit 14 ends the number of times of specifying tabulation process.

Figure 16:
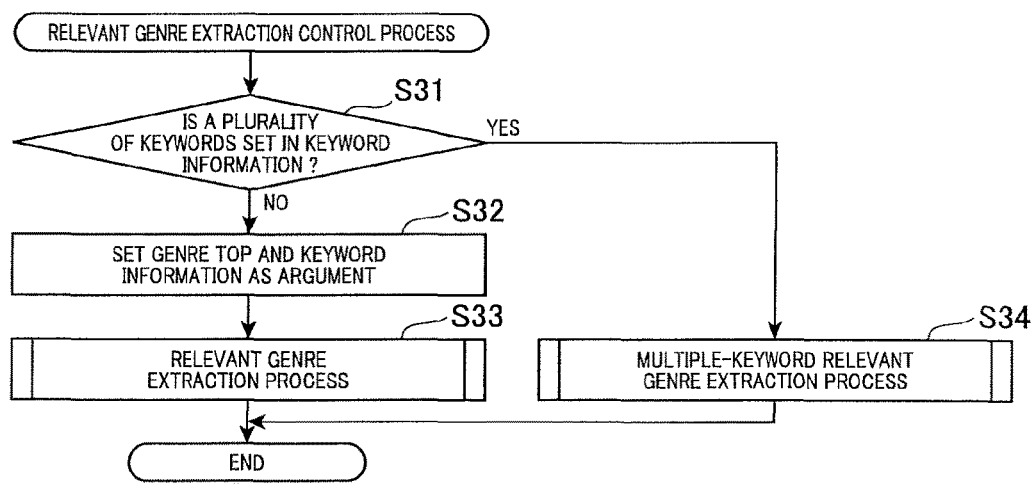
FIG. 16 is a flowchart showing a process example of a relevant genre extraction control process of the system control unit 14 of the electronic mall server 1 according to one embodiment.

FIG. 16 is a flowchart showing a process example of a relevant genre extraction control process of the system control unit 14 of the electronic mall server 1 according to the present embodiment. The relevant genre extraction control process is a process to extract a genre that is highly relevant to one keyword or a combination of keywords. The relevant genre extraction control process is performed as needed. For example, in a case that a user specifies one or more search keywords as a search condition, the relevant genre extraction control process is performed for the specified one or more search keywords. Further, for example, in a case that an administrator of the electronic mall specifies one or more keywords, the relevant genre extraction control process is performed for the specified one or more keywords. For example, there is a case in which the administrator prepares a web page relevant to a specific keyword or a specific combination of keywords in the electronic mall. In a case that generating the web page so that a list of genres relevant to the specific keyword or the specific combination of keywords is displayed, the administrator needs to know the relevant genres.

Keyword information including one or more keywords is set as an argument of the relevant genre extraction control process. First, the system control unit 14 determines whether or not a plurality of keywords is set in the keyword information of the argument (step S31). At this time, in a case that the system control unit 14 determines that only one keyword is set in the keyword information of the argument (step S31: NO), the system control unit 14 sets the genre ID of the genre top and the keyword information of the argument of the relevant genre extraction control process as an argument of a relevant genre extraction process to be performed next time (step S32). Subsequently, the system control unit 14 performs the relevant genre extraction process (step S33). In the relevant genre extraction process at this time, a genre highly relevant to the one keyword set in the keyword information of the argument is extracted. The details of the relevant genre extraction process will be described later.

On the other hand, in a case that the system control unit 14 determines that a plurality of keywords are set in the keyword information of the argument (step S31: YES), the system control unit 14 performs a multiple-keyword relevant genre extraction process (step S34). In the multiple-keyword relevant genre extraction process, a genre highly relevant to the combination of keywords set in the keyword information of the argument is extracted. The details of the multiple-keyword relevant genre extraction process will be described later.

After completing the process of step S33 or step S34, the system control unit 14 ends the relevant genre extraction control process. At this time, the system control unit 14 outputs a relevant genre list as a return value of the relevant genre extraction control process. The relevant genre list is a list of genres highly relevant to the keyword information of the argument. Specifically, in the relevant genre list, a record including the keyword information of the argument and the extracted genre's genre ID and relevance score is registered for each extracted genre.

Figure 17:
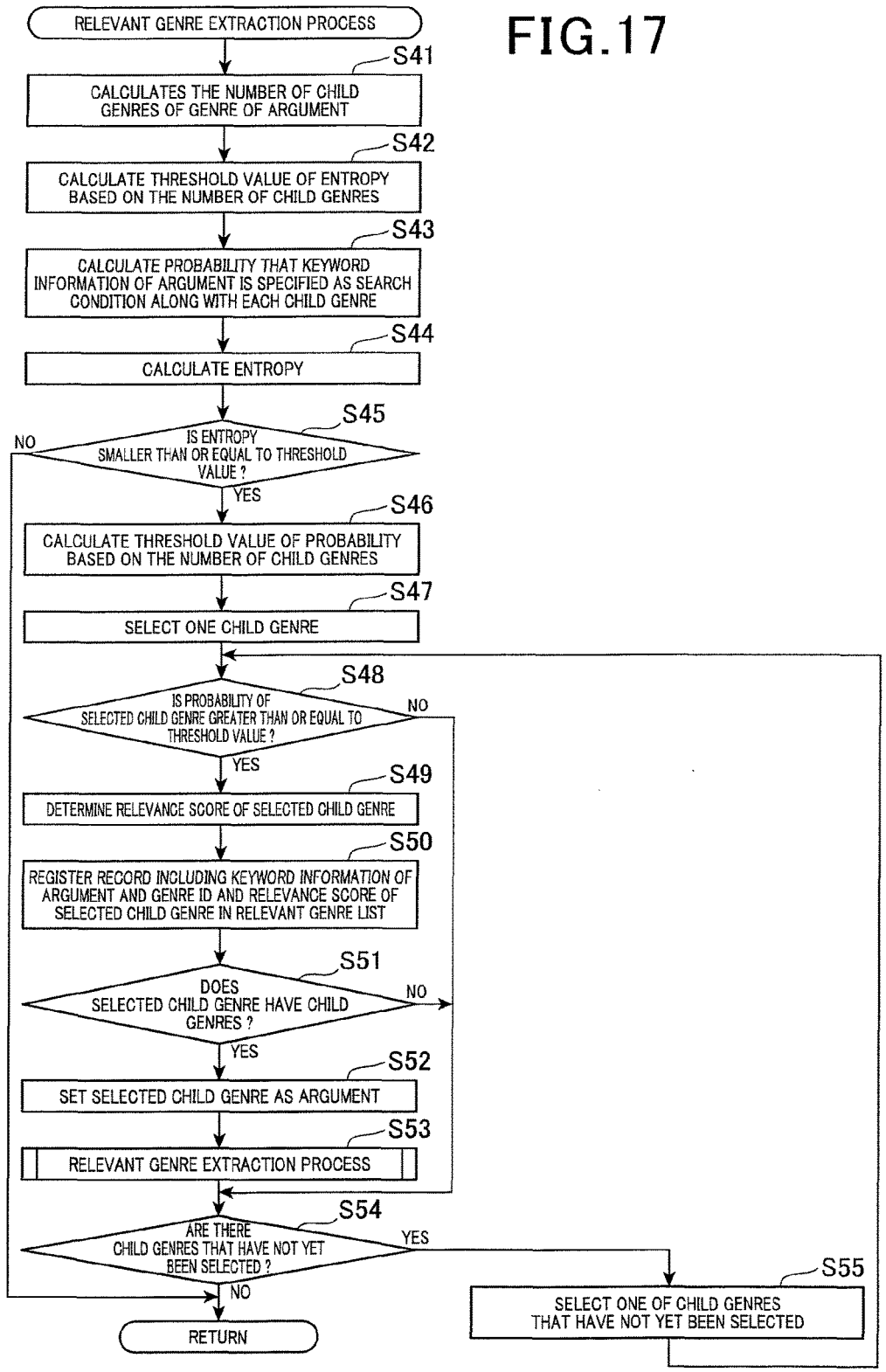
FIG. 17 is a flowchart showing a process example of a relevant genre extraction process of the system control unit 14 of the electronic mall server 1 according to one embodiment.

FIG. 17 is a flowchart showing a process example of the relevant genre extraction process of the system control unit 14 of the electronic mall server 1 according to the present embodiment.

First, the system control unit 14 calculates the number of the child genres of the genre corresponding to the genre ID of the argument (step S41). Specifically, the system control unit 14 counts the number of genre IDs registered in a child genre ID list included in the genre information corresponding to the genre ID of the argument. Subsequently, the system control unit 14 calculates the threshold value a of the entropy on the basis of the calculated number of the child genres (step S42). For example, the system control unit 14 calculates the threshold value a by using the formula 3 described above.

Subsequently, the system control unit 14 calculates the specifying probability corresponding to the keyword information of the argument for each child genre of the genre corresponding to the genre ID of the argument (step S43). In other words, the system control unit 14 performs a process corresponding to calculation of the formula 2 described above. Specifically, the system control unit 14 acquires a genre ID from the child genre ID list included in the genre information corresponding to the genre ID of the argument. Subsequently, the system control unit 14 searches for the number of times of specifying corresponding to the acquired genre ID from the number of times of specifying information corresponding to the keyword information of the argument. At this time, in a case that the number of times of specifying corresponding to the acquired genre ID is not registered in the number of times of specifying information, the number of times of specifying of the genre of the genre ID is set to 0. The system control unit 14 performs the above search as many times as the number of the genre ID(s) registered in the child genre ID list. Subsequently, the system control unit 14 calculates the sum of the searched numbers of times of specifying. Then, the system control unit 14 calculates the specifying probability by dividing each searched number of times of specifying by the sum.

Subsequently, the system control unit 14 calculates the entropy E based on the calculated numbers of times of specifying (step S44). In other words, the system control unit 14 performs calculation of the formula 1 described above. Subsequently, the system control unit 14 determines whether or not the entropy E is smaller than or equal to the threshold value α (step S45). At this time, in a case that the system control unit 14 determines that the entropy E is not smaller than or equal to the threshold value α (step S45: NO), the system control unit 14 ends the relevant genre extraction process. On the other hand, if the system control unit 14 determines that the entropy E is smaller than or equal to the threshold value α (step S45: YES), the system control unit 14 calculates the threshold value 3 of the specifying probability based on the number of the child genres (step S46). For example, the system control unit 14 calculates the threshold value β by using the formula 4 described above.

Subsequently, the system control unit 14 selects one of the child genres of the genre corresponding to the genre ID of the argument (step S47). Here, the selected child genre is referred to as a "selected child genre". Subsequently, the system control unit 14 determines whether or not the specifying probability of the selected child genre is greater than or equal to the threshold value β (step S48). At this time, if the system control unit 14 determines that the specifying probability is greater than or equal to the threshold value 13 (step S48: YES), the system control unit 14 determines the relevance score of the selected child genre according to the number of times of specifying of the selected child genre (step S49). Subsequently, the system control unit 14 registers the keyword information of the argument, and the genre ID and the determined relevance score of the selected child genre in the relevant genre list in association with each other as one record (step S50).

Subsequently, the system control unit 14 determines whether or not, for the selected child genre, the child genres of the genre are set (step S51). Specifically, the system control unit 14 determines that the child genres are set in a case that the child genre list is set in the genre information corresponding to the genre ID of the selected child genre, and determines that no child genre is set in a case that the child genre list is not set. At this time, in a case that the system control unit 14 determines that child genres are set (step S51: YES), the system control unit 14 sets the genre ID of the selected child genre and the keyword information of the argument as the argument of the relevant genre extraction process (step S52). Subsequently, the system control unit 14 performs the relevant genre extraction process (step S53).

In a case that the system control unit 14 determines that the specifying probability is not greater than or equal to the threshold value β in step S48 (step S48: NO), in a case that the system control unit 14 determines that no child genre is set in step S51 (step S51: NO), or in a case that the system control unit 14 completes the process of step S53, the system control unit 14 determines whether or not there are the child genres that have not yet been selected among the child genres of the genre corresponding to the genre ID of the argument (step S54). At this time, in a case that the system control unit 14 determines that there are child genres that have not yet been selected (step S54: YES), the system control unit 14 selects one of the child genres that have not yet been selected (step S55). Subsequently, the system control unit 14 proceeds to step S48. On the other hand, in a case that the system control unit 14 determines that all the child genres have been selected (step S54: NO), the system control unit 14 ends the relevant genre extraction process.

In a case that the number of times when the keyword information of the argument is specified as a search condition is small, the system control unit 14 need not extract highly relevant genres. This is because, in this case, the number of times when each genre is specified as a search condition along with the keyword information of the argument is small, so that it is not said that it is appropriate to determine that each genre is highly relevant to the keyword information of the argument.

Figure 18:
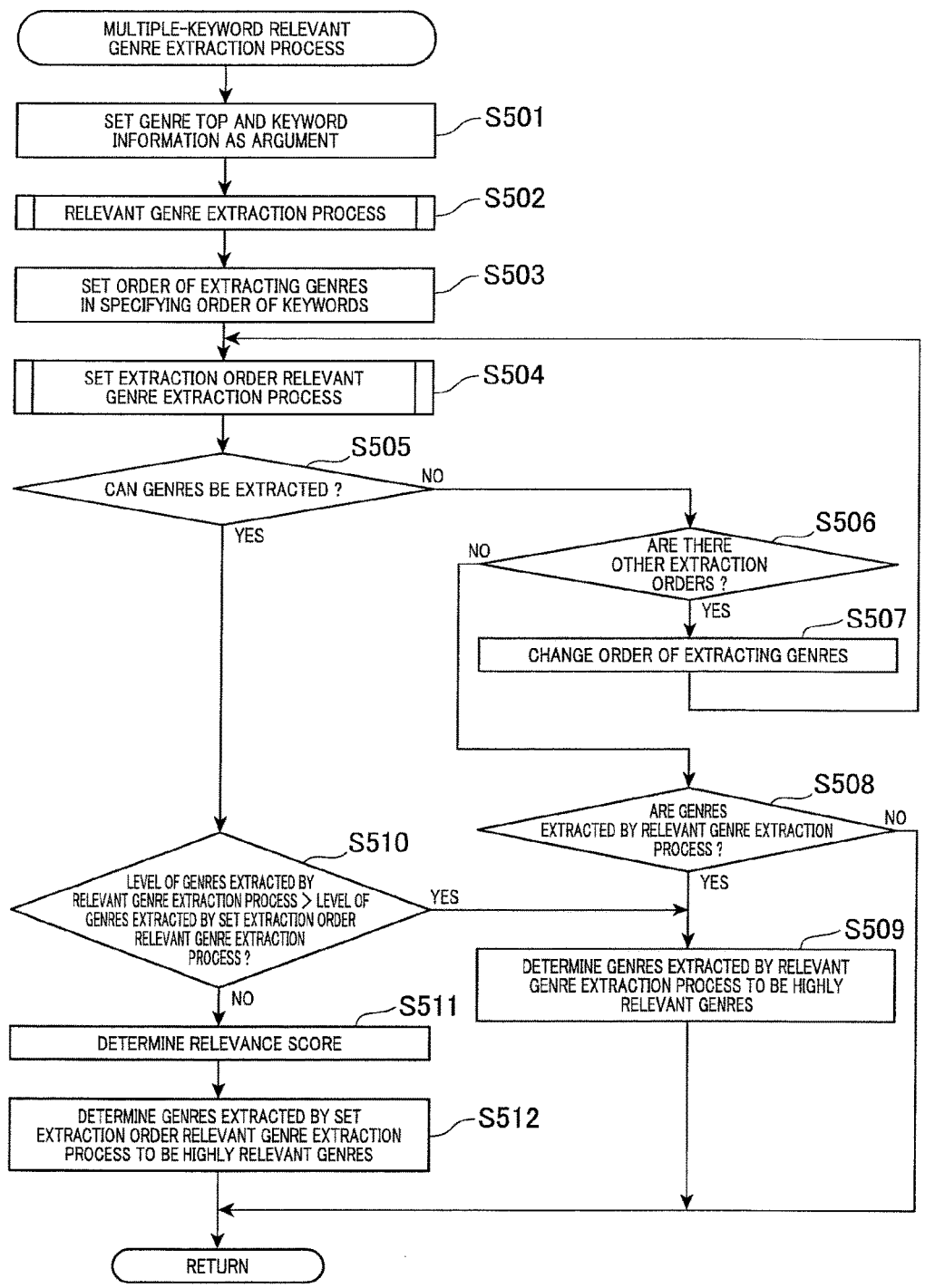
FIG. 18 is a flowchart showing a process example of a multiple-keyword relevant genre extraction process of the system control unit 14 of the electronic mall server 1 according to one embodiment.

FIG. 18 is a flowchart showing a process example of the multiple-keyword relevant genre extraction process of the system control unit 14 of the electronic mall server 1 according to the present embodiment.

First, the system control unit 14 sets the genre ID of the genre top and the keyword information of the argument of the relevant genre extraction control process as an argument of the relevant genre extraction process to be performed next time (step S501). Subsequently, the system control unit 14 performs the relevant genre extraction process (step S502). In the relevant genre extraction process at this time, genres that are highly relevant to the combination of keywords set in the keyword information of the argument are extracted by the method described in the third section.

Subsequently, the system control unit 14 sets orders of keywords to extract genres by the method described in the fourth section according to the specifying order of the keywords set in the keyword information of the argument (step S503). Subsequently, the system control unit 14 performs a set extracting order relevant genre extraction process (step S504). In the set extracting order relevant genre extraction process, genres that are highly relevant to the combination of keywords set in the keyword information of the argument are extracted by the method described in the fourth section. At this time, the highly relevant genres are extracted in the extracting order set in step S503. Further, the details of the set extracting order relevant genre extraction process will be described later.

Subsequently, the system control unit 14 determines whether or not the highly relevant genres can be extracted by the set extracting order relevant genre extraction process (step S505). At this time, in a case that the system control unit 14 determines that the highly relevant genres cannot be extracted (step S505: NO), the system control unit 14 determines whether or not there are extracting orders that have not yet been tried (step S506). At this time, in a case that the system control unit 14 determines that there are extracting orders that have not yet been tried (step S506: YES), the system control unit 14 changes the extracting order to one of the extracting orders that have not yet been tried (step S507). Then, the system control unit 14 performs the set extracting order relevant genre extraction process (step S504).

On the other hand, in a case that the system control unit 14 determines that all the extracting orders have been tried (step S506: NO), the system control unit 14 determines whether or not highly relevant genres are extracted by the relevant genre extraction process in step S502 (step S508). At this time, in a case that the system control unit 14 determines that highly relevant genres are extracted (step S508: YES), the system control unit 14 determines that the genres extracted by the relevant genre extraction process are genres that are highly relevant to the combination of keywords set in the keyword information of the argument (step S509). After completing this process, the system control unit 14 ends the multiple-keyword relevant genre extraction process. On the other hand, in a case that the system control unit 14 determines that no highly relevant genre is extracted (step S508: NO), the system control unit 14 ends the multiple-keyword relevant genre extraction process. In this case, there is no genre that is highly relevant to the combination of keywords set in the keyword information of the argument.

In step S505, in a case that the system control unit 14 determines that the highly relevant genres can be extracted by the set extracting order relevant genre extraction process (step S505: YES), the system control unit 14 compares the levels of the extracted genres. Specifically, the system control unit 14 determines whether or not the value of the level of the genres extracted by the relevant genre extraction process is greater than the value of the level of the genres extracted by the set extracting order relevant genre extraction process (step S510). In other words, the system control unit 14 determines whether or not the level of the genres extracted by the method described in the third section is greater than the level of the genres extracted by the method described in the fourth section. At this time, in a case that the system control unit 14 determines that the value of the level of the genres extracted by the relevant genre extraction process is greater (step S510: YES), the system control unit 14 proceeds to step S509.

On the other hand, in a case that the system control unit 14 determines that the value of the level of the genres extracted by the relevant genre extraction process is not greater than the value of the level of the genres extracted by the set extracting order relevant genre extraction process (step S510: NO), the system control unit 14 determines the relevance score with the combination of keywords set in the keyword information of the argument for the genres extracted by the set extracting order relevant genre extraction process (step S511). For example, the system control unit 14 acquires relevance scores of genres extracted for each keyword in the set extracting order relevant genre extraction process. Then, the system control unit 14 calculates an average value of the acquired relevance scores as the relevance score with the combination of keywords.

Subsequently, the system control unit 14 determines that the genres extracted by the set extracting order relevant genre extraction process are genres that are highly relevant to the combination of keywords set in the keyword information of the argument (step S512). At this time, the system control unit 14 registers the determined relevance score in a record that is registered in the relevant genre list by the set extracting order relevant genre extraction process. After completing this process, the system control unit 14 ends the multiple-keyword relevant genre extraction process.

Figure 19:
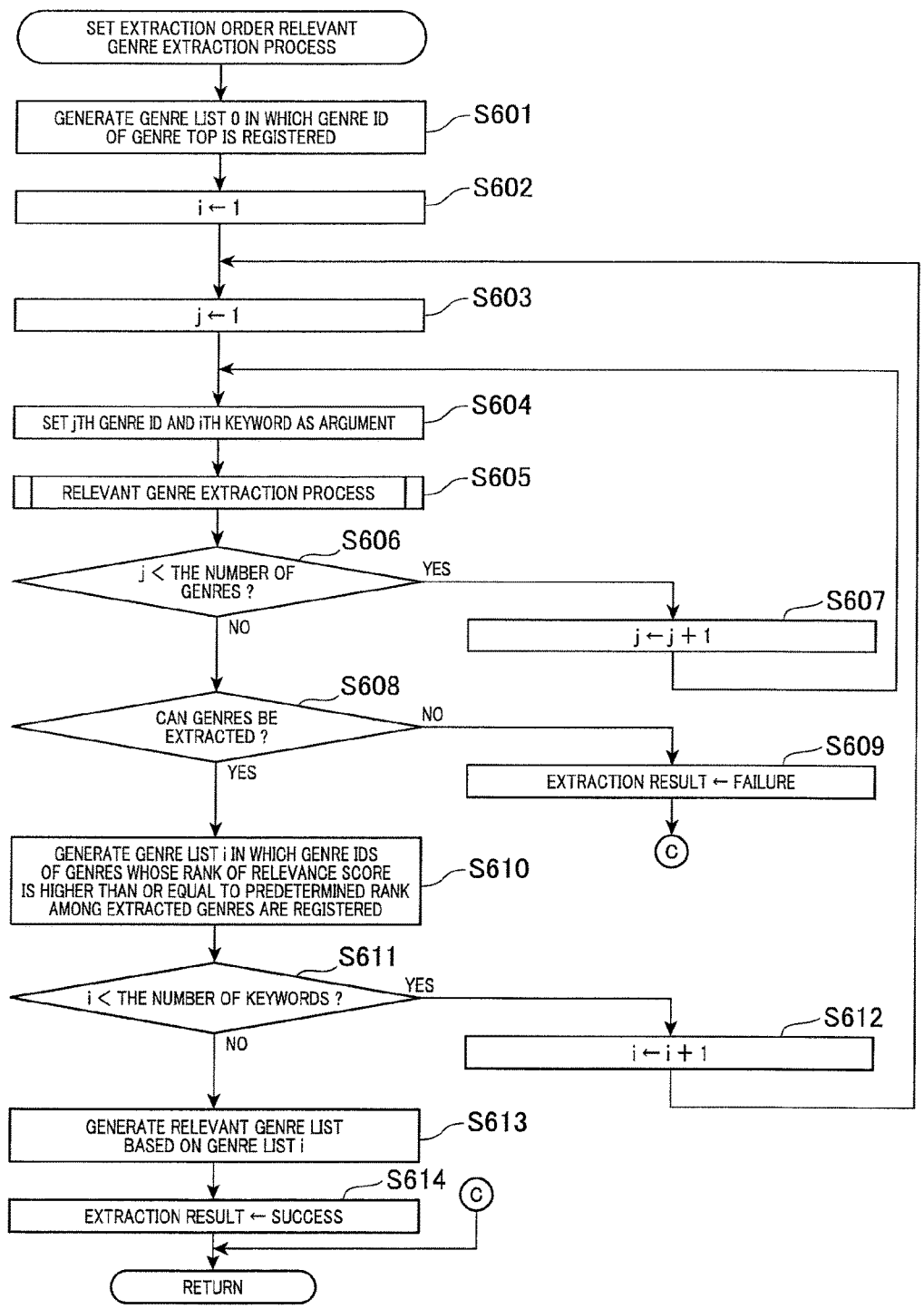
FIG. 19 is a flowchart showing a process example of a set extracting order relevant genre extraction process of the system control unit 14 of the electronic mall server 1 according to one embodiment.

FIG. 19 is a flowchart showing a process example of the set extracting order relevant genre extraction process of the system control unit 14 of the electronic mall server 1 according to the present embodiment.

First, the system control unit 14 generates a genre list 0 in which the genre ID of the genre top is registered (step S601). Subsequently, the system control unit 14 sets an extracting order i to 1 (step S602). Here, a genre list i is a genre list of genres extracted for a keyword whose extracting order is the ith.

Subsequently, the system control unit 14 sets a index j of a genre to 1 (step S603). Subsequently, the system control unit 14 sets a genre ID registered in a jth in a genre list i−1, and a keyword whose extracting order is the ith as an argument of the relevant genre extraction process to be performed next time (step S604). Subsequently, the system control unit 14 performs the relevant genre extraction process (step S605). In the relevant genre extraction process at this time, a genre highly relevant to the ith keyword is extracted from among the descendant genres of the genre indicated by the genre ID set in the argument. Subsequently, the system control unit 14 determines whether or not the index j is smaller than the value of the number of genre IDs registered in the genre list i−1 (step S606). At this time, in a case that the system control unit 14 determines that the index j is smaller than the value of the number of the genre IDs (step S606: YES), the system control unit 14 adds 1 to the index j (step S607). Then, the system control unit 14 proceeds to step S604. The system control unit 14 extracts genres highly relevant to the ith keyword from among the descendant genres of the genre whose genre ID is registered in the genre list i−1 by repeating the processes of steps S604 to S607.

In a case that the system control unit 14 determines that the index j is greater than or equal to the value of the number of the genres (step S606: NO), the system control unit 14 determines whether or not genres can be extracted by the relevant genre extraction process in step S605 (step S608). At this time, in a case that the system control unit 14 determines that the genres cannot be extracted (step S608: NO), the system control unit 14 sets an extraction result to a failure (step S609). After completing this process, the system control unit ends the set extracting order relevant genre extraction process.

On the other hand, in a case that the system control unit 14 determines that the genres can be extracted (step S608: YES), the system control unit 14 ranks the extracted genres in descending order of the relevance score. Then, the system control unit 14 generates a genre list i in which genre IDs of genres whose rank are higher than or equal to a predetermined rank are registered (step S610).

Subsequently, the system control unit 14 determines whether or not the extracting order i is smaller than the number of specified keywords (step S611). At this time, in a case that the system control unit 14 determines that the extracting order is smaller than the number of the keywords (step S611: YES), the system control unit 14 adds 1 to the extracting order i (step S612). Then, the system control unit 14 proceeds to step S603. The system control unit 14 extracts genres highly relevant to the combination of keywords set in the keyword information by repeating the processes of steps S603 to S612.

Then, in a case that the system control unit 14 determines that the extracting order i is greater than or equal to the value of the number of the keywords (step S611: NO), the system control unit 14 generates a relevant genre list (step S613). Specifically, the system control unit 14 registers a record including the genre ID and the keyword information of the argument in the relevant genre list for each genre ID registered in the genre list i. Subsequently, the system control unit 14 sets success as the extraction result (step S614). After completing this process, the system control unit ends the set extracting order relevant genre extraction process.

Figure 20:
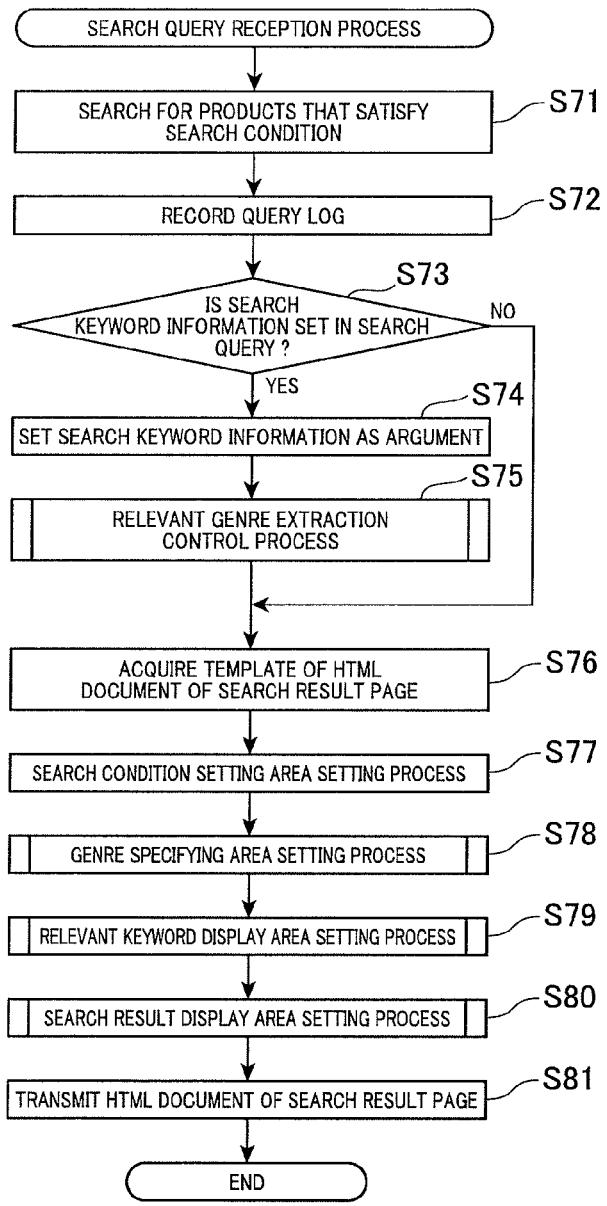
FIG. 20 is a flowchart showing a process example of a process on timing of search query reception of the system control unit 14 of the electronic mall server 1 according to one embodiment.

FIG. 20 is a flowchart showing a process example of a process on timing of search query reception of the system control unit 14 of the electronic mall server 1 according to one embodiment. The search query reception process is started when the electronic mall server 1 receives a search query from the user terminal 2 displaying the top page or the search result page of the electronic mall.

First, the system control unit 14 searches for products that satisfy a search condition specified by a user (step S71). Specifically, in a case that search keyword information is set in the search query, the system control unit 14 searches for product information in which at least either of the product name and the product description includes the search keyword information from the product information DB 12b. Further, in a case that a genre ID is set in the search query, the system control unit 14 searches for product information of products that belong to a genre corresponding to the genre ID from the product information DB 12b on the basis of the genre ID included in the product information. In a case that the search keyword information and the genre ID are set in the search query, the system control unit 14 searches for product information, in which at least either of the product name and the product description includes the search keyword information, of products that belong to a genre corresponding to the genre ID.

Subsequently, the system control unit 14 records a query log (step S72). Specifically, the system control unit 14 acquires a current date and time as a reception date and time. Then, the system control unit 14 generates the query log including the reception date and time, and the search keyword information and the genre ID which are set in the search query. At this time, in a case that the user who requests the search logs in, the system control unit 14 includes the gender, the age, and the prefecture in the query log. For example, when the user logs in to the electronic mall, the system control unit 14 receives a user ID from the user terminal 2 and causes the user terminal 2 to store the received user ID as a cookie. Therefore, when the user logs in, a cookie including the user ID is added to the search query. Therefore, the system control unit 14 acquires the user ID from the cookie added to the search query. Then, the system control unit 14 acquires member information corresponding to the user ID from the member information DB 12a. Then, the system control unit 14 identifies the gender, the age, and the prefecture based on the member information. The system control unit 14 registers the generated query log in the query log DB 12f.

Next, the system control unit 14 determines whether or not the search keyword information is set in the search query (step S73). At this time, in a case that the system control unit 14 determines that the search keyword information is set (step S73: YES), the system control unit 14 sets the search keyword information set in the search query as an argument of the relevant genre extraction control process (step S74). Then, the system control unit 14 performs the relevant genre extraction control process (step S75).

In a case that the system control unit 14 determines that the search keyword information is not set in the search query (step S73: NO) or in a case that the system control unit 14 completes the process of step S75, the system control unit 14 acquires a template of an HTML document of the search result page from the storage unit 12 (step S76). Subsequently, the system control unit 14 performs a search condition setting area setting process (step S77). Specifically, in a case that the genre ID is set in the search query, the system control unit 14 sets the genre ID in the acquired template so that the genre ID is transmitted along with one or more search keywords input in the keyword input field 211 when the search button 213 in the search result page is selected.

Subsequently, the system control unit 14 performs a genre specification area setting process (step S78). In the genre specification area setting process, data for displaying genre links 221 in the genre specifying area 220 of the search result page is set in the acquired template. Subsequently, the system control unit 14 performs a relevant keyword display area setting process (step S79). In the relevant keyword display area setting process, data for displaying relevant keyword links 231 in the relevant keyword display area 230 of the search result page is set in the acquired template. Subsequently, the system control unit 14 performs a search result display area setting process (step S80). In the search result display area setting process, data for displaying corresponding product information 241 in the search result display area 240 of the search result page is set in the acquired template. Further, the details of the genre specification area setting process, the relevant keyword display area setting process, and the search result display area setting process will be described later.

Subsequently, the system control unit 14 transmits an HTML document of the search result page completed by setting each of information to the user terminal 2 that is the transmission source of the search query (step S81). After completing this process, the system control unit 14 ends the search query reception process.

Figure 21:
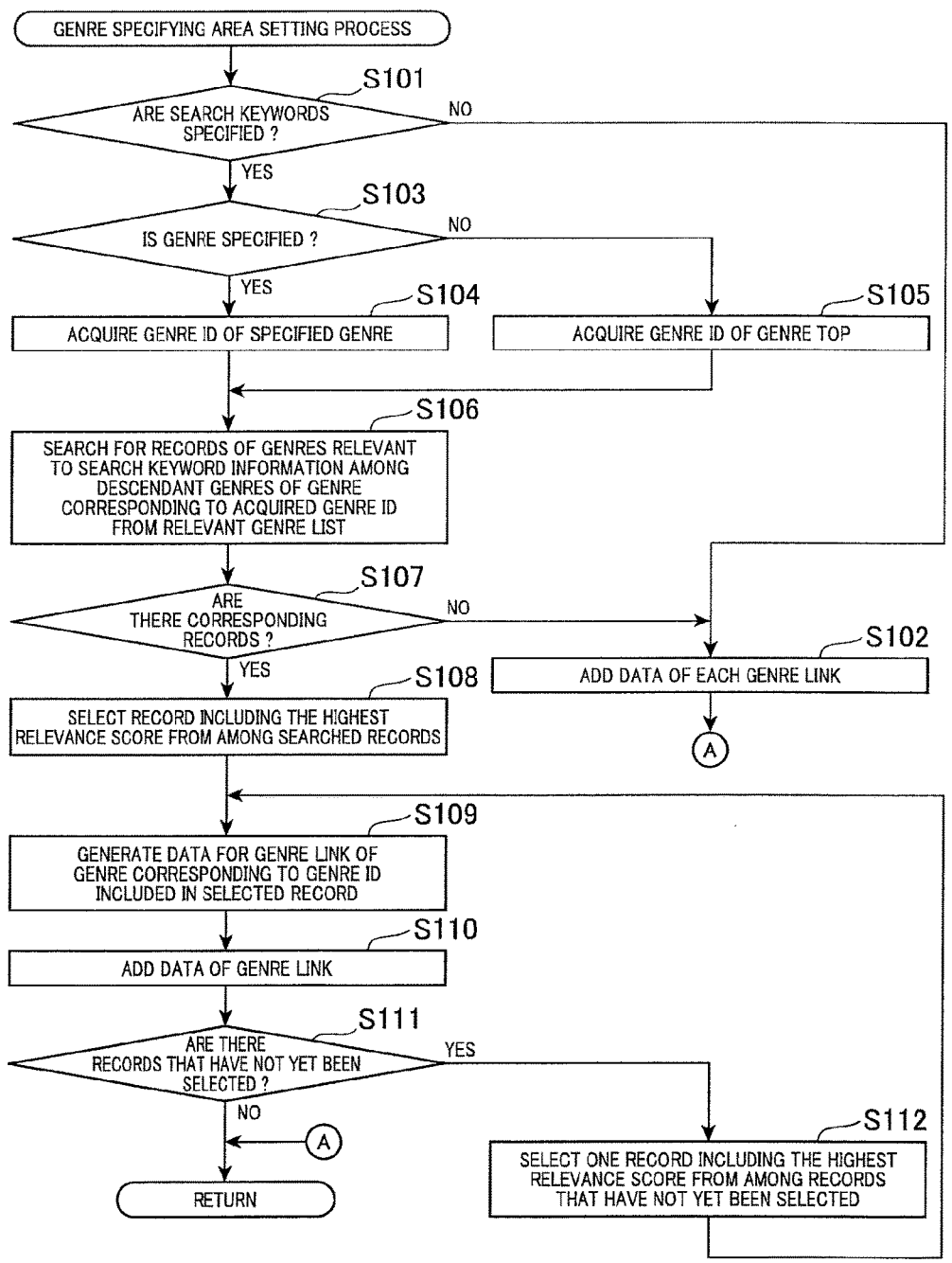
FIG. 21 is a flowchart showing a process example of a genre specification area setting process of the system control unit 14 of the electronic mall server 1 according to one embodiment.

FIG. 21 is a flowchart showing a process example of the genre specification area setting process of the system control unit 14 of the electronic mall server 1 according to the present embodiment.

First, the system control unit 14 determines whether or not one or more search keywords are specified as a search condition (step S101). In other words, the system control unit 14 determines whether or not the search keyword information is set in the search query. At this time, in a case that the system control unit 14 determines that one or more search keywords are not specified (step S101: NO), the system control unit 14 performs a normal process to display the genre links 221 (step S102). Specifically, in a case that no genre ID is set in the search query, the system control unit 14 generates data for the genre link 221 for each genre of level 1. On the other hand, in a case that the genre ID is set in the search query, the system control unit 14 generates data for the genre link 221 for each child genre of the genre corresponding to the genre ID. When generating the date for the genre link 221, the system control unit 14 sets a URL for searching for a product in an href attribute of "a" tag. Here, the system control unit 14 generates the URL for searching for a product by adding the genre ID of a corresponding genre to a URL indicating the transmission destination of the search query. Further, the system control unit 14 sets the genre name of the corresponding genre between the start tag and the end tag of the "a" tag. The system control unit 14 additionally sets the generated data for the genre links 221 in an area corresponding to the genre specifying area 220 in the acquired template. After completing this process, the system control unit 14 ends the genre specification area setting process.

On the other hand, in a case that the system control unit 14 determines that one or more search keywords are specified (step S101: YES), the system control unit 14 determines whether or not a genre is specified as a search condition (step S103). In other words, the system control unit 14 determines whether or not the genre ID is set in the search query. Here, the genre corresponding to the genre ID set in the search query is referred to as a "specified genre". At this time, in a case that the system control unit 14 determines that the genre is specified (step S103: YES), the system control unit 14 acquires the genre ID set in the search query (step S104). On the other hand, in a case that the system control unit 14 determines that no genre is specified (step S103: NO), the system control unit 14 acquires the genre ID of the genre top (step S105).

After completing the process of step S104 or step S105, the system control unit 14 searches for records of genres highly relevant to one or more search keyword set in the search keyword information among the descendant genres of the genre indicated by the acquired genre ID from the relevant genre list output by the relevant genre extraction control process in step S75 shown in FIG. 20 (step S106). Specifically, the system control unit 14 acquires a genre ID from each record registered in the relevant genre list. Subsequently, the system control unit 14 identifies the descendant genres of the genre indicated by the genre ID acquired in step S104 or step S105 from among the genres indicated by the genre IDs acquired from the records on the basis of the genre IDs acquired from the records and the genre information registered in the genre information DB 12c. Then, the system control unit 14 extracts records including the genre IDs of the identified genres from among the searched records.

Subsequently, the system control unit 14 determines whether or not there are corresponding records as a result of the search in step S106 (step S107). At this time, in a case that the system control unit 14 determines that there is no corresponding record (step S107: NO), the system control unit 14 proceeds to step S102. This is a case in which there is no genre that is highly relevant to the search keyword information specified by a user.

On the other hand, in a case that the system control unit 14 determines that there are corresponding records (step S107: YES), the system control unit 14 selects a record including the highest relevance score from among the searched records (step S108). Subsequently, the system control unit 14 generates data for the genre link 221 of the genre corresponding to the genre ID included in the selected record (step S109). This generation method of the data is the same as that described in step S102. However, when generating the URL for searching for a product, the system control unit 14 generates the URL by adding the genre ID of the corresponding genre and one or more search keywords included in the search keyword information to the URL indicating the transmission destination of the search query.

Subsequently, the system control unit 14 additionally sets the generated data for the genre link 221 of the genre in an area corresponding to the genre specifying area 220 in the acquired template (step S110).

Subsequently, the system control unit 14 determines whether or not there are records that have not yet been selected among the searched records (step S111). At this time, in a case that the system control unit 14 determines that there are records that have not yet been selected (step S111: YES), the system control unit 14 selects one record including the highest relevance score from among the records that have not yet been selected (step S112). Subsequently, the system control unit 14 proceeds to step S109. The system control unit 14 determines a display order of the genre links 221 highly relevant to the search keyword information on the basis of the relevance scores by repeating the processes of steps S109 to S112. In other words, the system control unit 14 determines so that the higher the relevance score of the genre is, the more preferentially the genre link 221 of the genre is displayed. Then, in a case that the system control unit 14 determines that all the records have been selected (step S111: NO), the system control unit 14 ends the genre specification area setting process.

Figure 22:
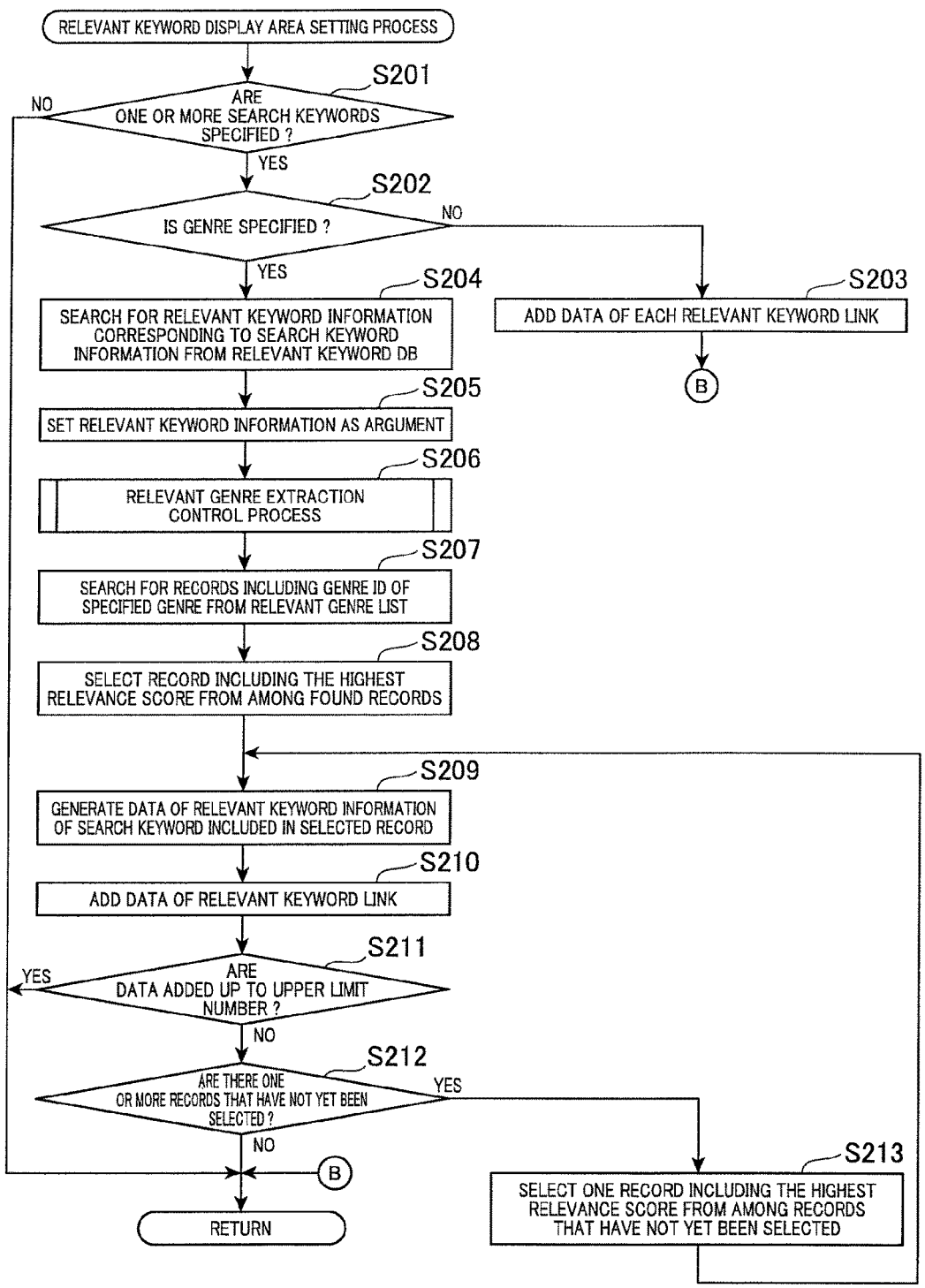
FIG. 22 is a flowchart showing a process example of a relevant keyword display area setting process of the system control unit 14 of the electronic mall server 1 according to the embodiment.

FIG. 22 is a flowchart showing a process example of the relevant keyword display area setting process of the system control unit 14 of the electronic mall server 1 according to the present embodiment.

First, the system control unit 14 determines whether or not one or more search keywords are set as a search condition (step S201). At this time, in a case that the system control unit 14 determines that one or more search keywords are not specified (step S201: NO), the system control unit 14 ends the relevant keyword display area setting process. On the other hand, in a case that the system control unit 14 determines that one or more search keywords are specified (step S201: YES), the system control unit 14 determines whether or not a genre is specified as a search condition (step S202).

At this time, in a case that the system control unit 14 determines that no genre is specified (step S202: NO), the system control unit 14 performs a normal process to display the relevant keyword links 231 (step S203). Specifically, the system control unit 14 searches for the relevant keyword information corresponding to the search keyword information set in the search query from the relevant keyword DB 12e. Subsequently, the system control unit 14 generates data for the relevant keyword links 231 of the searched relevant keyword information. At this time, the system control unit 14 sets a URL for searching for a product in an href attribute of "a" tag. Here, the system control unit 14 generates the URL for searching for a product by adding the relevant keyword information to a URL indicating the transmission destination of the search query. Further, the system control unit 14 sets the relevant keyword information between the start tag and the end tag of the "a" tag. The system control unit 14 additionally sets the generated data for the relevant keyword links 231 in an area corresponding to the relevant keyword display area 230 in the acquired template. After completing this process, the system control unit 14 ends the relevant keyword display area setting process.

On the other hand, in a case that the system control unit 14 determines that a genre is specified (step S202: YES), the system control unit 14 searches for the relevant keyword information corresponding to the search keyword information from the relevant keyword DB 12e (step S204).

Subsequently, the system control unit 14 sets the searched relevant keyword information as an argument of the relevant genre extraction control process (step S205). Then, the system control unit 14 performs the relevant genre extraction control process for each of the searched relevant keyword information (step S206). Thereby, genres that are highly relevant to one or more keywords relevant to one or more search keywords specified by a user are extracted.

Subsequently, the system control unit 14 searches for records including the genre ID of the specified genre from the relevant genre list output by the relevant genre extraction control process in step S206 (step S207).

Subsequently, the system control unit 14 selects a record including the highest relevance score from among the searched records (step S208). Subsequently, the system control unit 14 generates data for the relevant keyword link 231 of the relevant keyword information included in the selected record as the keyword information (step S209). This generation method of the data is the same as that described in step S203. However, when generating a URL for searching for a product, the system control unit 14 generates the URL by adding the relevant keyword information and the genre ID of the specified genre to a URL indicating the transmission destination of the search query. Subsequently, the system control unit 14 additionally sets the generated data for the relevant keyword link 231 in an area corresponding to the relevant keyword display area 230 in the acquired template (step S210).

Subsequently, the system control unit 14 determines whether or not data for the relevant keyword link 231 are added up to an upper limit number of the relevant keyword links 231 that can be displayed (step S211). At this time, in a case that the system control unit 14 determines that the data are added up to the upper limit number (step S211: YES), the system control unit 14 ends the relevant keyword display area setting process. On the other hand, in a case that the system control unit 14 determines that the data are not added up to the upper limit number (step S211: NO), the system control unit 14 determines whether or not there are records that have not yet been selected among the searched records (step S212). At this time, in a case that the system control unit 14 determines that there are records that have not yet been selected (step S212: YES), the system control unit 14 selects one record including the highest relevance score from among the records that have not yet been selected (step S213). Next, the system control unit 14 proceeds to step S209. The system control unit 14 determines a display order of the relevant keyword links 231 of the relevant keyword information which is the relevant keyword information of the search keyword information and which is highly relevant to the specified genre on the basis of the relevance scores by repeating the processes of steps S209 to S213. In other words, the system control unit 14 determines so that the higher the relevance score of the relevant keyword information is, the more preferentially the relevant keyword link 231 of the relevant keyword information is displayed. Then, in a case that the system control unit 14 determines that all the records have been selected (step S212: NO), the system control unit 14 ends the relevant keyword display area setting process.

Figure 23:
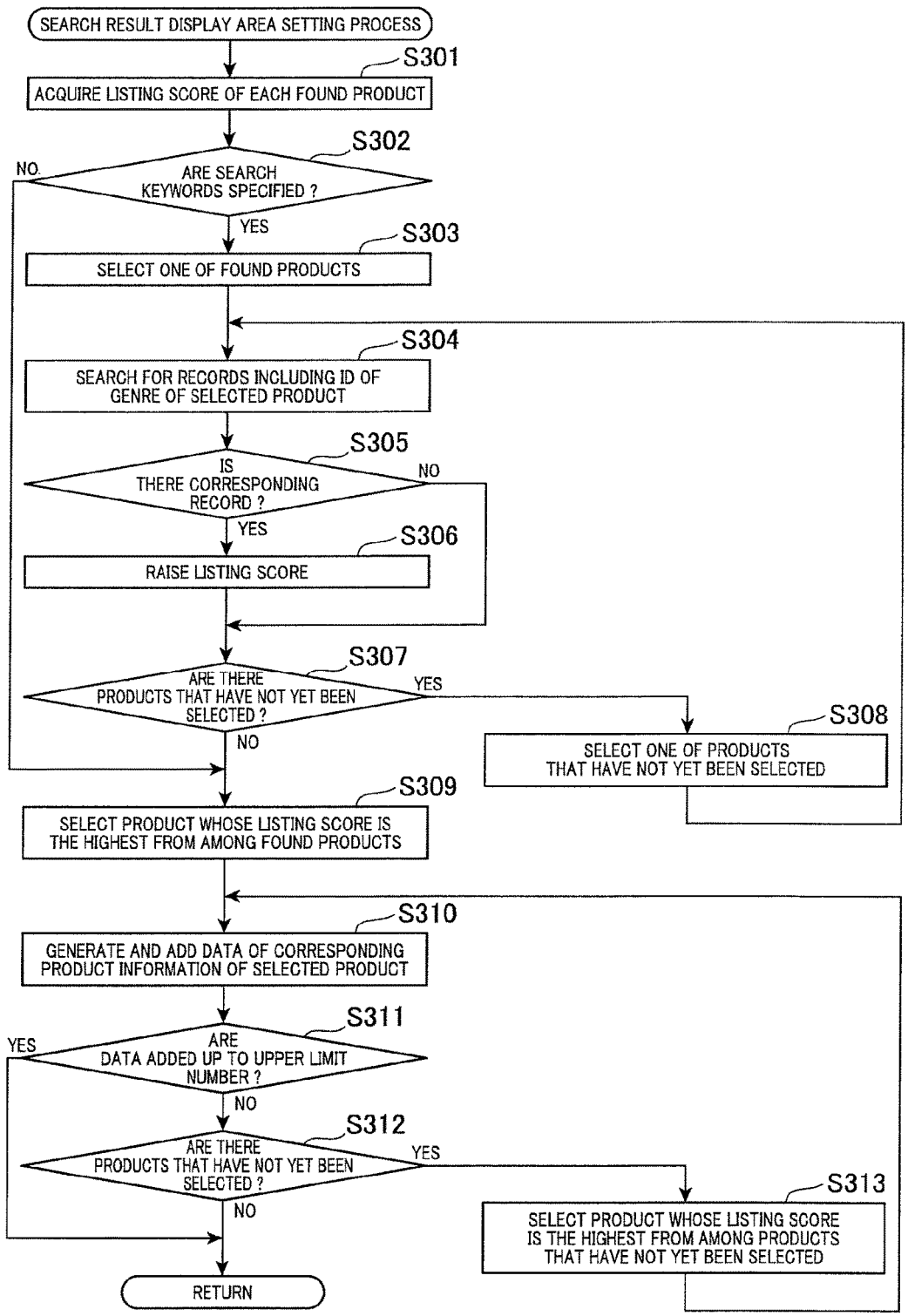
FIG. 23 is a flowchart showing a process example of a search result display area setting process of the system control unit 14 of the electronic mall server 1 according to one embodiment.

FIG. 23 is a flowchart showing a process example of the search result display area setting process of the system control unit 14 of the electronic mall server 1 according to the embodiment.

First, the system control unit 14 acquires the listing score of each product searched in step S71 of the process on timing of search query reception through, for example, the API of the product evaluation program (step S301). Subsequently, the system control unit 14 determines whether or not one or more search keywords are specified as a search condition (step S302). At this time, in a case that the system control unit 14 determines that one or more search keywords are specified (step S302: YES), the system control unit 14 selects one of the searched products (step S303). Here, the selected product is referred to as a "selected product".

Subsequently, the system control unit 14 acquires the genre ID of the child genre to which the selected product belongs among the child genres of the specified genre. The genre to which the selected product belongs is the same genre as the genre corresponding to the genre ID included in the product information of the selected product, or a genre having the genre corresponding to the genre ID included in the product information of the selected product as a descendant genre. Subsequently, the system control unit 14 searches for records including the acquired genre ID from the relevant genre list output by the relevant genre extraction control process in step S75 shown in FIG. 20 (step S304). Subsequently, the system control unit 14 determines whether or not there is a corresponding record as a result of the search (step S305). At this time, in a case that the system control unit 14 determines that there is a corresponding record (step S305: YES), the system control unit 14 raises the listing score of the selected product (step S306). For example, the system control unit 14 may add a predetermined value to the listing score, or may multiply the listing score by a predetermined coefficient. Further, the system control unit 14 may raise the listing score so that the higher the relevance score included in the searched record is, the more the listing score is raised.

In a case that the system control unit 14 determines that there is no corresponding record in step S305 (step S305: NO), or in a case that the system control unit 14 completes the process of step S306, the system control unit 14 determines whether or not there are products that have not yet been selected among the searched products (step S307). At this time, in a case that the system control unit 14 determines that there are products that have not yet been selected (step S307: YES), the system control unit 14 selects one of the products that have not yet been selected (step S308). Subsequently, the system control unit 14 proceeds to step S304. The system control unit 14 raises the listing score of the products of the genre that is highly relevant to the search keyword information among the searched product by repeating the processes of steps S304 to S308.

In a case that the system control unit 14 determines that one or more search keywords are not specified in step S302 (step S302: NO), or determines that all the products have been selected (step S307: NO), the system control unit 14 selects the product whose listing score is the highest among the searched product (step S309). Subsequently, the system control unit 14 generates data for the corresponding product information 241 based on the product information of the selected product. Then, the system control unit 14 additionally sets the generated data in an area corresponding to the search result display area 240 in the acquired template (step S310).

Subsequently, the system control unit 14 determines whether or not data for the corresponding product information 241 are added up to an upper limit number of pieces of the corresponding product information 241 that can be displayed (step S311). At this time, in a case that the system control unit 14 determines that the data are added up to the upper limit number (step S311: YES), the system control unit 14 ends the search result display area setting process. On the other hand, in a case that the system control unit 14 determines that the data are not added up to the upper limit number (step S311: NO), the system control unit 14 determines whether or not there are products that have not yet been selected among the searched products (step S312). At this time, in a case that the system control unit 14 determines that there are products that have not yet been selected (step S312: YES), the system control unit 14 selects one product whose listing score is the highest (step S313). Subsequently, the system control unit 14 proceeds to step S310. The system control unit 14 makes the products so that the higher the listing score of the products are, the more preferentially the corresponding product information 241 of the product is displayed by repeating the processes of steps S310 to S313. Then, in a case that the system control unit 14 determines that all the products have been selected (step S312: NO), the system control unit 14 ends the search result display area setting process.

The user terminal 2 that receives the HTML document of the search result page from the electronic mall server 1 displays the search result page on a screen on the basis of the HTML document. At this time, the CPU of the user terminal 2 displays the genre links 221 in the genre specifying area 220 in a setting order of the data for the genre links 221 on the basis of the data for the genre links 221. Further, the CPU of the user terminal 2 displays the relevant keyword links 231 in the relevant keyword display area 230 in a setting order of the data for the relevant keyword links 231 on the basis of the data for the relevant keyword links 231. Further, the CPU of the user terminal 2 displays pieces of the corresponding product information 241 in the search result display area 240 in a setting order of the data for the corresponding product information 241 on the basis of the data for the corresponding product information 241.

FIG. 24 is a flowchart showing a process example of a process on timing of search keyword candidate request reception of the system control unit 14 of the electronic mall server 1 according to the present embodiment. Every time a user performs an input operation to the keyword input field 211 of the search result page displayed by the user terminal 2, the user terminal 2 transmits a search keyword candidate request to the electronic mall server 1. The input operation includes operations such as adding characters to the keyword input field 211 and deleting characters from the keyword input field 211. A character string input in the keyword input field 211 at the time point of transmission is set in the search keyword candidate request. Further, in a case that a genre was specified as a search condition in the previous page, the genre ID of the genre is set in the search keyword candidate request. The search keyword candidate request reception process is started when the electronic mall server 1 receives the search keyword candidate request.

First, the system control unit 14 determines whether or not a genre ID is set in the search keyword candidate request (step S401). At this time, in a case that the system control unit 14 determines that no genre ID is set (step S401: NO), the system control unit 14 searches for the keyword information forward coinciding with the character string set in the search keyword candidate request from the keyword DB 12d. Then, the system control unit 14 transmits a list of the searched keyword information to the user terminal 2 as candidates of one or more search keyword (step S402). After completing this process, the system control unit 14 ends the search keyword candidate request reception process.

On the other hand, in a case that the system control unit 14 determines that a genre ID is set (step S401: YES), the system control unit 14 searches for the keyword information including the search keyword information forward coinciding with the character string set in the search keyword candidate request from the keyword DB 12d (step S403). Subsequently, the system control unit 14 sets the searched keyword information as an argument of the relevant genre extraction control process (step S404). Then, the system control unit 14 performs the relevant genre extraction control process for each of the searched keyword information (step S405). Thereby, genres that are highly relevant to one or more keywords including the character string input by the user are extracted.

Subsequently, the system control unit 14 extracts records including the genre ID set in the search keyword candidate request from among the records registered in the relevant genre list output by the relevant genre extraction control process in step S405 (step S406). Subsequently, the system control unit 14 rearranges the extracted records in descending order of the relevance score included in the records. Subsequently, the system control unit 14 acquires the keyword information from the extracted records in descending order of the relevance score. At this time, the system control unit 14 acquires the keyword information up to the upper limit of the number of keywords that can be displayed in the search keyword candidate display area 214 at most. Then, the system control unit 14 generates a list showing the keyword information acquired from the records in descending order of the relevance score. In this way, the system control unit 14 determines the keyword information displayed in the search keyword candidate display area 214 so that the keyword information that is highly relevant to the genre corresponding to the genre ID set in the search keyword candidate request among the keyword information forward coinciding with the character string set in the search keyword candidate request is preferentially displayed. Then, the system control unit 14 transmits the generated list of the keyword information to the user terminal 2 (step S407). After completing this process, the system control unit 14 ends the process on timing of search keyword candidate request reception.

When the user terminal 2 receives the list of the keyword information from the electronic mall server 1, the user terminal 2 displays the search keyword candidate display area 214 in the search result page. Then, the CPU of the user terminal 2 displays the keyword information registered in the received list in the search keyword candidate display area 214 in a registration order and displays the keyword information as one or more search keywords to be able to be specified.

As described above, according to the present embodiment, the system control unit 14 extracts genres where the number of times when being specified as a search condition along with a keyword whose extracting order is the first is greater than or equal to a threshold value from among a plurality of genres of product. Subsequently, the system control unit 14 extracts genres where the number of times when being specified as a search condition along with a keyword whose extracting order is the second is greater than or equal to a threshold value from among the extracted genres as genres relevant to a combination of the first keyword and the second keyword. Therefore, it is possible to extract genres highly relevant to a combination of keywords. Further, it is possible to increase a probability that genres highly relevant to a combination of keywords are extracted.

Further, the system control unit 14 determines the threshold value corresponding to the first keyword (an example of a first threshold value) and the threshold value corresponding to the second keyword (an example of a second threshold value) separately from each other. Therefore, these threshold values may be equal to each other or may be different from each other.

When the system control unit 14 extracts genres highly relevant to a combination of keywords, the system control unit 14 extracts genres highly relevant to each keyword in an extracting order that is the same as the specifying order of the search keywords. Therefore, it is possible to increase a probability that genres highly relevant to the combination of keywords are extracted in the first extraction.

Further, in a case that the system control unit 14 could not extract a genre highly relevant to the combination of keywords in the extracting order that is the same as the specifying order of the search keywords because the system control unit 14 could not extract at least either of a genre highly relevant to the keyword whose extracting order is the first and a genre highly relevant to the keyword whose extracting order is the second, the system control unit 14 changes the extracting order and then performs the extraction. Therefore, it is possible to increase a probability that genres highly relevant to a combination of keywords are extracted.

Further, the system control unit 14 extracts genres where the number of times when being specified as a search condition along with the keyword whose extracting order is the first and the keyword whose extracting order is the second is greater than or equal to a threshold value by the method described in the third section. Subsequently, the system control unit 14 determines either of the genres extracted by the method described in the third section and the genres extracted by the method described in the fourth section as genres relevant to a combination of keywords on the basis of a predetermined criterion. Therefore, it is possible to extract genres that are reliable as genres highly relevant to a combination of keywords by setting a criterion.

The system control unit 14 determines a threshold value (an example of a third threshold value) used in a case that performing extraction by the method described in the third section and threshold values (an example of the first threshold value and the second threshold value) used in a case that performing extraction by the method described in the fourth section separately from each other. Therefore, these threshold values may be equal to each other or may be different from each other.

The system control unit 14 determines a genre whose level is greater as a genre relevant to a combination of keywords. Therefore, it is possible to extract a genre that is reliable as a genre highly relevant to a combination of keywords.

In a case that the entropy indicating the smallness of variation of the number of times of specifying among the plurality of genres in the sibling relationship is smaller than or equal to a threshold value, the system control unit 14 extracts, from among a plurality of genres in a sibling relationship, genres where the number of times of specifying is greater than or equal to a threshold value. Therefore, it is possible to extract genres where the number of times of specifying is greater than that of the other genres from among the plurality of genres in the sibling relationship as genres highly relevant to a keyword.

Further, in a case that a plurality of child genres belonging to a genre that is highly relevant to one or more search keywords are set, the system control unit 14 acquires the number of times when one of the plurality of child genres is specified as a search condition along with the one or more search keywords for each child genre, and extracts child genres where the acquired number of times is greater than or equal to a threshold value. Therefore, it is possible to hierarchically extract genres highly relevant to keywords.

Further, the system control unit 14 extracts genres, where the number of times of specifying is greater than or equal to a threshold value determined according to the number of genres in a sibling relationship, as genres highly relevant to a search keyword from among the genres in the sibling relationship. Therefore, it is possible to appropriately extract genres highly relevant to a keyword according to the number of genres in a sibling relationship.

Further, the system control unit 14 receives a search query from the user terminal 2, and determines a display order of genres displayed by the user terminal 2 which displays the genre links 221 of genres highly relevant to one or more search keywords included in the search query among a plurality of genres on the basis of the relevance score according to an acquired number of times. Therefore, a user can easily find out a genre to be specified as a search condition from the genre specifying area 220.

Further, when the system control unit 14 receives a character string input in the keyword input field 211 from the user terminal 2 along with a genre ID of a genre specified as a search condition, and determines keywords displayed by the user terminal 2 which displays one or more keywords including the received character string in the search keyword candidate display area 214, the system control unit 14 determines the keywords so that one or more keywords highly relevant to a genre indicated by the received genre ID are preferentially displayed. Therefore, a user can easily specify a search keyword from the search keyword candidate display area 214.

Further, the system control unit 14 receives a search query from the user terminal 2, acquires listing scores of products searched based on one or more search keywords included in the search query, and relatively raises the listing scores of products belonging to a genre highly relevant to the one or more search keywords included in the search query among the searched products with respect to the listing scores of the other products. Therefore, a user can easily find out information of products highly relevant to one or more keywords from the search result display area 240.

Further, the electronic mall server 1 may extract a combination of one or more search keywords and a genre that are highly relevant to each other for each set of attributes of a user who specifies a search condition. This is because there is a case in which a specification trend of a combination of one or more search keywords and a genre that is used as a search condition varies depending on attributes of the user. Attributes of users are registered in the query log DB 12*f*, so that it is possible to calculate the number of times of specifying of a combination of one or more search keywords and a genre for each set of attributes of a user who specifies a search condition. The reason why the combination is extracted for each set of attributes is to personalize display content of the search result page.

Specifically, for example, the system control unit 14 extracts a combination of the search keyword information, the genre ID, the gender, the age, and the prefecture from the query log in step S3 of the number of times of specifying tabulation process shown in FIG. 15. At this time, the system control unit 14 extracts only the search keyword information and the genre ID from a query log in which the gender, the age, and the prefecture are not registered. Then, the system control unit 14 performs the processes of steps S4 to S17 as described above. In other words, the system control unit 14 first tabulates the numbers of times of specifying without considering the attributes of a user.

Subsequently, the system control unit 14 performs basically the same processes as those of steps S4 to S17 for each of attributes of a user. As an example, a case in which the processes are performed by gender will be described. In step S4, the system control unit 14 extracts combinations in which male is set as the gender from among the combinations acquired from the query log DB 12*f*. Then, the system control unit 14 calculates the number of times when a genre is specified as a search condition along with search keywords for each genre on the basis of the combinations extracted from among the combinations acquired from the query log DB 12*f* (step S4). Then, the system control unit 14 performs registration into the keyword/genre list (step S5). In step S15, when the system control unit 14 registers the number of times of specifying information in the number of times of specifying information DB 12*g*, the system control unit 14 registers the number of times of specifying information including attribute information indicating a male. After completing the processes for male, the system control unit 14 performs the same processes for female.

When the system control unit 14 receives a search query from the user terminal 2, the system control unit 14 determines whether or not the user who requests the search logs in. This can be determined by checking whether or not a cookie including the user ID is added to the search query. If the system control unit 14 determines that the user does not log in, the system control unit 14 calculates the specifying probability based on the number of times of specifying information that does not include the attribute information in step S43 of the relevant genre extraction process shown in FIG. 17. This is because in a case that the user does not log in, the attribute of the user cannot be identified. Therefore, the system control unit 14 performs the processes without considering the attributes of the user. On the other hand, in a case that the system control unit 14 determines that the user logs in, the system control unit 14 identifies the attributes of the user. Then, the system control unit 14 calculates the specifying probability based on the number of times of specifying information including the attribute information indicating the attributes of the user. Thereby, it is possible to form the display content of the search result page to be suitable to the attributes of the user who browses the search result page. Further, similar processes are performed in the search keyword candidate request reception process.

Further, in the embodiment described above, the electronic mall server 1 extracted a combination of one or more search keywords and a genre that are highly relevant to each other on the basis of the number of times when one or more search keywords and a genre are specified as a search condition. However, the electronic mall server 1 may extract a combination of one or more search keywords and a genre that are highly relevant to each other on the basis of the number of times when a searched product is purchased (the number of times when an order is established) based on a search of the product by a search condition of one or more search keywords and a genre among the number of times when the one or more search keywords and the genre are specified as the search condition. The number of times is referred to as "the number of times of specifying with purchase condition". This is because it is considered that in a case that a product is purchased after a search is performed by using a search condition, the relevance between search keywords and a genre specified as the search condition is higher than in a case that a user only specifies the search condition.

Therefore, in the storage unit 12, a purchase history DB 12h is constructed. FIG. 25 is a figure showing one example of content registered in the purchase history DB 12h. In the purchase history DB 12h, a purchase history of products by a user is registered. Specifically, in the purchase history DB 12h, an order code, a purchase date and time, a user ID, a product ID, a shop ID, a product code, a gender, an age, a prefecture, search keyword information, a search genre ID, and the like are registered in association with each purchase of product. The order code is identification information of an order given each time a product is ordered. The user ID indicates a user who purchased the product. The product ID and the product code indicate a purchased product. The shop ID indicates a shop from which the product is purchased. The gender, the age, and the prefecture are attributes of the user who purchased the product. The search keyword information and the search genre ID are one or more search keywords specified as a search condition and a genre ID of a genre specified as a search condition.

For example, when the system control unit 14 receives a search query from the user terminal 2 and thereby transmits an HTML document of a search result page to the user terminal 2, the system control unit 14 transmits a cookie including search keyword information and a genre ID included in the search query to the user terminal 2. Thereby, the system control unit 14 can receive the search keyword information and the genre ID that were specified immediately previous time as a search condition from the user terminal 2 as a cookie. By user's selecting of any of the corresponding product information 241 from the search result display area 240 in the search result page, a product page is displayed on a screen of the user terminal 2. By the user's performing of a purchase operation in the product page, the user terminal 2 transmits a purchase request to the electronic mall server 1. When the system control unit 14 receives the purchase request, the system control unit 14 registers a purchase history. At this time, the system control unit 14 acquires a current date and time as a purchase date and time. Further, the system control unit 14 acquires the gender, the age, and the prefecture of the user. Further, the system control unit 14 acquires the search keyword information and the genre ID from a cookie added to the search request. Then, the system control unit 14 registers a purchase history including these acquired information in the purchase history DB 12h.

For example, the system control unit 14 acquires a combination of the search keyword information and the search genre ID from a purchase history registered in the purchase history DB 12h in step S3 of the number of times of specifying tabulation process shown in FIG. 15. Thereafter, the system control unit 14 performs steps S4 to S17 as described above. At this time, the system control unit 14 may perform the processes based on the number of times of specifying with purchase condition instead of the number of times of specifying.

Further, every time a user performs an input operation to the keyword input field 211 in the search result page, the display of the genre links 221 in the genre specifying area 220 may be dynamically changed according to a character string input in the keyword input field 211. Specifically, a genre link 221 of a genre relevant to a search keyword including the input character string may be displayed. For example, when the system control unit 14 receives a search keyword candidate request from the user terminal 2, the system control unit 14 extracts genres highly relevant to search keyword information forward coinciding with a character string set in the search keyword candidate request. The system control unit 14 adds data for the genre link 221 for each extracted genre.

In the embodiment described above, the electronic mall server 1 recorded query logs and calculated the number of times of specifying based on the query logs. However, the electronic mall server 1 may calculate the number of times of specifying by using another method without recording the query logs. For example, in a case that the system control unit 14 receives a search query including search keyword information and a genre ID from the user terminal 2, the system control unit 14 determines whether or not these search keyword information and genre ID are registered in the number of times of specifying information DB 12g. At this time, in a case that the system control unit 14 determines that the search keyword information and the genre ID are not registered, the system control unit 14 registers a combination of the search keyword information and the genre ID included in the search query and the number of times of specifying in the number of times of specifying information DB 12g. At this time, the system control unit 14 sets the number of times of specifying to 1. On the other hand, in a case that the system control unit 14 determines that the search keyword information and the genre ID are registered, the system control unit 14 adds 1 to the number of times of specifying corresponding to the search keyword information and the genre ID included in the search query in the number of times of specifying information DB 12g.

Further, in the embodiment described above, the category of the present invention was applied to the genre. However, the of the present invention may be applied to, for example, a category, a price range, a region, and the like.

Further, in the embodiment described above, the present invention is applied when a product was searched for as a search target. However, the present invention may be applied to, for example, a search for a service, a web page, an image, a moving image, a sound, a map, news, a blog, and the like.

DESCRIPTION OF REFERENCE NUMERALS

1: Electronic mall server
2: User terminal
11: Communication unit
12: Storage unit
12a: Member information DB
12b: Product information DB
12c: Genre information DB
12d: Keyword DB
12e: Relevant keyword DB
12f: Query log DB
12g: Number of times of specifying information DB
13: I/O interface
14: System control unit
14a: CPU
14b: ROM
14c: RAM
15: System bus
NW: Network
S: Shopping system

The invention claimed is:

1. An information processing apparatus comprising:
at least one memory operable to store program code;
at least one processor operable to read the program code and operate as instructed by the program code, the program code including:
query log code configured to cause the at least one processor to record a query log in response to receiving a search query including a category, from among a plurality of categories that are hierarchized in a tree structure, and a keyword;
first extraction code configured to cause the at least one processor to extract, based on the recorded query log, from among the plurality of categories, a category where the number of times when the category is specified as a search condition along with a first keyword is greater than or equal to a first threshold value; and
second extraction code configured to cause the at least one processor to extract, from among categories corresponding to descendants of the category extracted by the first extraction code, a category where a number of times when the category is specified as a search condition along with a second keyword is greater than or equal to a second threshold value as a category relevant to a combination of the first keyword and the second keyword,
wherein, when a search is executed based on designation of the first keyword and the second keyword, without designation of any category, the extracted category is displayed together with a keyword search result, and
wherein, in response to a user input selecting the extracted category, a new search result is displayed according to a search executed based on the first keyword, the second keyword, and the selected extracted category.

2. The information processing apparatus according to claim 1, wherein
the first extraction code and the second extraction code cause the at least one processor to extract the category in the same order as an order in which the first keyword and the second keyword in the combination are specified.

3. The information processing apparatus according to claim 2, wherein
in a case that the combination cannot be extracted by at least one of the first extraction code and the second extraction code, the at least one of the first extraction code and the second extraction code causes the at least one processor to extract the category by changing an order of the first and second keywords.

4. The information processing apparatus according to claim 3, further comprising:
third extraction code configured to cause the at least one processor to extract, from among the plurality of categories, a category where a number of times when the category is specified as the search condition along with the first keyword and the second keyword is greater than or equal to a third threshold value; and
determination code configured to cause the at least one processor to determine one of the category extracted by the second extraction code and the category extracted by the third extraction code to be the category relevant to the combination based on a predetermined criterion.

5. The information processing apparatus according to claim 4, wherein
the determination code causes the at least one processor to determine a category whose position is deeper than the other in the tree structure from among the category extracted by the second extraction code and the category extracted by the third extraction code to be the category relevant to the combination.

6. The information processing apparatus according to claim 3, wherein
in a case that a magnitude of variation of a number of times when each of a plurality of categories in a sibling relationship in the tree structure is specified along with the first keyword or the second keyword exceeds a variably set magnitude, the first extraction code or the second extraction code causes the at least one processor to extract, from among the plurality of categories in the sibling relationship, the category based on the first threshold value or the second threshold value.

7. The information processing apparatus according to claim 3, wherein
each of the first extraction code and the second extraction code causes the at least one processor to extract, from among a plurality of categories in a sibling relationship in the tree structure, a category where the number of times when the category is specified along with the keyword is greater than or equal to the threshold value determined according to the number of categories in the sibling relationship.

8. The information processing apparatus according to claim 2, further comprising:
third extraction code configured to cause the at least one processor to extract, from among the plurality of categories, a category where a number of times when the category is specified as the search condition along with the first keyword and the second keyword is greater than or equal to a third threshold value; and
determination code configured to cause the at least one processor to determine one of the category extracted by the second extraction code and the category extracted by the third extraction code to be the category relevant to the combination based on a predetermined criterion.

9. The information processing apparatus according to claim 8, wherein
the determination code causes the at least one processor to determine a category whose position is deeper than the other in the tree structure from among the category extracted by the second extraction code and the category extracted by the third extraction code to be the category relevant to the combination.

10. The information processing apparatus according to claim 2, wherein
in a case that a magnitude of variation of a number of times when each of a plurality of categories in a sibling relationship in the tree structure is specified along with the first keyword or the second keyword exceeds a variably set magnitude, the first extraction code or the second extraction code causes the at least one processor to extract, from among the plurality of categories in the sibling relationship, the category based on the first threshold value or the second threshold value.

11. The information processing apparatus according to claim 2, wherein
each of the first extraction code and the second extraction code causes the at least one processor to extract, from among a plurality of categories in a sibling relationship in the tree structure, a category where the number of times when the category is specified along with the keyword is greater than or equal to the threshold value determined according to the number of categories in the sibling relationship.

12. The information processing apparatus according to claim 1, further comprising:
third extraction code configured to cause the at least one processor to extract, from among the plurality of categories, a category where a number of times when the category is specified as the search condition along with the first keyword and the second keyword is greater than or equal to a third threshold value; and
determination code configured to cause the at least one processor to determine one of the category extracted by the second extraction code and the category extracted by the third extraction code to be the category relevant to the combination based on a predetermined criterion.

13. The information processing apparatus according to claim 1, wherein
in a case that a magnitude of variation of a number of times when each of a plurality of categories in a sibling relationship in the tree structure is specified along with the first keyword or the second keyword exceeds a variably set magnitude, the first extraction code or the second extraction code causes the at least one processor to extract, from among the plurality of categories in the sibling relationship, the category based on the first threshold value or the second threshold value.

14. The information processing apparatus according to claim 1, wherein
each of the first extraction code and the second extraction code causes the at least one processor to extract, from among a plurality of categories in a sibling relationship in the tree structure, a category where the number of times when the category is specified along with the keyword is greater than or equal to the threshold value determined according to the number of categories in the sibling relationship.

15. An infomiation processing method performed by a computer, the method comprising:
recording a query log in response to receiving a search query including a category, from among a plurality of categories that are hierarchized in a tree structure, and a keyword;
extracting, based on the recorded query log, from among the plurality of categories, a category where the number of times when the category is specified as a search condition along with a first keyword is greater than or equal to a first threshold value; and
extracting, from among categories of the extracted category, a category where a number of times when the category is specified as a search condition along with a second keyword is greater than or equal to a second threshold value as a category relevant to a combination of the first keyword and the second keyword,
wherein, when a search is executed based on designation of the first keyword and the second keyword, without designation of any category, the extracted category is displayed together with a keyword search result, and
wherein, in response to a user input selecting the extracted category, a new search result is displayed according to a search executed based on the first keyword, the second keyword, and the selected extracted category.

* * * * *